US012158907B1

(12) United States Patent
Leach et al.

(10) Patent No.: US 12,158,907 B1
(45) Date of Patent: Dec. 3, 2024

(54) THEMATIC SEARCH

(71) Applicant: Google LLC, Mountain View, CA (US)

(72) Inventors: Jamie Leach, Los Angeles, CA (US); Danielle Fisher, Brooklyn, NY (US); Jason Blythe, San Francisco, CA (US); Mahsan Rofouei, Menlo Park, CA (US); Sundeep Tirumalareddy, Mountain View, CA (US); Zhaoyang Xu, Cupertino, CA (US); Eric Lehman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/318,585

(22) Filed: May 16, 2023

(51) Int. Cl.
*G06F 16/35* (2019.01)
*G06F 16/951* (2019.01)
*G06F 16/953* (2019.01)

(52) U.S. Cl.
CPC .......... *G06F 16/355* (2019.01); *G06F 16/358* (2019.01); *G06F 16/951* (2019.01); *G06F 16/953* (2019.01)

(58) Field of Classification Search
CPC .... G06F 16/355; G06F 16/358; G06F 16/953; G06F 16/951
See application file for complete search history.

(56) References Cited

U.S. PATENT DOCUMENTS

| | | | | |
|---|---|---|---|---|
| 5,943,443 | A | * | 8/1999 | Itonori ................. G06V 30/262 707/999.005 |
| 9,245,026 | B1 | * | 1/2016 | Hoover .............. G06Q 30/0623 |
| 2007/0214123 | A1 | * | 9/2007 | Messer ................. G06F 16/957 |
| 2011/0238665 | A1 | * | 9/2011 | Parikh ................ G06F 16/3323 707/E17.084 |
| 2013/0179420 | A1 | * | 7/2013 | Park .................... G06F 16/9535 707/706 |
| 2014/0280180 | A1 | * | 9/2014 | Edecker ................ G06F 16/285 707/769 |

* cited by examiner

*Primary Examiner* — Baoquoc N To
(74) *Attorney, Agent, or Firm* — Brake Hughes Bellermann LLP

(57) ABSTRACT

According to an aspect, a method includes, in response to a search query for web content, obtaining, by a search engine, search results relevant to the search query, where the search results include a set of responsive documents, and generating a plurality of themes from content included in the set of responsive documents, where each of the plurality of themes includes a respective phrase that describes a respective theme. The method includes providing thematic data to a browser application on a client device, where the thematic data includes the plurality of themes and thematic search results, which may be a portion of the search results arranged by the plurality of themes. The thematic data is configured to cause the browser application to display the plurality of themes in a search results page.

20 Claims, 46 Drawing Sheets

Responsive document 126

Passages 145

2. Do Phone Interviews — 143    145-1

- Once you've assembled a list, Tom recommends that you make a quick call to each of your prospects and go through these questions to ask a contractor:
  - Do they take on projects of your size?
  - Are they willing to provide financial references, from suppliers or banks?
  - Can they give you a list of previous clients?
  - How many other projects would they have going at the same time?
  - How long have they worked with their subcontractors?

The answers to these questions will reveal the company's availability, reliability, how much attention they'll be able to give your project and how smoothly the work will go.

3. Meet face to face — 143    145-2

Based on the phone interviews, pick three or four estimates and further discussion. A contractor should be able to answer your questions satisfactorily and a manner that puts you at ease. Tom says that it's crucial that you two communicate well because this person will be in your home for hours at a time. On the other hand, don't let personality fool you. Check in with your state's consumer protection agency and your local Better Business Bureau before you hire a contractor to make sure they don't have a history of disputes with clients subcontractors

FIG. 1F

Thematic data 138

Search query 142
-CSS align div content vertical center

119a

130a

Flexbox

126a-1  You can also use flexbox to center things. Just not that flexbox is not supported in IE10 and earlier versions:
https://www.w3schools.com/css/css_alighn.asp [flexbox]

126a-2  Alternatively. Instead of aligning the content via the container, flexbox can also center a flex item with an auto margin when there is only one flex-item in the flex container (like the example given in the question above) So to center the flex item both horizontally and vertically just set it...
https://stakeoverflow.com/questions/8865458/how-do-l-vertically-center-text-with-css [flexbox]

126a-3  With flexbox, it is possible to align elements vertically (or horizontally) with the align-items, align-self, and justify-content properties
https://www.w3docs.com/snippets/css/how-to-vertically-center-text-with-css.html [flexbox]

126c-1  Flexbox
https://www.youtube.com/watch?v=Qjvvzyta9u [flexbox]    130b

119b

Position absolute

126a-4  One method for aligning elements is to use position: absolute; in my younger and more vulnerable years my father gave me some advice that I've been turning over in my mind ever since
https://www.w3schools.com/css/css_alighn.asp [position absolute]

126a-5  When we have position: absolute, top: 50%, left: 50%, the calculations are made starting from the upper left corner. To position the text in the center. We must "move" it -% up by setting transform: translate (-50%,-50%)
https://www.w3docs.com/snippets/css/how-to-vertically-center-text-with-css.html [position absolute]

126c-2  CSS absolute positioning
https://www.youtube.com/watch?v=Qjvvzyta9u [flexbox]

126a-6  This technique uses an absolutely positioned element setting top, bottom, left and right to 0. it is described in more detail in an article in smashing magazine, absolute horizontal and vertical centering in CSS 60 because it goes wrong if the div or text changes or more content is added – Rob...
https://stakeoverflow.com/questions/8865458/how-do-l-vertically-center-text-with-css [flexbox]

FIG. 1L

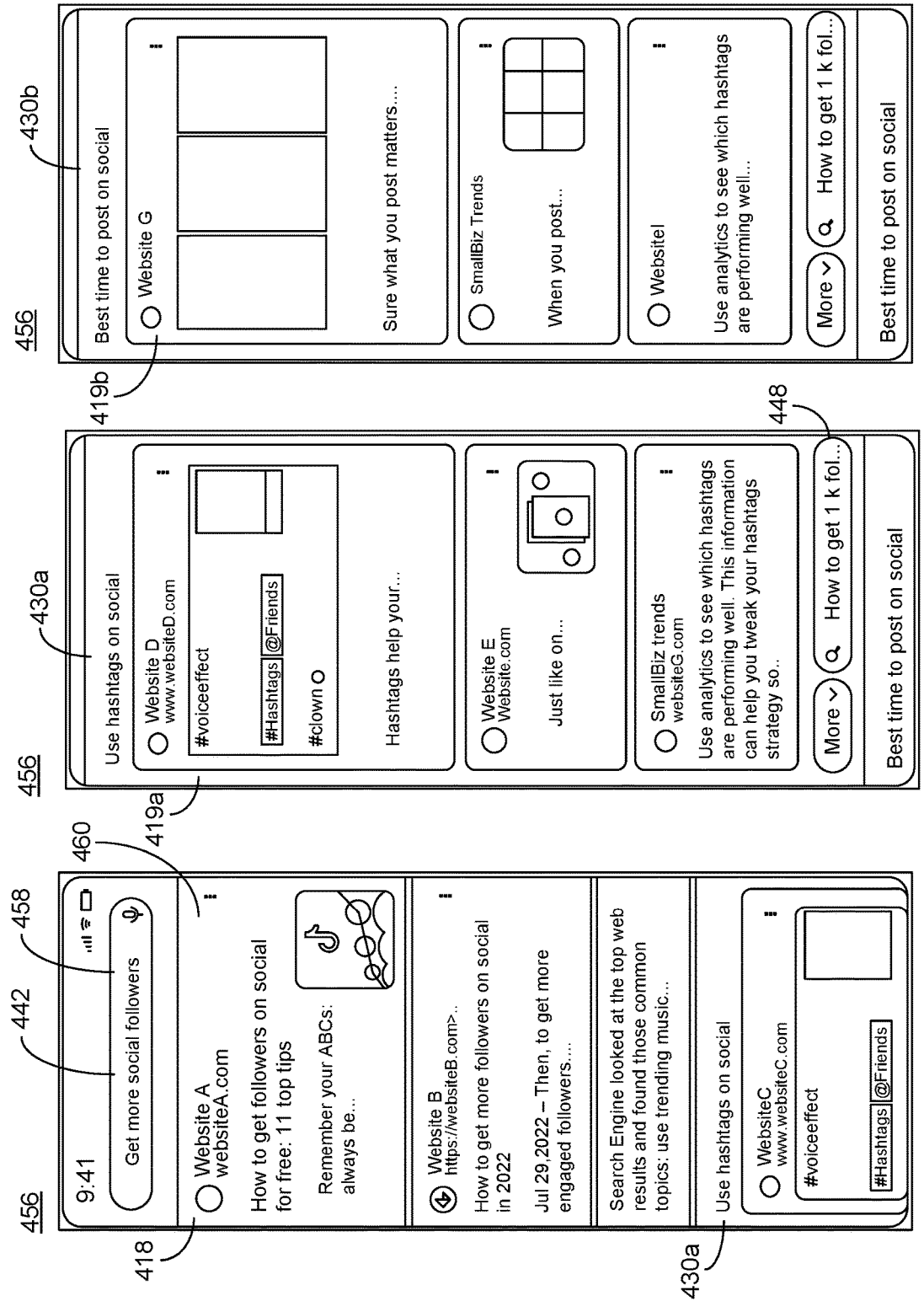

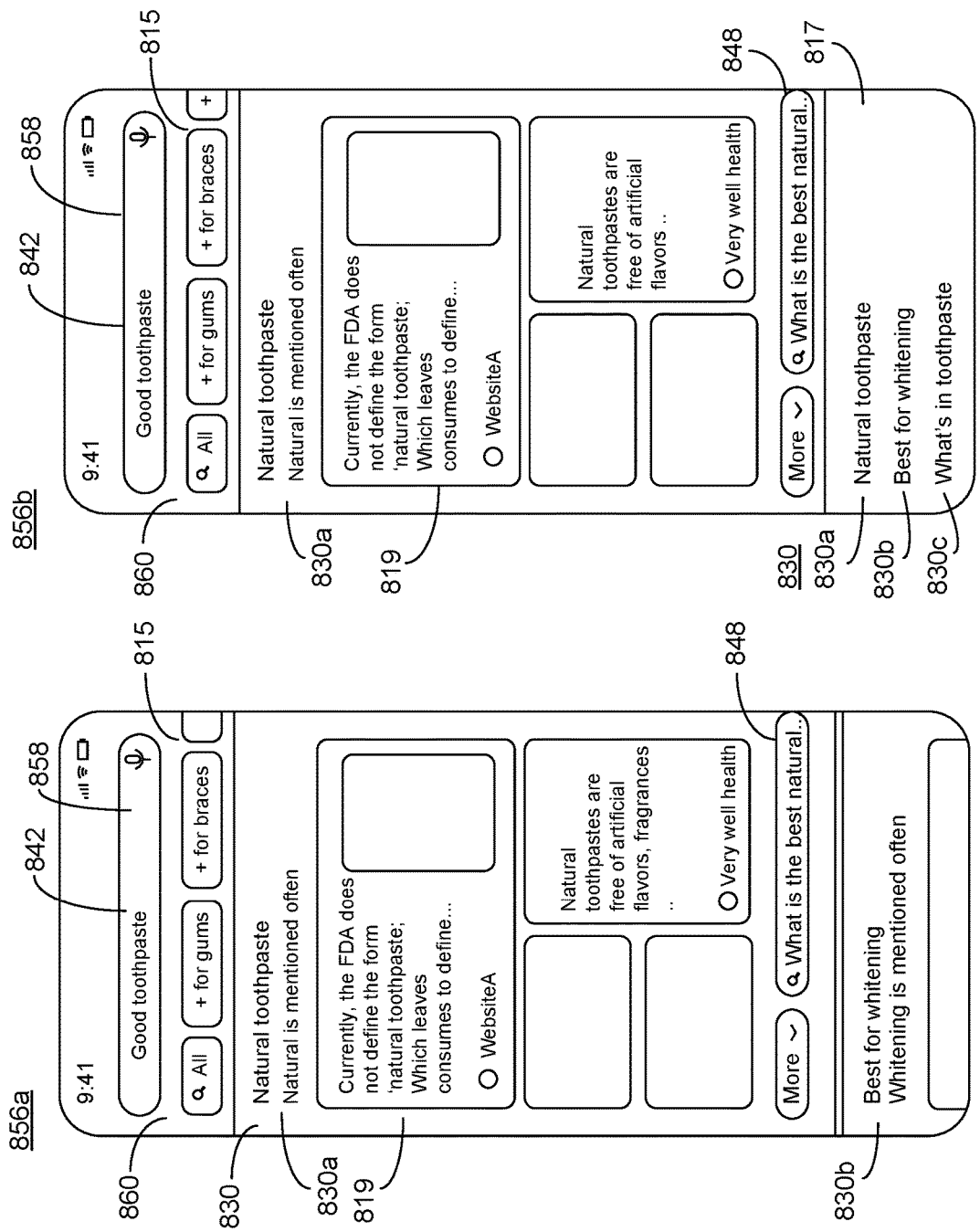

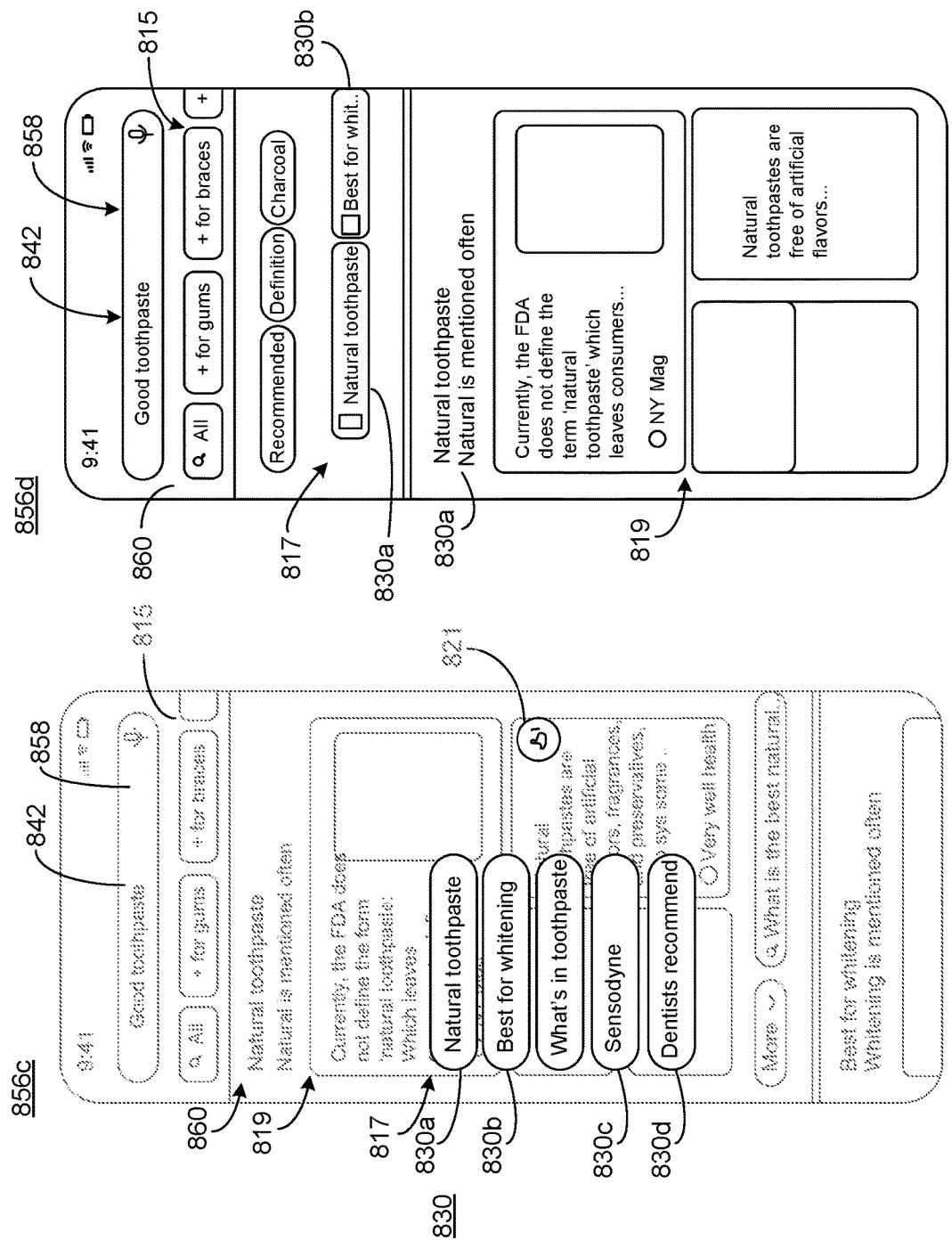

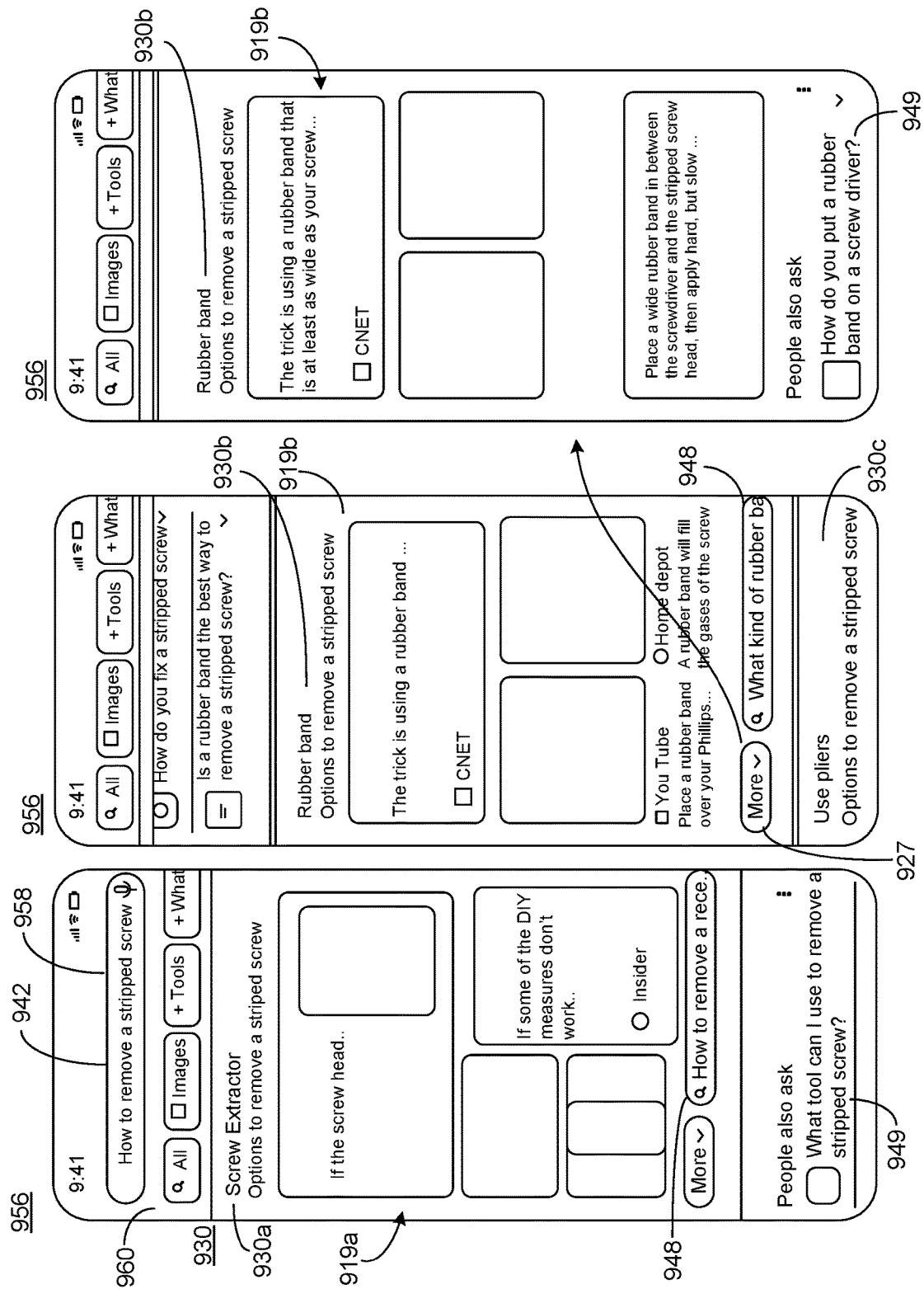

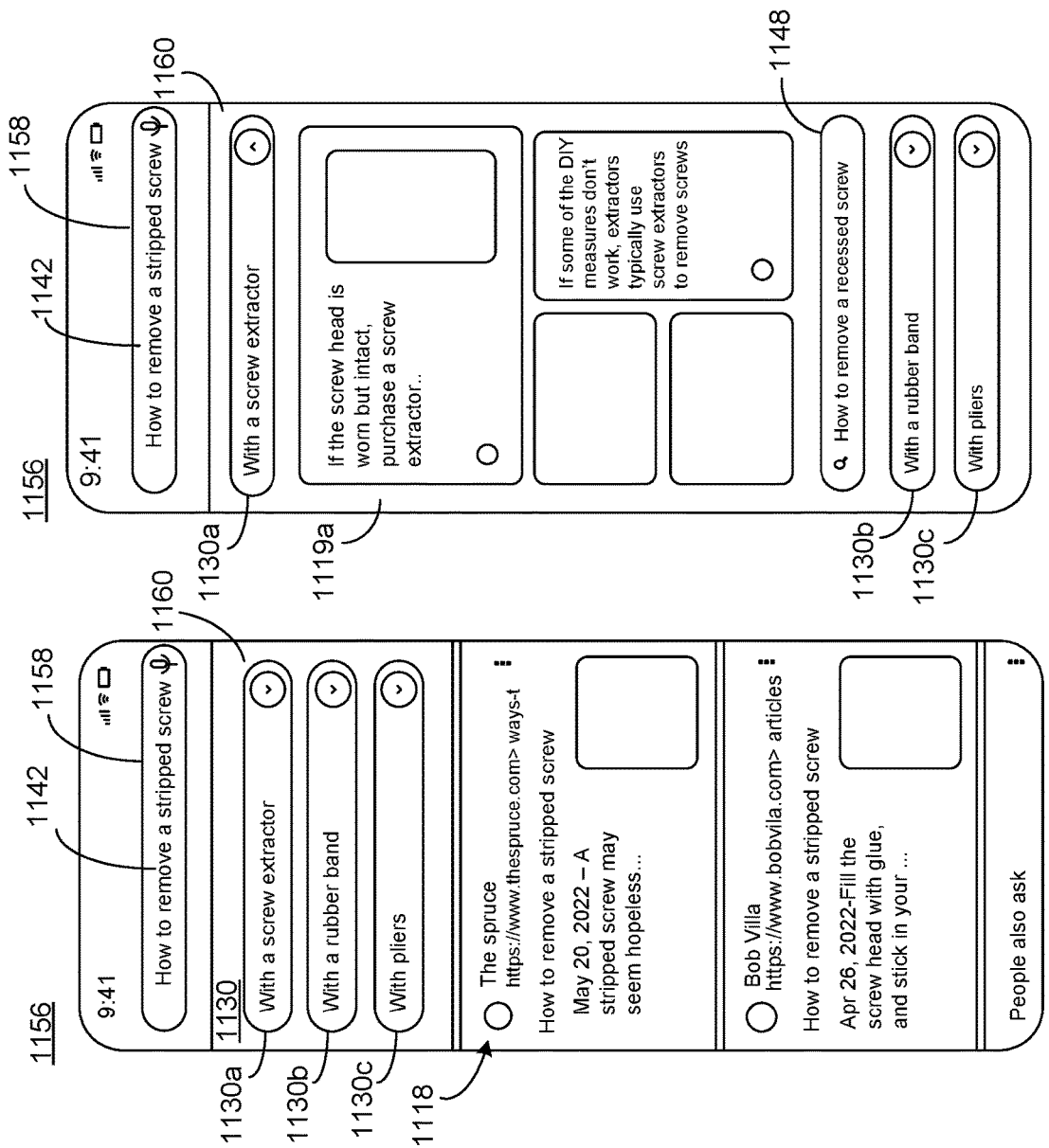

THEMATIC SEARCH

BACKGROUND

In response to a search query, a search engine may return a set of search results in a list form. In response to some queries, a search engine may also return a list of related questions that the user may also be interested in exploring. In some examples, a question can be selected to reveal a snippet of text that answers the question, as well as a link to the source of the information.

SUMMARY

This disclosure relates to a thematic search engine that generates themes from search results, and, in some examples, organizes the search results by the themes. For example, the thematic search engine may generate themes from unstructured data by analyzing the content of the responsive documents themselves and may thematically organize the search results according to the themes. In response to a search query ("moving to Milwaukee"), a search engine may obtain search results responsive to that search query, select a set of responsive documents (e.g., top X number of search results) from the search results, and generate a plurality of themes (e.g., "neighborhoods", "cost of living", "things to do", "pros and cons", etc.) from the content of the responsive documents. In some examples, the thematic search engine may map semantic keywords from each responsive document (e.g., from the search results) and connect the semantic keywords to similar semantic keywords from other responsive documents to generate the themes.

In some aspects, the techniques described herein relate to a method including: in response to a search query for web content, obtaining, by a search engine, search results relevant to the search query, the search results including a set of responsive documents; generating a plurality of themes from content included in the set of responsive documents, each of the plurality of themes including a respective phrase that describes a respective theme; and providing thematic data to a browser application on a client device, the thematic data including the plurality of themes and thematic search results, the thematic search results being at least a portion of the search results arranged by the plurality of themes, the thematic data configured to cause the browser application to display the plurality of themes in a search results page.

In some aspects, the techniques described herein relate to an apparatus including: at least one processor; and a non-transitory computer-readable medium storing executable instructions that cause the at least one processor to: in response to a search query for web content, obtain search results relevant to the search query, the search results including a set of responsive documents; generate a plurality of themes from content included in the set of responsive documents, each of the plurality of themes including a respective phrase, generated by a language model, that describes a respective theme; generate a ranking order for the plurality of themes according to at least one ranking signal; and provide thematic data to a browser application on a client device, the thematic data including the plurality of themes and thematic search results, the thematic search results being at least a portion of the search results arranged by the plurality of themes, the thematic data configured to cause the browser application to display the plurality of themes according to the ranking order in a search results page.

In some aspects, the techniques described herein relate to a non-transitory computer-readable medium including executable instructions that cause at least one processor to execute operations, the operations including: in response to a search query for web content, obtaining, by a search engine, search results relevant to the search query, the search results including a set of responsive documents; generating a plurality of themes from content included in the set of responsive documents, each of the plurality of themes including a respective phrase that describes a respective theme; and providing thematic data to a browser application on a client device, the thematic data including the plurality of themes and thematic search results, the thematic search results being at least a portion of the search results arranged by the plurality of themes, the thematic data configured to cause the browser application to display the plurality of themes in a search results page.

The details of one or more implementations are set forth in the accompanying drawings and the description below. Other features will be apparent from the description and drawings, and from the claims.

BRIEF DESCRIPTION OF DRAWINGS

FIG. 1F illustrates a responsive document with a plurality of passages according to an aspect.

FIG. 1L illustrates an example of thematic data generated by a thematic search engine according to another aspect.

FIGS. 4A through 4C illustrate an example of a user interface for displaying themes and/or thematic search results according to another aspect.

FIGS. 8A through 8D illustrate an example of a user interface for displaying themes and/or thematic search results according to another aspect.

FIGS. 9A through 9C illustrate an example of a user interface for displaying themes and/or thematic search results according to another aspect.

FIGS. 11A and 11B illustrate an example of a user interface for displaying themes and/or thematic search results according to another aspect.

Like reference symbols in the various drawings indicate like elements.

DETAILED DESCRIPTION

Figure 1A:
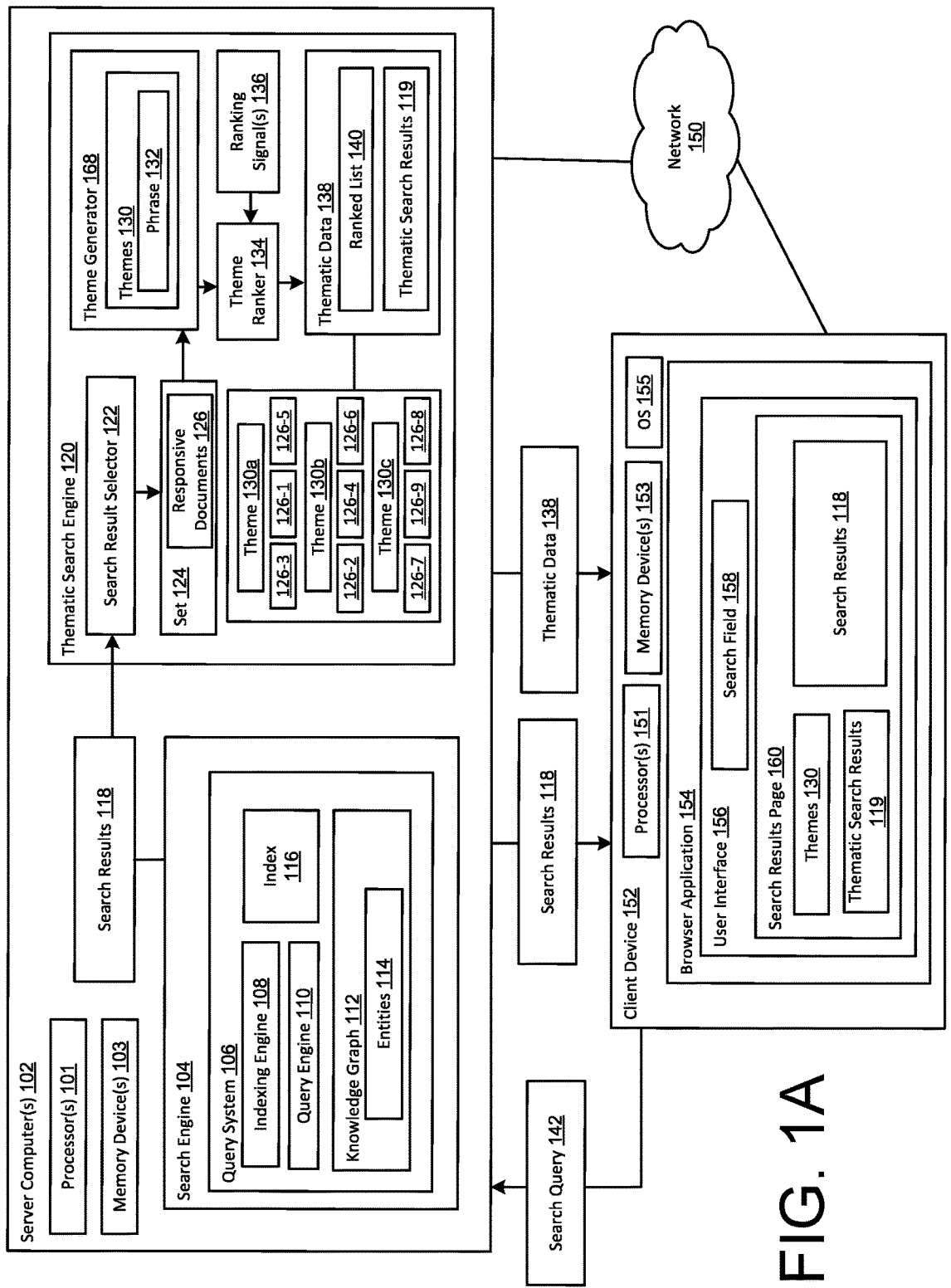
FIG. 1A illustrates a search system for identifying themes in search results according to an aspect.

This disclosure relates to a thematic search engine configured to generate themes from search results, and, in some examples, organize (e.g., sort, filter) the search results by the themes. For example, the thematic search engine may generate themes from unstructured data by analyzing the content of the responsive documents themselves and may thematically organize the search results according to the themes.

In response to a search query ("moving to Denver"), a search engine may obtain search results (e.g., responsive documents) responsive to that search query. The thematic search engine may select a set of responsive documents (e.g., top X number of search results) from the search results obtained by the search engine, and generate a plurality of themes (e.g., "neighborhoods", "cost of living", "things to do", "pros and cons", etc.) from the content of the responsive documents. A theme may include a phrase, generated by a language model, that describes a theme included in the responsive documents. In some examples, the thematic search engine may map semantic keywords from each responsive document (e.g., from the search results) and connect the semantic keywords to similar semantic keywords from other responsive documents to generate themes.

The themes are displayed on a search results page, and, in some examples, the search results (or a portion thereof) are arranged (e.g., organized, sorted) according to the plurality of themes. Displaying a theme may include displaying the phrase of the theme. In some examples, the thematic search engine may rank the themes based on prominence and/or relevance to the search query. The search results page may organize the search results (or a portion thereof) according to the themes (e.g., under the theme of "cost of living", identifying those search results that relate to the theme of "cost of living"). The themes and/or search results organized by theme by the thematic search engine may be rendered in the search results page according to a variety of different ways, e.g., lists, user interface (UI) cards or objects, horizontal carousel, vertical carousel, etc. The search results organized by theme may be referred to as thematic search results. In some examples, the themes and/or search results organized by theme are displayed in the search results page along with the search results (e.g., normal search results) from the search engine. In some examples, the themes and/or theme-organized search results are displayed in a portion of the search results page that is separate from the search results obtained by the search engine.

The themes may be displayed as selectable. In some examples, the phrase of the theme may be displayed, where the phrase or a UI element associated with the phrase may be selectable, thereby causing a display of the thematic search results that pertain to the selected theme. When a user selects a particular theme (e.g., "neighborhoods"), the search results page may display a portion of the search results that relate to (e.g., were arranged/organized into) the selected theme. In some examples, when a user selects a particular theme (e.g., "neighborhoods"), the system may generate a new (second) search query to refine the original (first) query (e.g., "moving to Denver" and "neighborhoods"), which causes the search engine to obtain new (second) search results. In some examples, at least a portion of the second search results is displayed with respect to the selected theme (e.g., the search results page may be modified to include the second search results or a new search results page is rendered with the second search results). In some examples, the thematic search engine obtains the second search results and generates sub-themes (e.g., "neighborhood A", "neighborhood B", "neighborhood C") from the responsive documents of the second search results. The search results page may display the sub-themes and/or second sorted search results. The process may continue, where selection of a sub-theme may cause the thematic search engine to obtain third search results from the search engine and may generate further themes (e.g., sub-sub-themes) from the third search results and so forth. As such, the user may drill down from a broad search query, which may reduce the user from formulating multiple queries and/or relying on recommended search queries.

In further detail, the thematic search engine may include a summary generator (e.g., a language model) that generates a summary description for each of a plurality of passages included in the set of responsive documents (e.g., from the search results). In some examples, the summary generator may generate a summary description for every passage in the set of responsive documents. In some examples, the summary generator receives a passage as an input and outputs a summary description for the passage. In some examples, the summary generator receives a passage and contextual information as inputs and outputs a summary description for the passage. The contextual information may include the title and/or metadata of the underlying responsive document, one or more neighboring passages (e.g., adjacent, nearby passages) on the responsive document (or all the other passages), and/or summary descriptions for one or more neighboring passages (or all of the other passages) on the responsive document. In some examples, the summary generator may generate the summary descriptions when the thematic search engine is triggered and/or when the thematic search engine selects the portion of the search results from the search engine. In some examples, the summary generator may generate the summary descriptions for a document during indexing (e.g., when the document is added to an index (or the index is updated)).

The thematic search engine includes a clustering engine configured to generate themes (e.g., common categories, entities, types, etc.) from the summary descriptions. For example, the clustering engine may cluster summary descriptions into cluster groups according to a clustering algorithm. Each cluster group corresponds to a separate theme. The clustering engine may generate a theme based on information from a respective cluster group. In some examples, the clustering engine may identify the summary description that is closest to the centroid of a cluster group as the theme for that cluster group. In some examples, the clustering engine may identify a summary description within a cluster group that has the highest similarity score as the theme for that cluster group. The thematic search engine and/or the clustering engine may include a ranking engine configured to rank the themes based on prominence (e.g., the number of distinct responsive documents that mention a respective theme) and/or relevance to the search query.

FIGS. 1A through 1M illustrate a search system 100 configured to identify themes 130 from search results 118 according to an aspect. The search system 100 includes a search engine 104 and a thematic search engine 120. The thematic search engine 120 may generate themes 130 from unstructured data by analyzing the content of responsive documents 126 from the search results 118. In response to a search query 142, the search engine 104 obtains search results 118 responsive to the search query 142. The thematic search engine 120 generates thematic data 138 based on the search results 118 (or a portion thereof). The thematic data 138 may include themes 130 detected from the search results 118. In some examples, the thematic data 138 includes thematic search results 119 that arranges the search results 118 (or a portion thereof) according to the themes 130. The thematic data 138, when received by a browser application 154, causes the browser application 154 to display the themes 130 and/or the thematic search results 119 in a search results page 160.

The search engine 104 includes a query system 106 that enables the search engine 104 to receive and respond to search queries 142. The query system 106 includes an indexing engine 108 configured to generate and update an index 116. The index 116 may be referred to as a search index or a web search index. In some examples, the index 116 is a web document index, e.g., an inverted index that associates terms, phrases, and/or n-grams with web documents. A web document (sometimes referred to as a document or a responsive document) may be digital content that can be accessed and viewed on the Internet. In some examples, the web documents include web pages. In some examples, the web documents may include portable document format (PDF) files, images, videos, and/or audio files, which may be embedded into web pages or accessed through links to external sources. In some examples, the indexing engine 108 may operate with one or more crawlers (e.g., web crawlers). A crawler searches for web documents accessible via the Internet and returns content (including metadata) for the web documents. The indexing engine 108 may use the content and/or metadata to generate and update the index 116.

The query system 106 includes a query engine 110. The query engine 110 may receive a search query 142 from a client device 152, analyze the search query 142 to determine how to search the index 116, and to initiate the search of the index 116. The search query 142 may include a word, a phrase, a list of words, etc. In some examples, the client device 152 executes a browser application 154 and the search query 142 may be submitted to the search engine 104 via a user interface 156 of the browser application 154. In some examples, the search query 142 is submitted to the search engine 104 via a search field 158 of the user interface 156. The search field 158 may be a UI interface element that permits the user to enter and submit a search query 142.

The search engine 104, specifically the query engine 110, uses the index 116 to identify search results 118 responsive to the search query 142. For example, the query engine 110 may receive the search term(s) specified by the search query 142 and obtain the relevant search results 118 by searching the index 116. In further detail, the query engine 110 may obtain responsive documents 126 (e.g., web documents) from the index 116, rank the responsive documents 126, and generate search results 118 for at least some of the responsive documents 126.

Ranking may include applying a plurality of ranking signals to the responsive documents 126. The ranking signals may include signals relating to quality, uniqueness of content, backlinks, user experience, social signals (e.g., popularity), relevance, authoritative, the use of keywords, and/or freshness of content. For at least some of the responsive documents 126, the query engine 110 generates a search result 118 for a responsive document 126. The search result 118 may include the title of the responsive document 126, a resource locator (e.g., a source, a uniform resource location (URL)) of the responsive document 126, a description (e.g., a snippet obtain from the metadata or content of the responsive document 126), a rich snippet having additional information such as ratings, reviews, or other data related to the content, and/or image(s) and/or video(s) related to the responsive document 126. In response to the search query 142, the search results 118 may be rendered on the search results page 160 on the client device 152. The search results page 160 may be an interface rendered by a browser application 154 and used for displaying the search results 118 (and the thematic data 138).

In some examples, in response to a search query 142, the query engine 110 may also identify information from a knowledge graph 112 and include that information as part of (or in addition to) the search results 118 that are provided to the browser application 154. The knowledge graph 112 may be a structured database that organizes data using a format or schema that defines the data fields, types, and/or relationships. The knowledge graph 112 may include information about entities 114 and relationships (e.g., links) between the entities 114. The entities 114 may be people, places, things, and/or concepts, etc. The search engine 104 may generate and update the knowledge graph 112 by analyzing data from a variety of sources, e.g., structured data on websites, public databases, and/or user-generated content. Entities 114 that are well known may have a relatively large amount of structured data, which may or may not be categorically arranged. If a user searches for Albert Einstein, the knowledge graph 112 may have an entity 114 for Albert Einstein and may store information about Albert Einstein. The query engine 110 may return information from the knowledge graph 112 about the entity identified in the search query 142 such as a summary of Albert Einstein's life and work, along with related information such as his theories and accomplishments, his birthplace and other places he lived, and/or other notable people associated with him. Similarly, if a user searches for "traveling to New York", the query engine 110 may identify structured data about New York from the knowledge graph 112 related to the search query 142, which may cause the display of various information about New York such as itineraries, cat and drink, what to buy, videos, travel articles, etc. These topics or categories about New York may already be defined in the structured data in the knowledge graph 112.

However, the thematic search engine 120 may generate themes 130 from unstructured data by analyzing the content of the responsive documents 126 themselves. For example, in response to a search query 142, the thematic search engine 120 may generate thematic data 138 from the search results 118. The thematic data 138 includes themes 130 (e.g., common themes) discovered in the responsive documents 126 of the search results 118. For example, the thematic search engine 120 may generate themes 130 (e.g., topics, types, categories, items, products, etc.) related to a search query 142 from unstructured data by analyzing the content of the responsive documents 126. In some examples, the thematic search engine 120 may not use structured data from the knowledge graph 112 to identify the themes 130, but analyzes the underlying content (e.g., responsive documents 126) of the search results 118. As such, the thematic search engine 120 may generate themes 130 related to entities 114 that are less well-known and/or are not included in the knowledge graph 112.

In some examples, when a search query 142 is submitted by the user (e.g., each time a search query 142 is submitted), the search system 100 may trigger the thematic search engine 120 to generate the thematic data 138 from the search results 118 obtained by the search engine 104. In some examples, the search system 100 may selectively trigger the thematic search engine 120, which, in some examples, may be dependent upon the type or breadth of a search query 142. For example, a search query 142 for "dogs" would have a broad breadth and may include search results 118 on various breeds of dogs, dog training, dog care, etc. In contrast, some answer-type search queries ("what is the capital of France") may have a narrow breadth in which the user is looking for a single (or few) right search result(s) 118. In some examples, the thematic search engine 120 may compute a breadth value for a search query 142, where the breadth value may represent a level of broadness or narrowness of the search query 142. If the breadth value is above a threshold value, the thematic search engine 120 may be configured to compute thematic data 138 for the search query 142, and, if the breadth value is below the threshold value, the thematic search engine 120 may not compute thematic data 138 for the search query 142. In some examples, the thematic search engine 120 is configured to attempt to generate thematic data 138 for every search query 142, but if no themes 130 are detected or the number of themes 130 is equal to or less than a threshold value (e.g., one, two, etc.), the thematic data 138 is not displayed in the search results page 160.

The thematic search engine 120 may include a search result selector 122 that selects a portion of the search results 118 obtained by the search engine 104. For example, the search result selector 122 may select a set 124 of responsive documents 126 from the search results 118. The set 124 may be the responsive documents 126 from the top X number (e.g., ten, fifteen, twenty, fifty, one hundred, etc.) of ranked search results 118.

The thematic search engine 120 includes a theme generator 168 that generates themes 130 from the set 124 of responsive documents 126. In some examples, the theme generator 168 may use a language model 128 and one or more similarity and/or clustering algorithms to generate the themes 130 from the set 124 of responsive documents 126. In some examples, the theme generator 168 may map semantic keywords from each responsive document 126 in the set 124 and connect the semantic keywords to similar semantic keywords from other responsive documents 126 in the set 124. The details of the theme generator 168 are further explained with reference to FIGS. 1E through 1I.

In response to a search query 142 for "What is kickboxing good for", the theme generator 168 may identify the following themes 130 from the set 124 of responsive documents 126: "tone your entire body", "learn self-defense", "improve posture", and "relieve stress." In response to a search query 142 for "Get more social media followers", the theme generator 168 may identify the following themes 130 from the set 124 of responsive documents 126: "use hashtags", "timing matters", and "do challenges." In response to a search query 142 for "What is the best milk", the theme generator 168 may identify the following themes 130 from the set 124 of responsive documents 126: "non-dairy milk alternatives", "oat milk", and "benefits of cow's milk" and/or "plant-based milks", "milk alternatives vs. dairy", "cashew milk", "rice milk" and "almond milk." In response to a search query 142 for "Allergies", the theme generator 168 may identify the following themes 130 from the set 124 of responsive documents 126: "drug allergy", "food allergy", and "contact dermatitis." In response to a search query 142 for "Good toothpaste", the theme generator 168 may identify the following themes 130 from the set 124 of responsive documents 126: "natural toothpaste", "best for whitening", "what's in toothpaste", "Sensodyne", and "dentists recommend."

The themes 130 may represent common subject matter discovered in the set 124 of responsive documents 126 that relate to the search query 142. In some examples, the themes 130 may represent different categories, topics, and/or entities discovered in the set 124 of responsive documents 126 that relate to the search query 142. A theme 130 may include a phrase 132, generated by the theme generator 168, that describes a respective theme 130 included in the responsive documents 126. The phrase 132 may include a single word or a collection of words that describe a theme 130 detected in the responsive documents 126. In some examples, the phrase 132 is generated by a language model 128.

The themes 130 may be relatively short phrases that represent a common theme in the set 124 of responsive documents 126. In some examples, the theme generator 168 is configured to generate each theme 130 to be equal or less than a threshold number of words or characters. In some examples, a theme 130 may include two or more phrases 132, where one phrase 132 may be a short phrase and another phrase 132 may be a longer phrase. In some examples, when the themes 130 are grouped together on the search results page 160, the short phrases may be displayed. In some examples, when a user selects the theme 130, the longer phrase may be displayed (e.g., the longer phrase may be displayed with thematic search results 119 that relate to the selected theme 130).

The thematic search engine 120 may include a theme ranker 134 configured to rank the themes 130 for a search query 142 according to one or more ranking signals 136 to generate a ranked list 140 of themes 130. The ranked list 140 may be a ranking order of the themes 130. The ranked list 140 (e.g., ranking order) may determine the display order of the themes 130 (e.g., the highest ranked theme 130 is displayed first followed by the next ranked theme 130 and so forth). In some examples, the ranking signal(s) 136 includes one or more signals relating to prominence. In some examples, the ranking signal(s) 136 includes the number of distinct (e.g., unique) responsive documents 126 from the set 124 that mention a respective theme 130. In some examples, the ranking signal(s) 136 include one or more ranking signals associated with the responsive document(s) 126 that mention a respective theme 130, which may include one or more signals used by the search engine 104 (e.g., signals relating to quality, uniqueness of content, backlinks, user experience, social signals (e.g., popularity), relevance, authoritative, the use of keywords, and/or freshness of content).

The thematic data 138 may also include thematic search results 119. The thematic search results 119 may be the search results 118 (or a portion thereof) arranged or sorted by the themes 130. For example, the thematic search results 119 may map at least a portion of the search results 118 from the set 124 of responsive documents 126 to the themes 130. In other words, the thematic search results 119 may identify which search result 118 (or responsive document 126) from the set 124 pertains to which theme 130. When a responsive document 126 from the set 124 mentions a particular theme 130, that responsive document 126 may be identified as a thematic search result 119 for that theme 130.

As shown in FIG. 1A, the theme generator 168 may generate a theme 130a, a theme 130b, and a theme 130c from the set 124 of responsive documents 126. Although three themes 130 are depicted in FIG. 1A, the theme generator 168 may generate any number of themes 130 including a single theme 130, two themes 130, or any number greater than three themes 130. The theme ranker 134 may rank the theme 130a, the theme 130b, and the theme 130c according to the ranking signal(s) 136 to generate a ranked list 140 of themes 130 (e.g., a ranking order of themes 130).

The theme generator 168 may identify a portion of the search results 118 that corresponds to each of the themes 130 to generate the thematic search results 119. The theme generator 168 may identify a first subset (e.g., responsive document 126-3, responsive document 126-1, and responsive document 126-5) from the set 124 as related to the theme 130a. The responsive document 126-3, the responsive document 126-1, and the responsive document 126-5 may be web documents that mention the theme 130a. The theme generator 168 may identify a second subset (e.g., responsive document 126-2, responsive document 126-4, and responsive document 126-6) from the set 124 as related to the theme 130b. The responsive document 126-2, the responsive document 126-4, and the responsive document 126-6 may be web documents that mention the theme 130b. The theme generator 168 may identify a third subset (e.g., responsive document 126-7, responsive document 126-9, and responsive document 126-8) from the set 124 as related to the theme 130c. The responsive document 126-7, the responsive document 126-9, and the responsive document 126-6 may be web documents that mention the theme 130c. Although the theme 130a, the theme 130b, and the theme 130c are depicted as having different supporting responsive documents 126, it is noted that a same responsive document 126 may be associated with multiple themes 130 (e.g. one responsive document 126 may be arranged or sorted into into one, two, or more themes 130).

The thematic search engine 120 may provide the thematic data 138 to the browser application 154 for display in the search results page 160 of the user interface 156 of the browser application 154. In some examples, the thematic data 138 includes the themes 130. In some examples, the thematic data 138 includes the thematic search results 119. In some examples, the thematic data 138 includes the themes 130 and the thematic search results 119. The thematic data 138 is configured to cause the browser application 154 to display the themes 130 and/or the thematic search results 119 in the search results page 160. In some examples, only the themes 130 are displayed (e.g., initially displayed) in the search results page 160. In some examples, at least a portion of the themes 130 and at least a portion of the thematic search results 119 are displayed.

The themes 130 and/or the thematic search results 119 from the thematic search engine 120 may be rendered in the search results page 160 according to a variety of different ways, e.g., lists, user interface (UI) cards or objects, horizontal carousel, vertical carousel, etc. In some examples, the themes 130 and/or the thematic search results 119 from the thematic search engine 120 are displayed in the search results page 160 along with the search results 118 (e.g., normal search results) from the search engine 104. In some examples, the themes 130 and/or the thematic search results 119 are displayed in a portion of the search results page 160 that is separate from the search results 118 obtained by the search engine 104. In some examples, when displayed on the search results page 160, the thematic search results 119 have one or more display aspects (e.g., color, font, size, etc.) that is/are different from the search results 118.

Figure 1B:
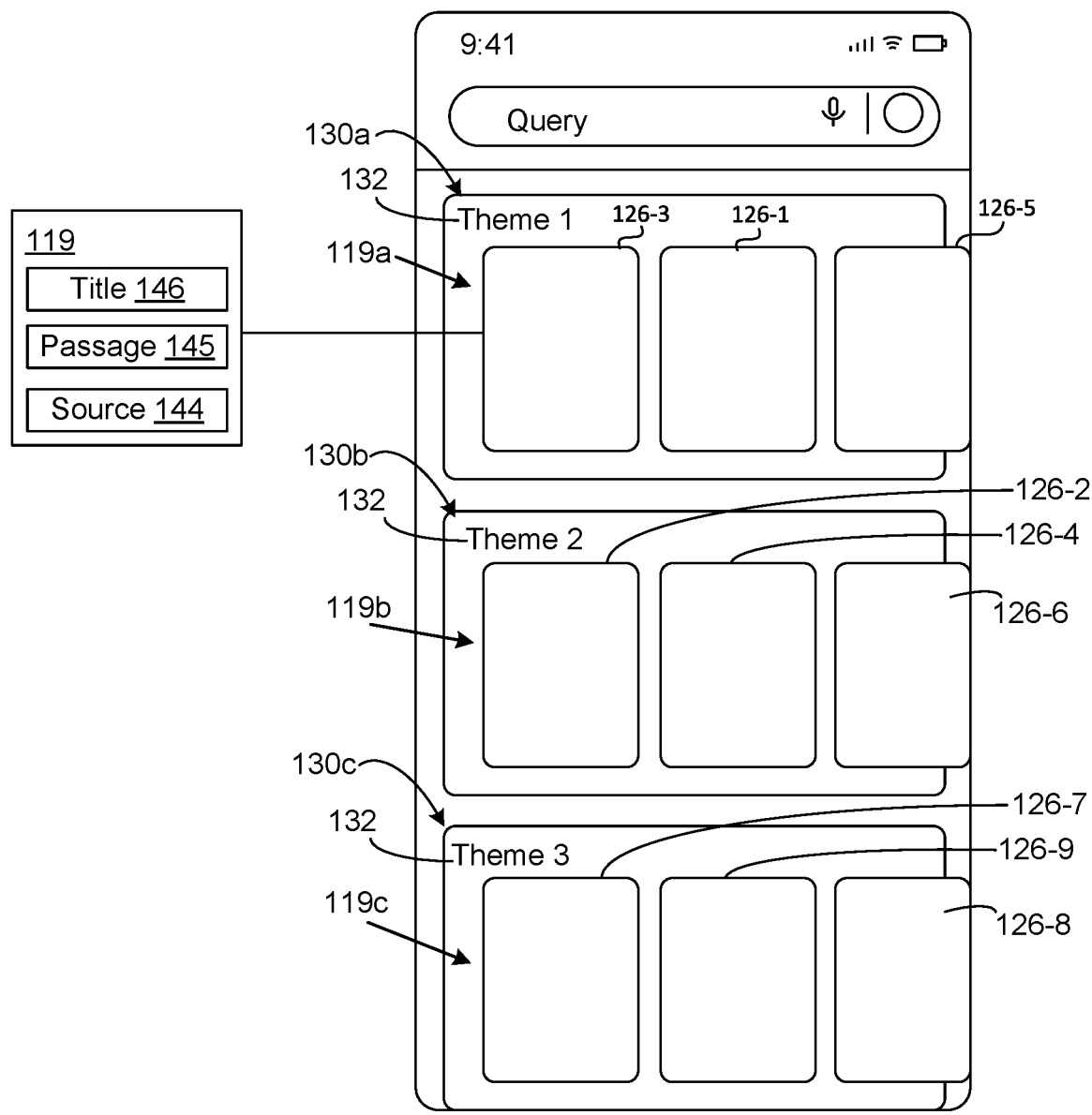
FIG. 1B illustrates a user interface for displaying themes with thematic search results according to an aspect.

As shown in FIG. 1B, in response to a search query 142, the browser application 154 may display thematic data 138 in a search results page 160. For example, the browser application 154 may display the phrase 132 of the theme 130a with thematic search results 119a that pertain to the theme 130a. The thematic search results 119a may include information about responsive document 126-3, responsive document 126-1, and responsive document 126-5, which mention the theme 130a. The browser application 154 may display the phrase 132 of the theme 130b with thematic search results 119b that pertain to the theme 130b. The thematic search results 119b may include information about responsive document 126-2, responsive document 126-4, and responsive document 126-6, which mention the theme 130b. The browser application 154 may display the phrase 132 of the theme 130c with thematic search results 119c that pertain to the theme 130c. The thematic search results 119c may include information about responsive document 126-7, responsive document 126-9, and responsive document 126-8, which mention the theme 130c.

A thematic search result 119 may include information that is similar or the same as the corresponding search result 118 obtained by the search engine 104. For example, a thematic search result 119 may include a title 146 of the responsive document 126, a passage 145 from the responsive document 126, and a source 144 of the responsive document. The source 144 may be a resource locator (e.g., uniform resource location (URL)) of the responsive document 126. The passage 145 may be a description (e.g., a snippet obtained from the metadata or content of the responsive document 126). In some examples, the passage 145 includes a portion of the responsive document 126 that mentions the respective theme 130. In some examples, the passage 145 included in the thematic search result 119 is associated with a summary description 166 generated by the language model 128 and included in a cluster group 172.

In some examples, the passage 145 includes a rich snippet with additional information such as ratings, reviews, or other data related to the content. In some examples, the passage 145 or thematic search result 119 includes image(s) and/or video(s) related to the responsive document 126. In some examples, a portion of the thematic search result 119 is different from the corresponding search result 118 obtained by the search engine 104. In some examples, the thematic search result 119 includes a passage 145 that mentions the corresponding theme 130, but the corresponding search result 118 obtained by the search engine 104 includes a different passage or snippet from the same responsive document 126. Also, in some examples, when displayed on the search results page 160, the thematic search results 119 have one or more display aspects (e.g., color, font, size, etc.) that is/are different from the search results 118.

Figure 1C:
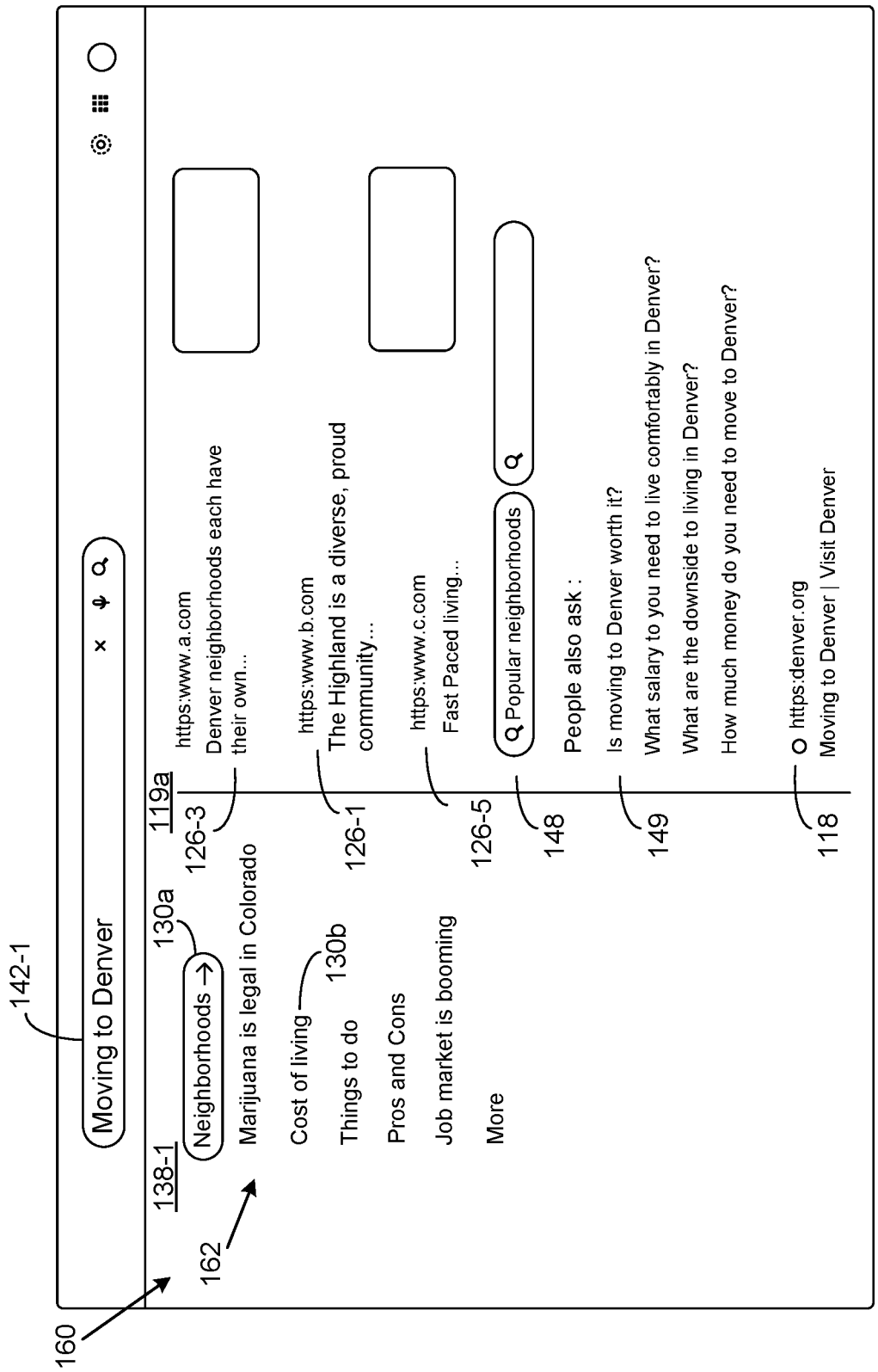
FIG. 1C illustrates a user interface for displaying themes and thematic search results according to another aspect.

FIG. 1C illustrates another aspect of a search results page 160 with thematic data 138-1. In response to a search query 142-1 ("moving to Denver"), themes 130 are displayed as selectable UI elements 162. In some examples, the themes 130 are grouped together in a portion (e.g., side portion) of the search results page 160. When a user selects a selectable UI element 162 corresponding to a theme 130a (e.g., "neighborhoods"), the search results page 160 may display thematic search results 119a that relate to the selected theme 130a (e.g., "neighborhoods"). In some examples, the thematic search results 119a may include information about responsive document 126-3, responsive document 126-1, and responsive document 126-5, which mention the selected theme 130a (e.g., neighborhoods). When a user selects another UI element 162 corresponding to a different theme 130b ("cost of living"), the search results page 160 may be updated with the thematic search results 119 that relate to the newly selected theme 130b ("cost of living").

In some examples, the search results page 160 may display suggested queries 148 that relate to the selected theme 130a. In some examples, the search results page 160 may include an answer module 149 that provides a list of questions related to the selected theme 130a. The questions may be generated based on one or more algorithms that analyze the search query 142, the selected theme 130a, and suggest other questions that may be relevant or helpful to the user. In some examples, the answer module 149 may be displayed as a UI object with a list of questions with clickable dropdown menus that provide brief answers to each question. Users can click on a question to expand the answer or click on more to see additional related questions. In some examples, the search results page 160 may also include the search results 118 obtained from the search engine 104. In some examples, the search results 118 are displayed after the display of the selected thematic search results 119a. In some examples, if a theme 130 is not selected, the search results page 160 displays the search results 118 (e.g., not the thematic search results 119).

Figure 1D:
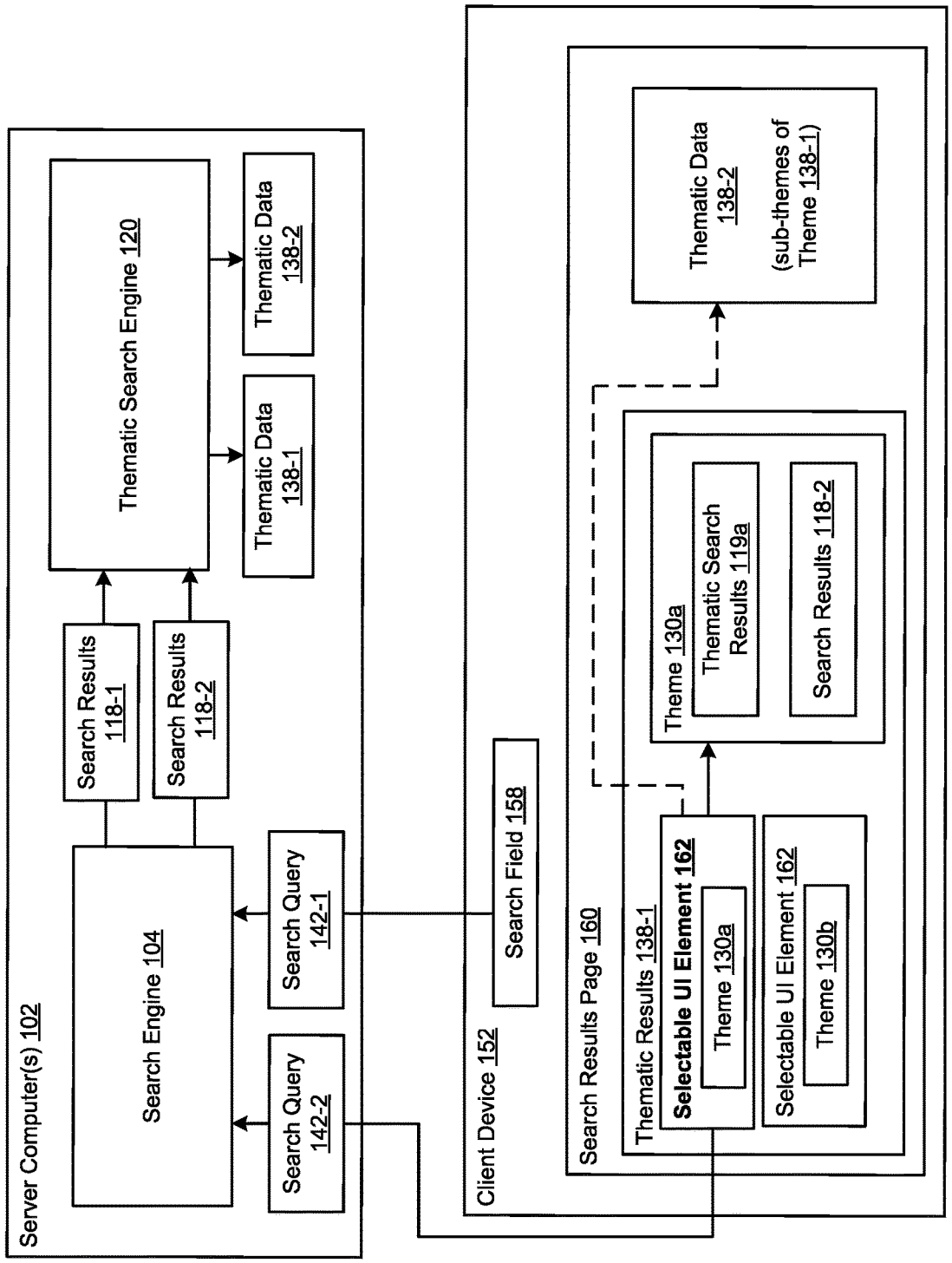
FIG. 1D illustrates an aspect of the system search according to another aspect.

Referring to FIG. 1D, in some examples, when a user selects a selectable UI element 162 corresponding to theme 130a (e.g., "neighborhoods"), the search results page 160 may display thematic search results 119a that relate to the selected theme 130a (e.g., "neighborhoods"). The thematic search results 119a include a portion of search results 118-1 that relate to the theme 130a. In some examples, instead of using the search results 118-1 from the original query (e.g., search query 142-1), a new search query (e.g., search query 142-2) is generated by the search system 100. For example, when a user selects a selectable UI element 162 corresponding to theme 130a (e.g., "neighborhoods"), search query 142-2 is generated and provided to the search engine 104. The search query 142-2 may include information from the search query 142-1 and information from the selected theme 130a (e.g., "moving to Denver" and "neighborhoods"). In response to the search query 142-2, the search engine 104 obtains search results 118-2. In some examples, the search results 118-2 (or a portion thereof) are provided in the search results page 160 under the theme 130a. For example, the search results 118-2 are displayed with respect to the selected theme 130a.

In some examples, in response to the search query 142-2 being generated, the thematic search engine 120 may generate thematic data 138-2 from at least a portion of the search results 118-2. For example, the thematic search engine 120 may obtain the search results 118-2 and may generate narrower themes 130 (e.g., sub-themes) (e.g., "neighborhood A", "neighborhood B", "neighborhood C") from the responsive documents 126 of the search results 118-2. The search results page 160 may display the sub-themes of theme 130a and/or the thematic search results 119 for the search query 142-2. The process may continue, where selection of a sub-theme of theme 130a may cause the thematic search engine 120 to obtain another set of search results 118 from the search engine 104 and may generate narrower themes 130 (e.g., sub-sub-themes of theme 130a) from the search results 118 and so forth. As such, the user may drill down from a broad search query, which may reduce the user from formulating multiple queries and/or relying on recommended search queries.

Figure 1E:
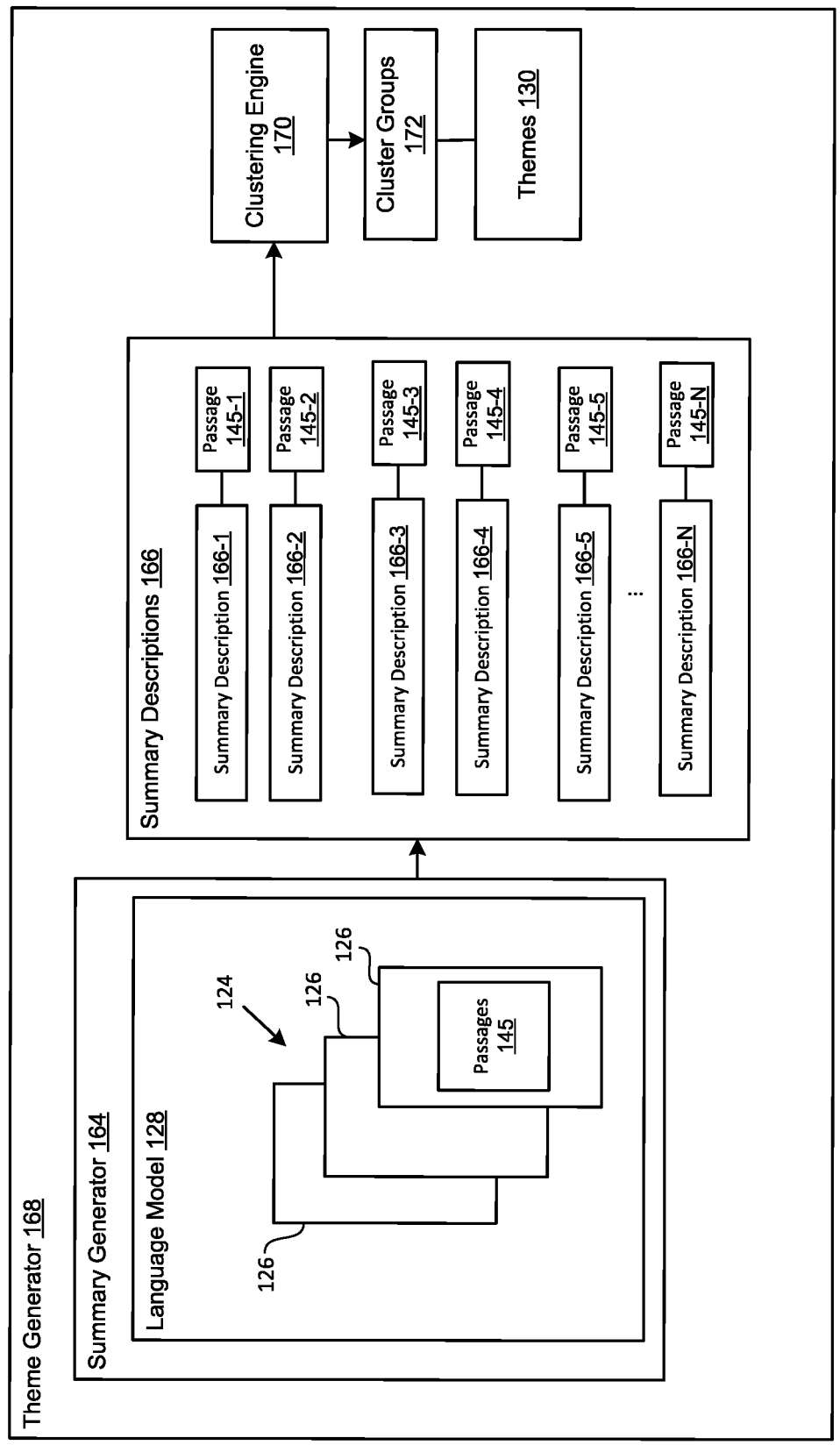
FIG. 1E illustrates a theme generator according to an aspect.

As shown in FIG. 1E, the theme generator 168 includes a summary generator 164 that generates a summary description 166 for each of a plurality of passages 145 included on the set 124 of responsive documents 126. In some examples, a passage 145 is a portion of a responsive document 126. In some examples, a passage 145 is a paragraph of a responsive document 126 (e.g., as defined by one or more hypertext markup language (HTML) elements). A summary description 166 may be a word or a collection of words that represents a summary of a respective passage 145. In some examples, the summary generator 164 uses a language model 128 to generate the summary descriptions 166. The language model 128 includes neural network(s), trained on text data, configured to identify important and/or relevant information in each passage 145. In some implementations, the summary generator 164 may be a large language model trained to create original text passages. In some examples, the language model 128 is configured to select a phrase from a given passage 145 as the summary description 166 that represents the summary of the passage 145. In some examples, the language model 128 is configured to generate a summary description 166 for a given passage 145, which may not be a verbatim copy of any sentence in the original text, but rather a condensed version or creative (original) text that captures a summary of the passage 145.

In some examples, the summary generator 164 may generate a summary description 166 for every passage 145 in the set 124 of responsive documents 126. The set 124 of responsive documents 126 may include a number of responsive documents 126, and each responsive document 126 may include any number of passages 145. The set 124 may represent the number of highest-ranking responsive documents 126. In some examples, a passage 145 is a portion or section of a responsive document 126. In some examples, a passage 145 is a paragraph of a responsive document 126. FIG. 1F depicts a portion of a responsive document 126 with a passage 145-1 and a passage 145-2. In some examples, a passage 145 is a portion of the responsive document 126 that includes or is associated with a header 143. Some responsive documents 126 have headers 143 that summarize the passages 145 under the headers 143. In some examples, the language model 128 is trained on pairs of headers 143 and passages 145 and the language model 128 may paraphrase, re-write, or select information from the header 143 as a summary description 166 for the corresponding passage 145. In some examples, the language model 128 may regularize (e.g., modify) the header 143 and use the regularized header 143 as the summary description 166. In some examples, the language model 128 may remove a prefix (e.g., "1", "step 1", "A", etc.) to the header 143.

As shown in FIG. 1E, the set 124 of responsive documents 126 includes passages 145-1 through passage 145-N, where some of the passages 145 are from one responsive document 126, some of the passages 145 are from another responsive document 126, and so forth. The summary generator 164 may generate a summary description 166-1 for passage 145-1, a summary description 166-2 for passage 145-2, a summary description 166-3 for passage 145-3, a summary description 166-4 for passage 145-4, and a summary description 166-5 through summary description 166-N for passages 145-5 through 145-N.

The summary generator 164 may receive a passage 145 as an input and outputs a summary description 166 for the inputted passage 145. In some examples, the summary generator 164 receives a passage 145 and contextual information as inputs and outputs a summary description 166 for the passage 145. In some examples, the contextual information may include the title of the responsive document 126 and/or metadata associated with the responsive document 126. In some examples, the contextual information may include one or more neighboring passages 145 (e.g., adjacent passages). In some examples, the contextual information may include a summary description 166 for one or more neighboring passages 145 (e.g., adjacent passages). In some examples, the contextual information may include all the other passages 145 on the same responsive document 126. For example, the summary generator may receive a passage 145 and the other passages 145 (e.g., all other passages 145) on the same responsive document 126 (and, in some examples, other contextual information) as inputs and may output a summary description 166 for the passage 145.

The summary generator 164 may generate the summary descriptions 166 when the thematic search engine 120 is triggered and/or when the thematic search engine 120 selects the set 124 of responsive documents 126 from the search results 118 obtained from the search engine 104. In some examples, the summary generator 164 may generate the summary descriptions 166 for a responsive document 126 during indexing (e.g., when the indexing engine 108 adds the responsive document 126 to the index 116 and/or updates the index 116). In some examples, the summary descriptions 166 for a responsive document 126 are stored in a memory device of the search system 100, and the summary generator 164 obtains the summary descriptions 166 for the responsive documents 126 included in the set 124 from the memory device.

The theme generator 168 may include a clustering engine 170 configured to generate themes 130 (e.g., common themes) from the summary descriptions 166. For example, the clustering engine 170 may cluster summary descriptions 166 into cluster groups 172 according to a clustering algorithm. Each cluster group 172 corresponds to a separate theme 130.

Figure 1G:
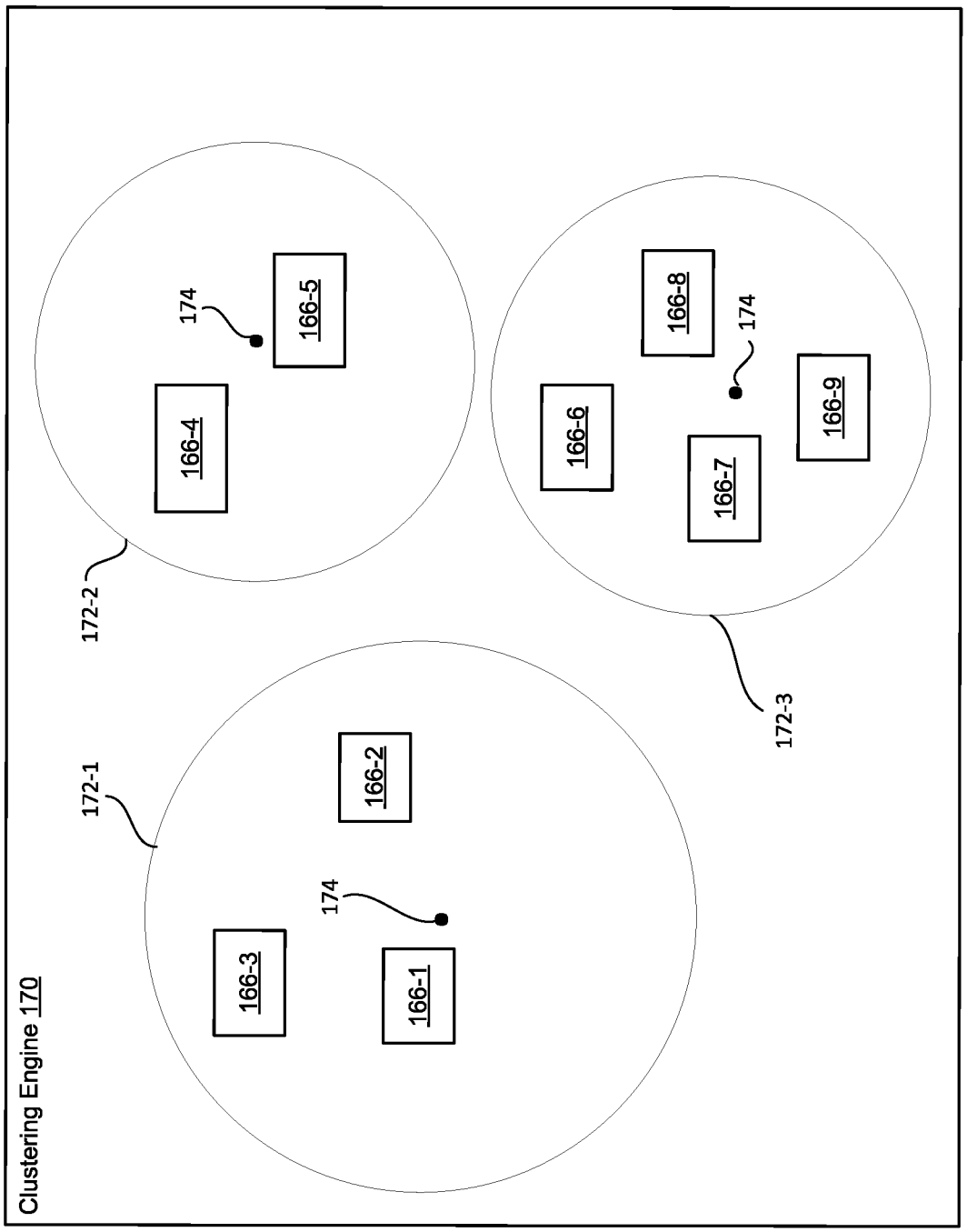
FIG. 1G illustrates a clustering engine according to an aspect.
Figure 1H:
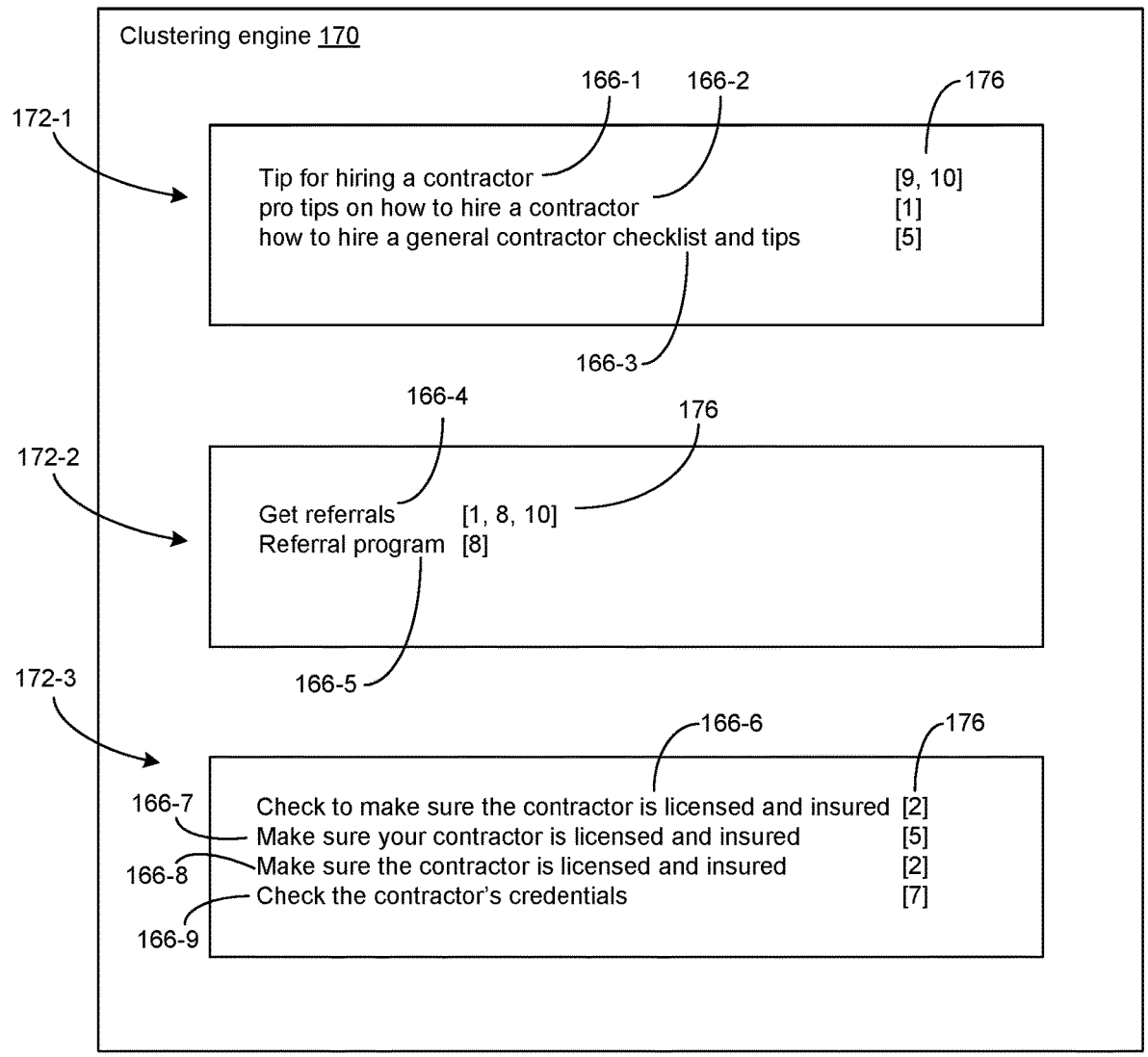
FIG. 1H illustrates the clustering engine according to another aspect.

FIGS. 1G and 1H illustrate aspects of the clustering engine 170. As shown in FIGS. 1G and 1H, the clustering engine 170 may detect a cluster group 172-1, a cluster group 172-2, and a cluster group 172-3. Although three cluster groups 172 are shown in these figures, the clustering engine 170 may detect any number of cluster groups 172 including a single cluster group 172 or any number of cluster groups 172 greater than three. The cluster group 172-1 may correspond to the theme 130a, the cluster group 172-2 may correspond to the theme 130b, and the cluster groups 172-3 may correspond to the theme 130c. The cluster group 172-1 may include a summary description 166-1, a summary description 166-2, and a summary description 166-2, which may correspond to passages 145 from multiple different responsive documents 126. The cluster group 172-2 may include a summary description 166-4 and a summary description 166-5. The cluster group 172-3 may include a summary description 166-6, a summary description 166-7, a summary description 166-8, and a summary description 166-9.

Each cluster group 172 may include result data 176 that identifies which responsive document 126 mentions a respective summary description 166. For example, the result data 176 for the cluster group 172-1 may identify that the summary description 166-1 corresponds to passages 145 on responsive documents [9] and [10], the summary description 166-2 corresponds to a passage 145 on responsive document [1], and the summary description 166-3 corresponds to a passage 145 on responsive document [5]. The result data 176 for the cluster group 172-2 may identify that the summary description 166-4 corresponds to passages 145 on responsive documents [1], [8], and the summary description 166-5 corresponds to a passage 145 on responsive document [8]. The result data 176 for the cluster group 172-3 may identify that the summary description 166-6 corresponds to a passage 145 on responsive document [2], the summary description 166-7 corresponds to a passage 145 on responsive document [5], the summary description 166-8 corresponds to a passage 145 on responsive document [2], and the summary description 166-9 corresponds to a passage 145 on responsive document [7].

The clustering engine 170 may generate a theme 130 based on information from a respective cluster group 172. In some examples, the clustering engine 170 may identify the summary description 166 that is closest to the centroid 174 of a cluster group 172 as the theme 130 for that cluster group 172. For cluster group 172-1, the clustering engine 170 may use the summary description 166-3 as the phrase 132 for the theme 130a. For cluster group 172-2, the clustering engine 170 may use the summary description 166-4 as the phrase 132 for the theme 130b. For cluster group 172-3, the clustering engine 170 may use the summary description 166-6 as the phrase for the theme 130a. In some examples, the clustering engine 170 may identify a summary description 166 within a cluster group 172 that has the highest similarity score as the theme 130 for that cluster group 172.

Figure 1I:
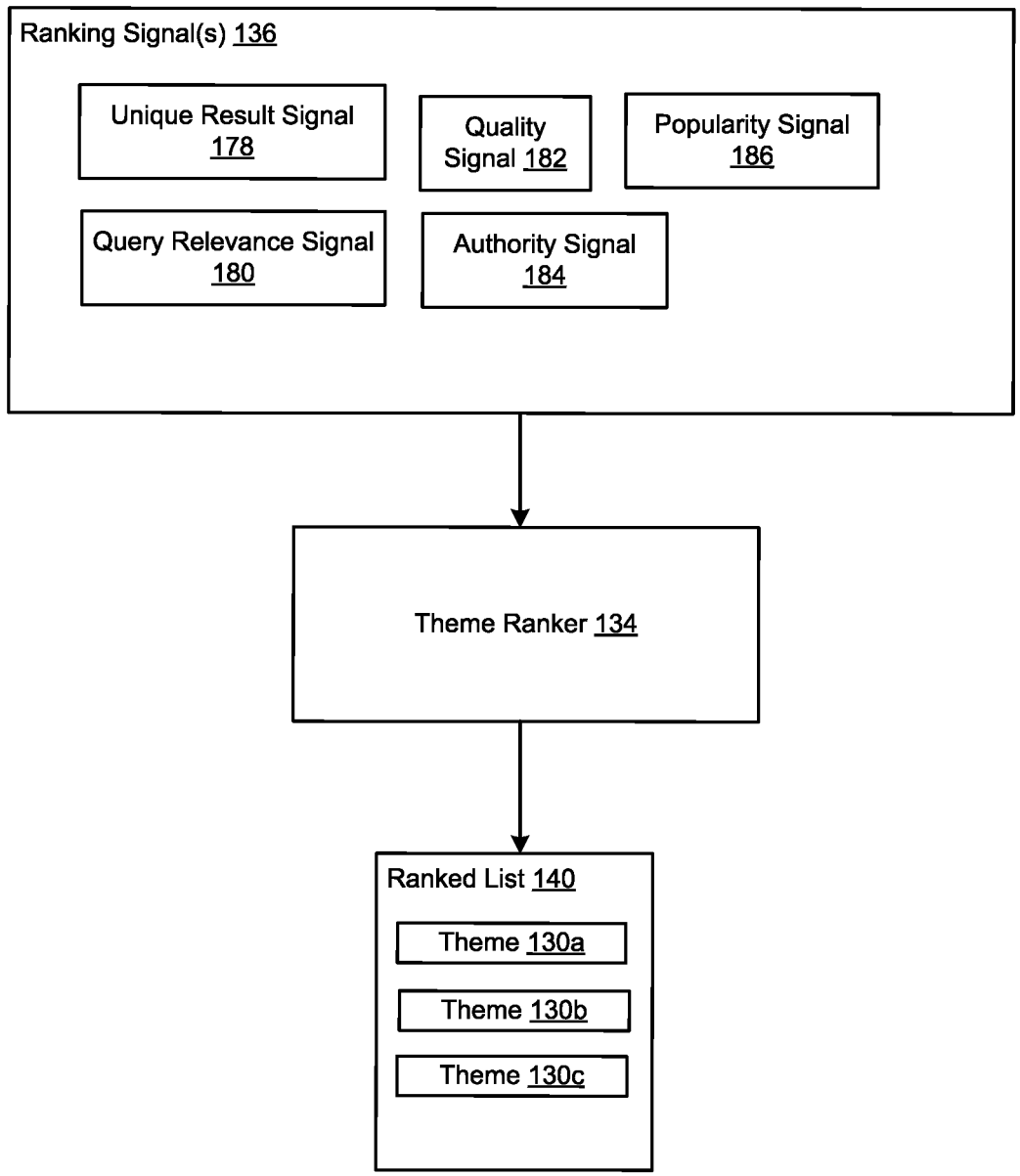
FIG. 1I illustrates a ranking engine according to an aspect.

As shown in FIG. 1I, the theme ranker 134 may rank the themes 130 according to one or more ranking signals 136 to generate a ranked list 140 of themes 130. The ranked list 140 may determine the display order of the themes 130 (e.g., the highest ranked theme 130 is displayed first followed by the next ranked theme 130 and so forth). In some examples, the ranking signal(s) 136 includes one or more signals relating to prominence. In some examples, the ranking signal(s) 136 includes a unique result signal 178 that represents the number of distinct responsive documents 126 from the set 124 that mention a respective theme 130. In some examples, mentioning a respective theme 130 may mean a passage from the responsive document 126 being included in a cluster group 172. In some examples, the theme ranker 134 may use the result data 176 from each of the cluster groups 172 to determine the number of distinct responsive documents 126. In the examples of FIGS. 1I and 1H, the theme ranker 134 may select the cluster group 172-1 as the cluster group 172 with the highest rank because the cluster group 172-1 has more distinct responsive documents that mention the theme 130a (e.g., five results support cluster group 172-1). In some examples, the ranking signal(s) 136 may include a query relevance signal 180, a quality signal 182, an authority signal 184, and a popularity signal 186. In some examples, the ranking signal(s) 136 may include one or more signals used by the search engine 104 (e.g., signals relating to quality, uniqueness of content, backlinks, user experience, social signals (e.g., popularity), relevance, authoritative, the use of keywords, and/or freshness of content).

Figure 1J:
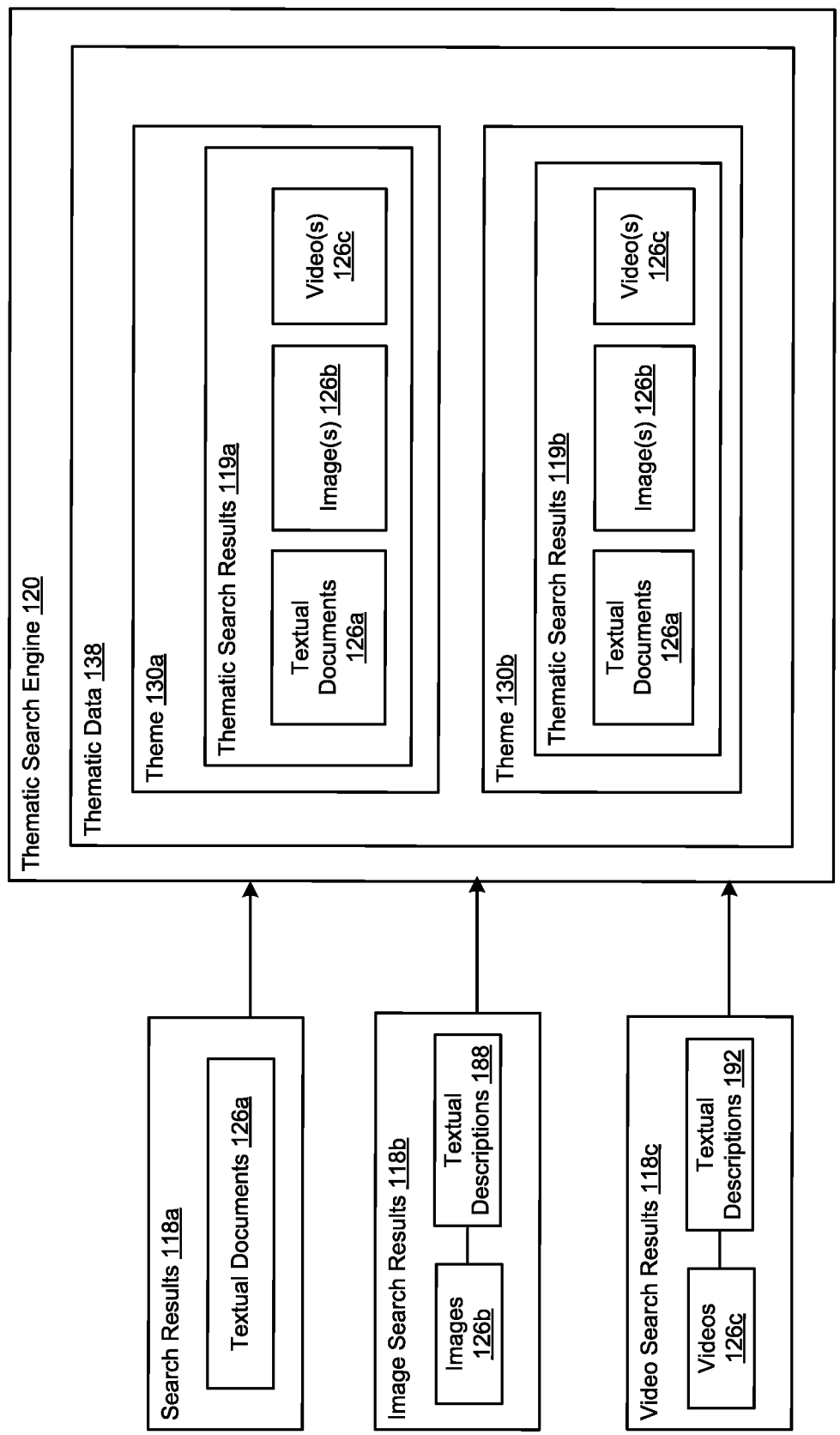
FIG. 1J illustrates a thematic search engine according to an aspect.

As shown in FIG. 1J, the thematic search engine 120 can be configured to generate themes 130 from multiple modalities, e.g., images, text, and videos. It is noted that the term responsive document 126 (or document or web document) may cover textual documents 126a (e.g., webpages, PDFs, etc.), images 126b, and/or videos 126c. In response to a search query 142, the search engine 104 may obtain search results 118a for textual documents 126a, image search results 118b for images 126b, and video search results 118c for videos 126c. The thematic search engine 120 may generate the themes 130 using the search results 118a, the image search results 118b, and the video search results 118c.

The summary generator 164 may generate summary descriptions 166 for the passages 145 in the textual documents 126a. In some examples, the summary generator 164 may obtain textual descriptions 188 associated with the images 126b from the image search results 118b and generate a summary description 166 for each image 126b based on a corresponding textual description 188. In some examples, a textual description 188 is considered another instance of a passage 145. The textual description 188 may include image metadata (e.g., image title, description, tags, etc.) associated with the image 126b and/or image content from an image-to-text model configured to visually analyze the visual content of an image 126b and generate the image content that identifies features of the image 126b.

In some examples, the summary generator 164 may obtain textual descriptions 192 associated with the videos 126c from the video search results 118c and generate a summary description 166 for each video 126c based on a corresponding textual description 192. In some examples, a textual description 192 is considered another instance of a passage 145. The textual description 192 may include video metadata (e.g., video title, description, tags, etc.) associated with the video 126c, closed caption data, information from video timed anchors, video content from a video-to-text model configured to visually analyze the visual content of a video 126c and generate the video content that identifies features of the video 126c, and/or audio content from an audio-to-text model configured to analyze the audio to identify features of the video 126c. The clustering engine 170 is configured to cluster the summary descriptions 166 from the textual documents 126a, the images 126b, and/or the videos 126c (as previously described) to generate the themes 130.

The thematic data 138 may cause the browser application 154 to display the thematic data 138 (e.g., the themes 130 and thematic search results 119), which may include textual documents 126a, images 126b, and/or video(s) 126c. As shown in FIG. 1J, the thematic data 138 includes a theme 130a and thematic search results 119a associated with the theme 130a. The thematic search results 119a may include search results relating to the textual documents 126a, the images 126b, and/or the videos 126c. The thematic search results 119b may include search results relating to the textual documents 126a, the images 126b, and/or the videos 126c. In some examples, the thumbnails of the image(s) 126b and/or the video(s) 126c may be displayed.

Figure 1K:
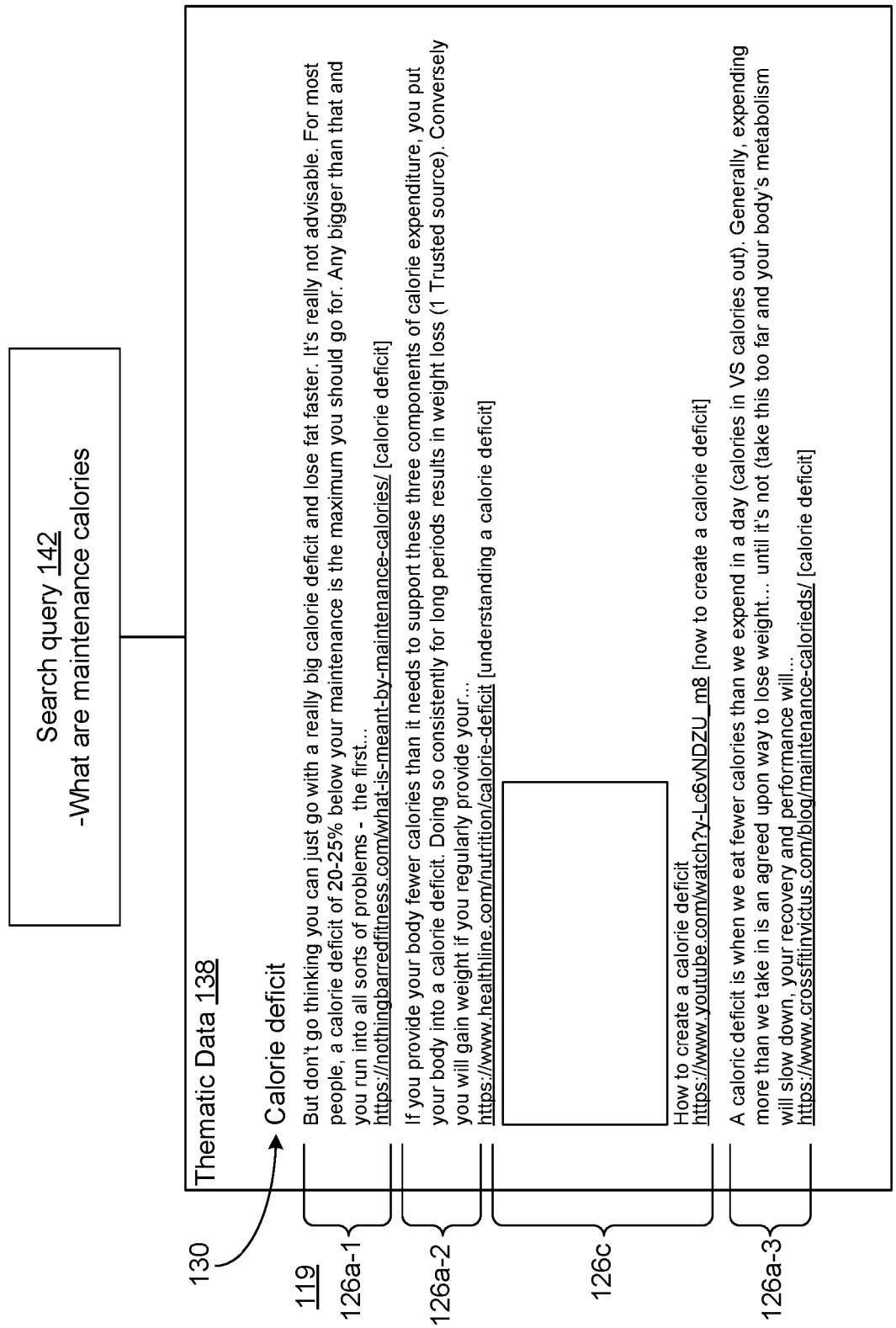
FIG. 1K illustrates an example of thematic data generated by a thematic search engine according to an aspect.

FIG. 1K depicts a display of thematic data 138 with search results 119 that includes textual documents 126a and a video 126c. For example, in response to a search query 142 ("What are maintenance calories"), the thematic search engine 120 may generate a theme 130 ("calorie deficit") and identify supporting thematic search results 119. The thematic search results 119 in FIG. 1K may reference a textual document 126a-1, a textual document 126a-2, a video 126c, and a textual document 126a-3.

FIG. 1L depicts a display of thematic data 138 with search results 119 that includes textual documents 126a and videos 126c. For example, in response to a search query 142 ("CSS align div content vertical center"), the thematic search engine 120 may generate a theme 130a ("flexbox"), identify the supporting thematic search results 119a associated with the theme 130a, generate a theme 130b ("position absolute"), and identify the supporting thematic search results 119b associated with the theme 130b. The thematic search results 119a in FIG. 1L may reference a textual document 126a-1, a textual document 126a-2, a textual document 126a-3, and a video 126c-1. The thematic search results 119b in FIG. 1L may reference a textual document 126a-4, a textual document 126a-5, a video 126c-2, and a textual document 126a-6.

Figure 1M:
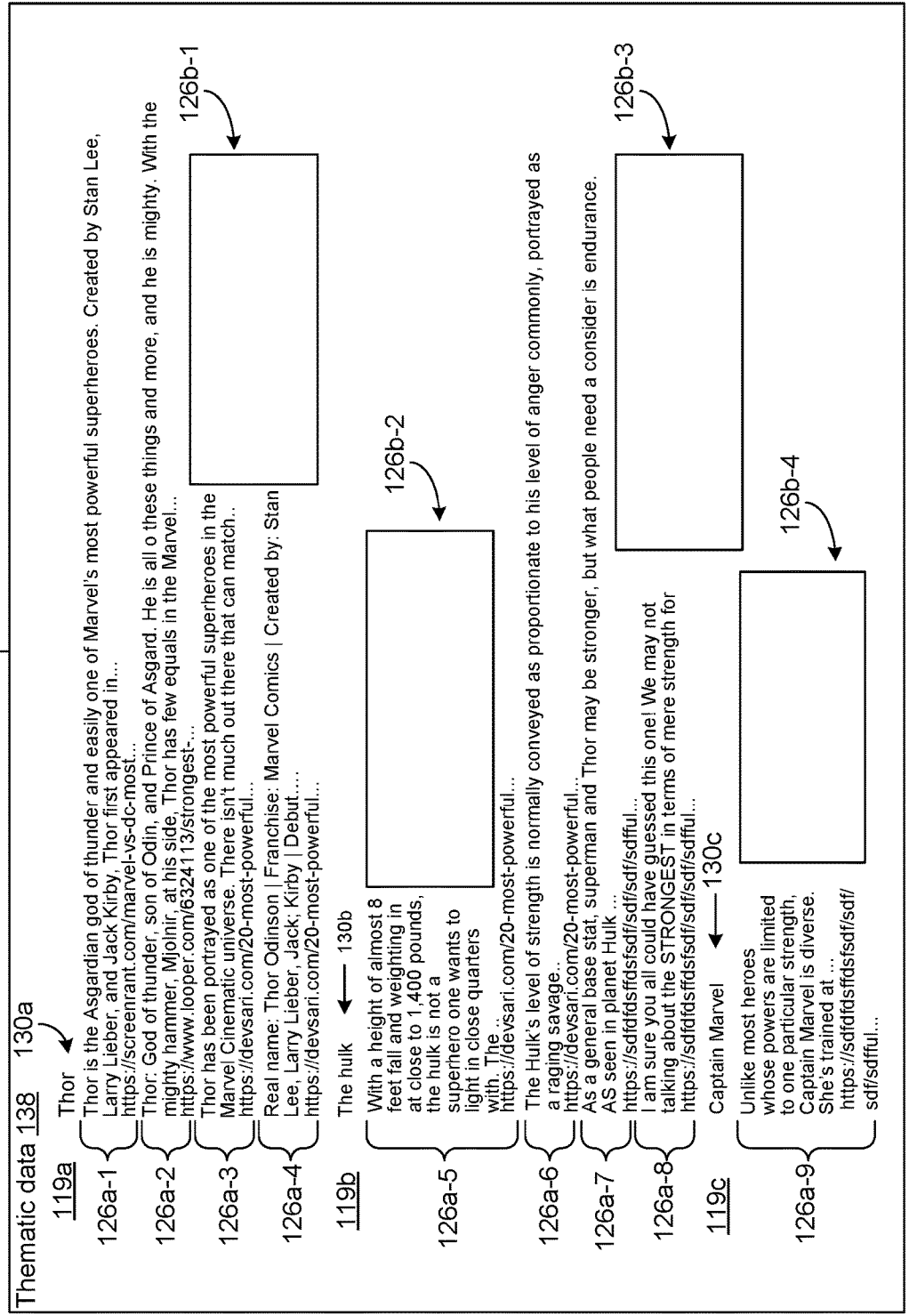
FIG. 1M illustrates an example of thematic data generated by a thematic search engine according to another aspect.

FIG. 1M depicts a display of thematic data 138 with search results 119 that includes textual documents 126a and images 126b. For example, in response to a search query 142 ("most powerful superhero"), the thematic search engine

120 may generate a theme 130*a* ("Thor"), identifying supporting thematic search results 119*a* associated with the theme 130*a*, generate a theme 130*b* ("the Hulk"), identify supporting thematic search results 119*b* associated with the theme 130*b*, generate a theme 130*c* ("Captain Marvel"), and identify supporting thematic search results 119*c*. The thematic search results 119*a* in FIG. 1M may reference a textual document 126*a*-1, a textual document 126*a*-2, a textual document 126*a*-3, a textual document 126*a*-4, and an image 126*b*-1. The thematic search results 119*b* in FIG. 1M may reference a textual document 126*a*-5, a textual document 126*a*-6, a textual document 126*a*-7, a textual document 126*a*-8, an image 126*b*-2, and an image 126*b*-3. The thematic search results 119*c* in FIG. 1M may reference a textual document 126*a*-9 and an image 126*b*-4.

Referring back to FIG. 1A, the server computer 102 may be computing devices that take the form of a number of different devices, for example a standard server, a group of such servers, or a rack server system. In some examples, the server computer(s) 102 may be a single system sharing components such as processors and memories. In some examples, the server computer(s) 102 may be multiple systems that do not share processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections.

The server computer(s) 102 may include one or more processors 101 formed in a substrate, an operating system (not shown) and one or more memory devices 103. The processor(s) 101 are configured to execute one or more machine executable instructions or pieces of software, firmware, or a combination thereof. The processor(s) 101 can be semiconductor-based—that is, the processors can include semiconductor material that can perform digital logic. The memory devices 103 may represent any kind of (or multiple kinds of) memory (e.g., RAM, flash, cache, disk, tape, etc.). The memory device(s) 103 may include any type of storage device (e.g., a non-transitory computer-readable medium) that stores information in a format that can be read and/or executed by the processor(s) 101. In some examples (not shown), the memory devices 103 may include external storage, e.g., memory physically remote from but accessible by the server computer(s) 102. The server computer(s) 102 may include one or more modules or engines representing specially programmed software.

The client device 152 may be a personal computer, a mobile phone, a tablet, a laptop, a wearable device (e.g., AR/VR device), a smart television, or the like. The client device 152 may include one or more processors 151 formed in a substrate configured to execute one or more machine executable instructions or pieces of software, firmware, or a combination thereof. The processor(s) 151 can be semiconductor-based—that is, the processors can include semiconductor material that can perform digital logic. The client device 152 can also include one or more memory devices 153. The memory device(s) 153, for example, a main memory, may be configured to store one or more pieces of data, either temporarily, permanently, semi-permanently, or a combination thereof. The memory device(s) 153 may include any type of storage device that stores information in a format that can be read and/or executed by one or more processors 151. The memory device(s) 153 may store applications (e.g., browser application 154), modules and/or engines that, when executed by the processor(s) 151, perform certain operations. In some implementations, the applications, modules, or engines, may be stored in an external storage device and loaded into the memory device(s) 153.

In some examples, as shown in FIG. 1A, the search engine 104 and the thematic search engine 120 may be executable by the server computer(s) 102. In some examples, the thematic search engine 120 is a subcomponent of the search engine 104. In some examples, the thematic search engine 120 is a software component that is separate from the search engine 104. In some examples, the search engine 104 and the thematic search engine 120 may be executable by the client device 152. In some examples, portions of the search engine 104 and the thematic search engine 120 may be executable by the server computer(s) 102 and portions of the search engine 104 and the thematic search engine 120 may be executable by the client device 152.

The client device 152 may include one or more input devices, such as touch screen, keyboard, mouse, pointer, a microphone, a camera, one or more physical buttons, etc. The input devices may initiate input events, such as scrolling, link selection, cursor movement, which can be received and analyzed by the browser application 154. The client device 152 may also include communications devices operable to send and receive data from other computing devices, such as another client, servers, search engine 104, thematic search engine 120, etc., over one or more networks, such as network 150.

The operating system 155 is a system software that manages computer hardware, software resources, and provides common services for computing programs. In some examples, the operating system 155 is an operating system designed for a larger display such as a laptop or desktop (e.g., sometimes referred to as a desktop operating system). In some examples, the operating system 155 is an operating system for a smaller display such as a tablet or a smartphone (e.g., sometimes referred to as a mobile operating system).

The browser application 154 may be a web browser configured to access information on the Internet. The browser application 154 may include or be associated with the search engine 104. In some examples, the browser application 154 is a separate application from the operating system 155 of the client device 152, where the browser application 154 is installable on (and executable by) the operating system 155. In some examples, the browser application 154 is the device's operating system 155 (or included as part of the device's operating system 155). The browser application 154 may launch one or more browser tabs in the context of one or more browser windows on a display of the client device 152.

Figure 2:
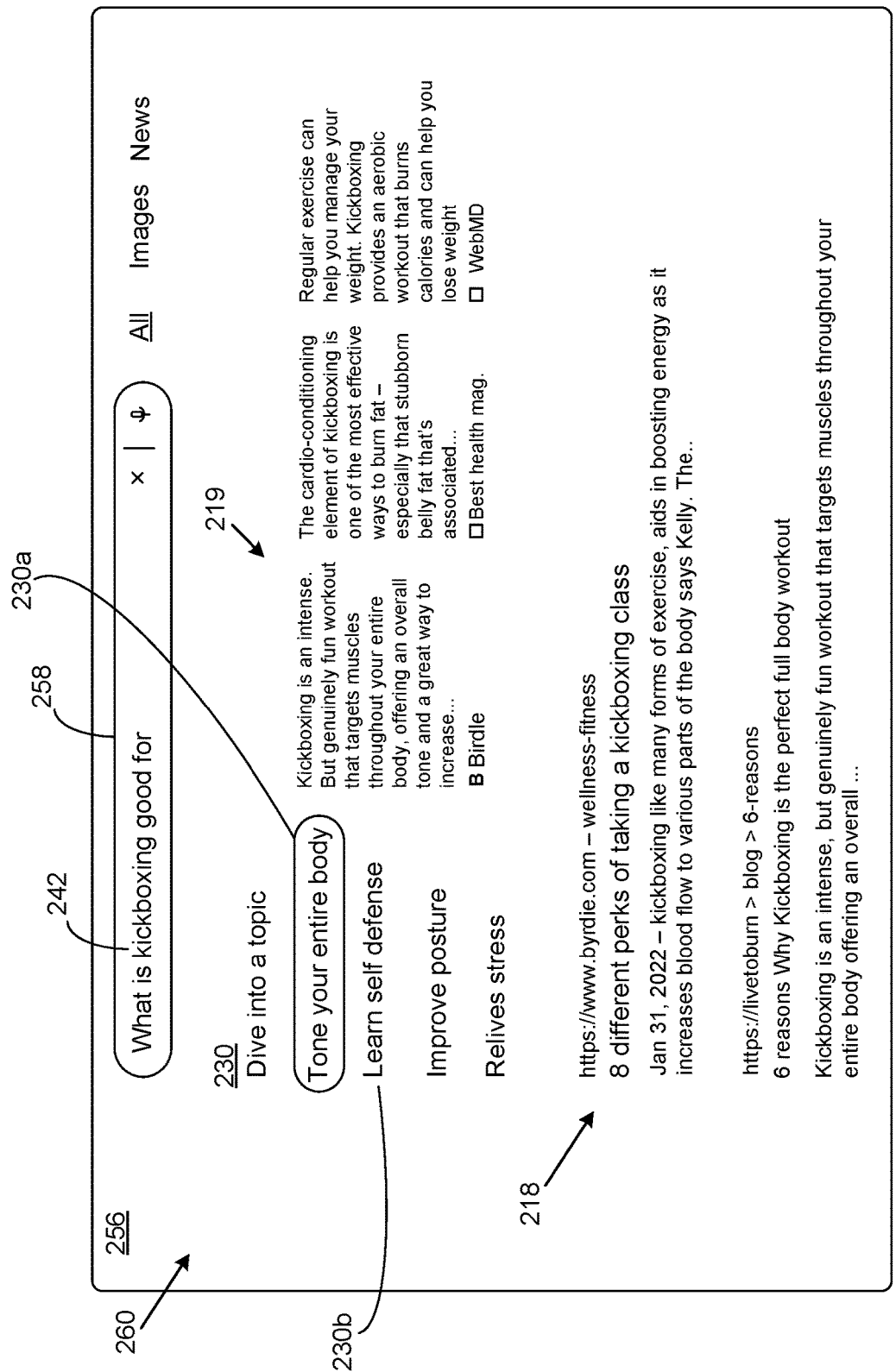
FIG. 2 illustrates an example of a user interface for displaying themes and/or thematic search results according to an aspect.

FIG. 2 illustrates an example of a user interface 256 of a browser application that displays themes 230 and thematic search results 219 in a search results page 260. In some examples, the user interface 256 is a browser tab of the browser application. The user interface 256 may be an example of the user interface 156 of FIGS. 1A through 1M and may include any of the details discussed with reference to the search system 100 of FIGS. 1A through 1M.

In response to a search query 242 entered via a search field 258, the search results page 260 may display a plurality of themes 230 (including theme 230*a* and theme 230*b*) found in the search results 218 responsive to the search query 242. In some examples, the themes 230 are grouped together and displayed under the search field 258. In some examples, the themes 230 are displayed as a vertical list. In response to selection of the theme 230a, the search results page 260 may display the thematic search results 219 that correspond to the theme 230a. The search results page 260 may also display the search results 218 obtained by a search engine. In some examples, the search results 218 are displayed after the themes 230 and the thematic search results 219. In some examples, the thematic search results 219 are displayed as a horizontal list, where each thematic search result 219 identifies a passage and a source of the underlying responsive document. In response to selection of the theme 230a, the search results page 260 may be updated to display the thematic search results 219 that correspond to the theme 230b.

Figure 3A:
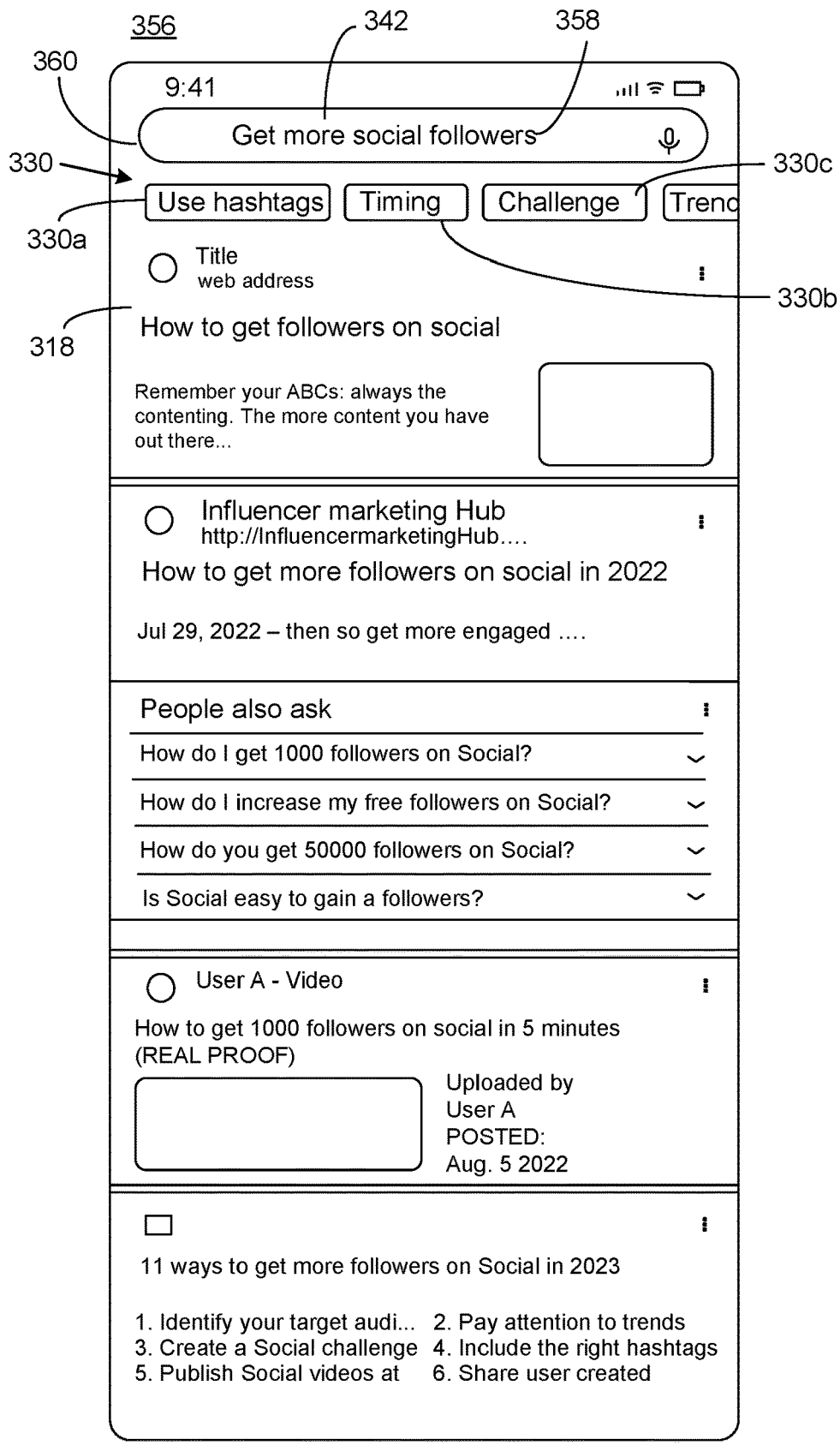
FIGS. 3A and 3B illustrate an example of a user interface for displaying themes and/or thematic search results according to another aspect.
Figure 3B:
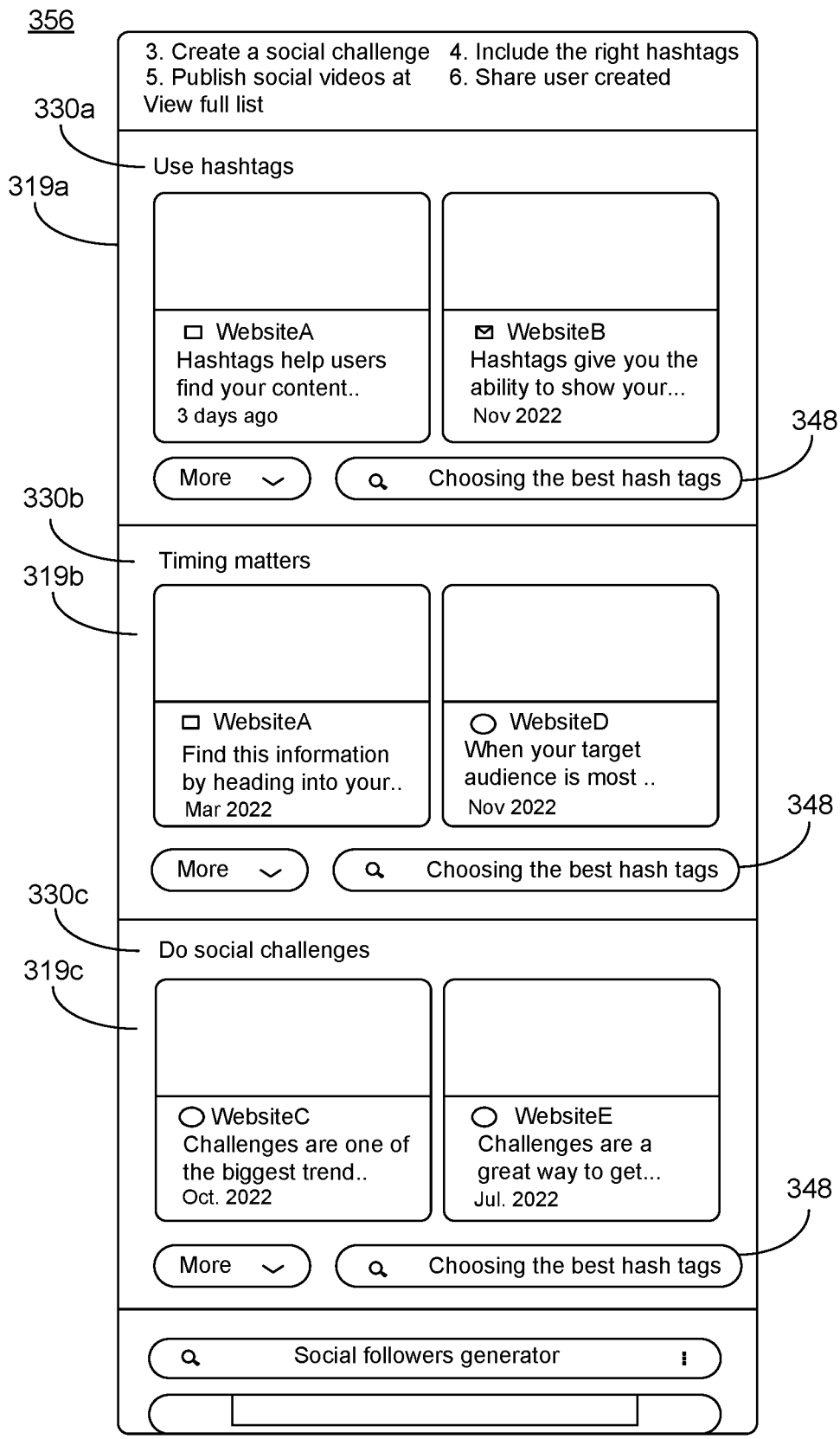

FIGS. 3A and 3B illustrate an example of a user interface 356 of a browser application that displays themes 330 and thematic search results (e.g., 319a, 319b, 319c) in a search results page 360. The user interface 356 of FIG. 3B may be a continuation of the user interface 356 of FIG. 3A. In some examples, the user interface 356 is a browser tab of the browser application. The user interface 356 may be an example of the user interface 156 of FIGS. 1A through 1M and may include any of the details discussed with reference to the search system 100 of FIGS. 1A through 1M.

In response to a search query 342 entered via a search field 358, the search results 330c) found in the search results 318 responsive to the search query 342. In some examples, the themes 330 are grouped together and displayed under the search field 358. In some examples, the themes 330 are displayed as a horizontal list. In some examples, the horizontal list includes a shortened version of the theme's phrase (e.g., FIG. 3A), but the search results page 360 may identify a longer version of the theme's phrase (e.g., FIG. 3B) with respect to its thematic search results. In some examples, at least a portion of the search results 318 are displayed after the themes 330, and the thematic search results are displayed after the portion of the search results 318. In response to selection of the theme 330a, the browser application may navigate (e.g., move) the search results page 360 to the thematic search results 319a. In response to selection of the theme 330a, the browser application may navigate (e.g., move) the search results page 360 to the thematic search results 319b. In some examples, the user may scroll the search results page 360 to view thematic search results 319a, 319b, and 319c. In some examples, each of the thematic search results 319a, 319b, and 319c may include one or more query suggestions 348 related to a respective theme of the themes 330. In some examples, the query suggestions 348 included within a respective thematic search results are generated by the thematic search engine 120 of FIGS. 1A through 1M.

FIGS. 4A through 4C illustrate an example of a user interface 456 of a browser application that displays themes (e.g., 430a, 430b) and thematic search results (e.g., 419a, 419b) in a search results page 460. The user interface 456 of FIG. 4B may be a continuation of the user interface 456 of FIG. 4A and the user interface 456 of FIG. 4C may be a continuation of the user interface 456 of FIG. 4B. In some examples, the user interface 456 is a browser tab of the browser application. The user interface 456 may be an example of the user interface 156 of FIGS. 1A through 1M and may include any of the details discussed with reference to the search system 100 of FIGS. 1A through 1M.

In response to a search query 442 entered via a search field 458, the search results page 460 may display the search results 418 obtained from a search engine, a theme 430a with thematic search results 419a, and a theme 430b with thematic search results 419b. In some examples, the search results page 460 does not display a grouping of the themes under the search field 458, but rather the user may navigate beyond the search results 418 to the themes and associated thematic search results. In some examples, each of the thematic search results 419a, 419b, one or more query suggestions 448 related to a respective theme.

Figure 5:
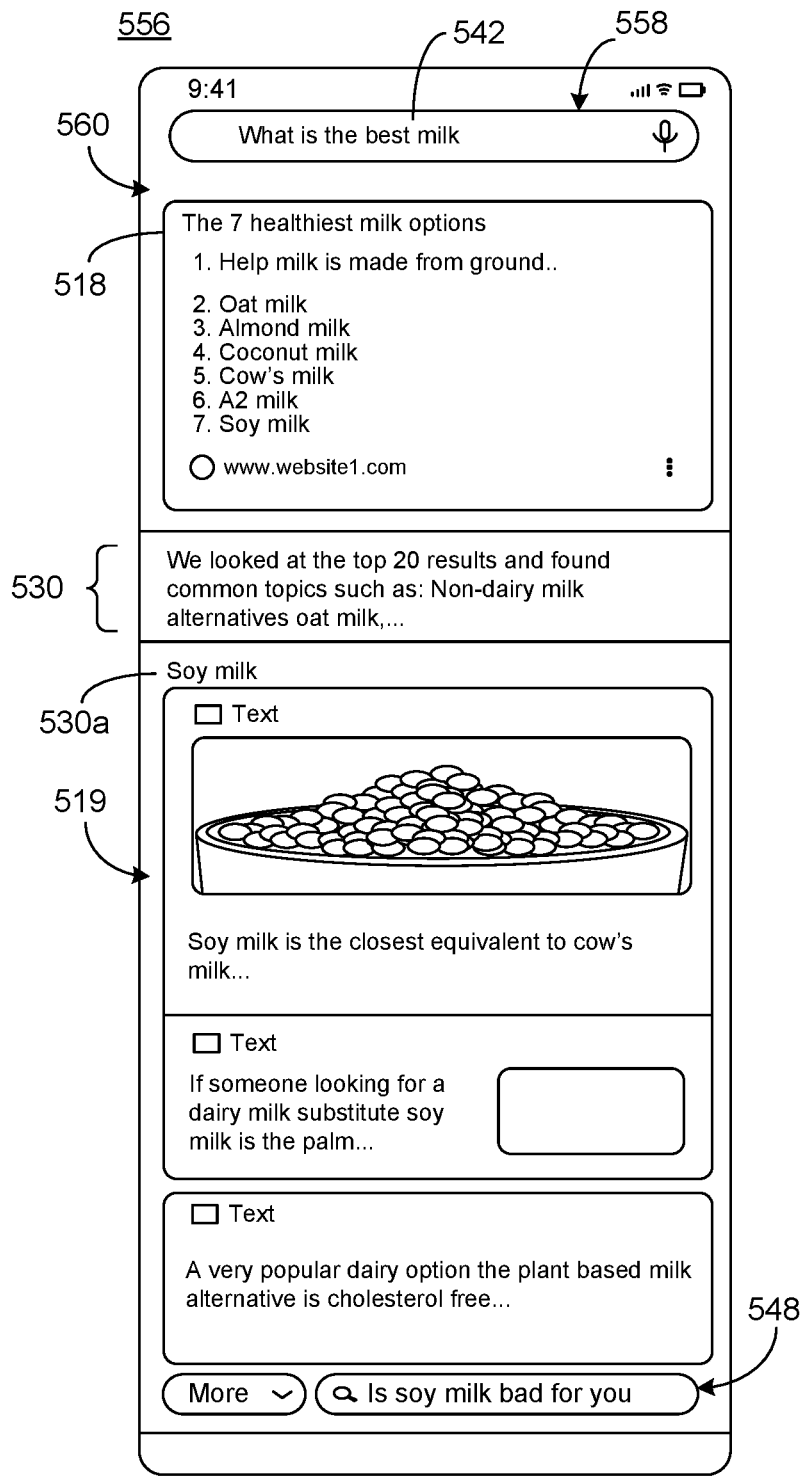
FIG. 5 illustrates an example of a user interface for displaying themes and/or thematic search results according to another aspect.

FIG. 5 illustrates an example of a user interface 556 of a browser application that displays themes 530 and thematic search results (e.g., 530a) in a search results page 560. In some examples, the user interface 556 is a browser tab of the browser application. The user interface 556 may be an example of the user interface 156 of FIGS. 1A through 1M and may include any of the details discussed with reference to the search system 100 of FIGS. 1A through 1M.

In response to a search query 542 entered via a search field 558, the search results page 560 may display a search result 518 (e.g., the top search result) obtained from a search engine and themes 530. In some examples, the themes 530 are identified within a description of what was found by the thematic search engine 120 of FIGS. 1A through 1M. In some examples, the themes 530 are displayed on the search results page 560 after a display the search result 518. After the themes 530, each individual theme (e.g., 530a) is displayed along with its corresponding thematic search results 519. In some examples, the thematic search results 519 may include one or more query suggestions 548 related to a respective theme of the themes 530.

Figure 6:
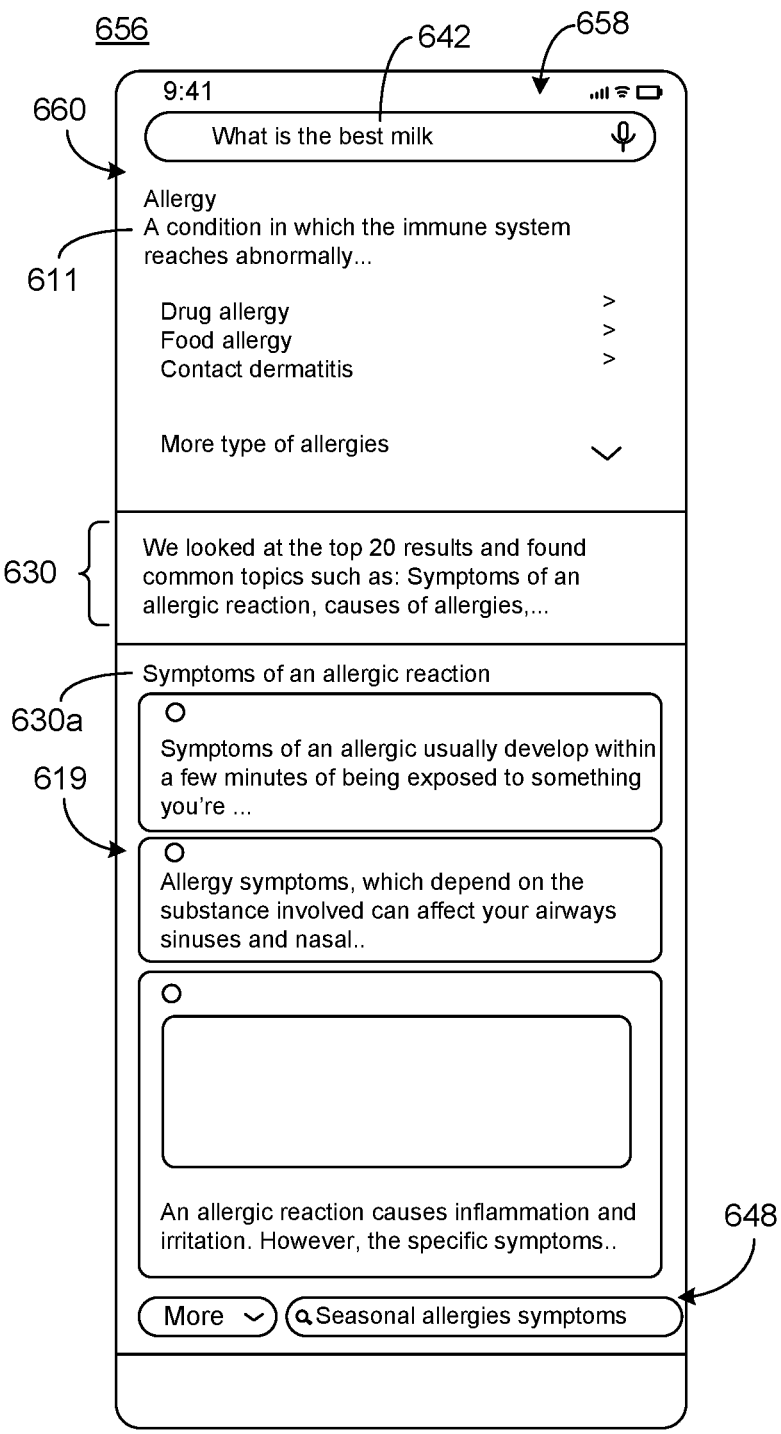
FIG. 6 illustrates an example of a user interface for displaying themes and/or thematic search results according to another aspect.

FIG. 6 illustrates an example of a user interface 656 of a browser application that displays themes 630 and thematic search results 619 in a search results page 660. In some examples, the user interface 656 is a browser tab of the browser application. The user interface 656 may be an example of the user interface 156 of FIGS. 1A through 1M and may include any of the details discussed with reference to the search system 100 of FIGS. 1A through 1M.

In response to a search query 642 entered via a search field 658, the search results page 660 may display a UI object 611 with information from a knowledge graph (e.g., the knowledge graph 112 of FIG. 1A) related to the search query 642. The search results page 660 also displays a description of the themes 630. In some examples, the themes 630 are identified within a description of what was found by the thematic search engine 120 of FIGS. 1A through 1M. In some examples, the themes 630 are identified after the UI object 611. After the themes 630, each individual theme (e.g., 630a) is displayed along with its corresponding thematic search results 619. In some examples, the thematic search results 619 may include one or more query suggestions 648 related to a respective theme of the themes 630.

Figure 7:
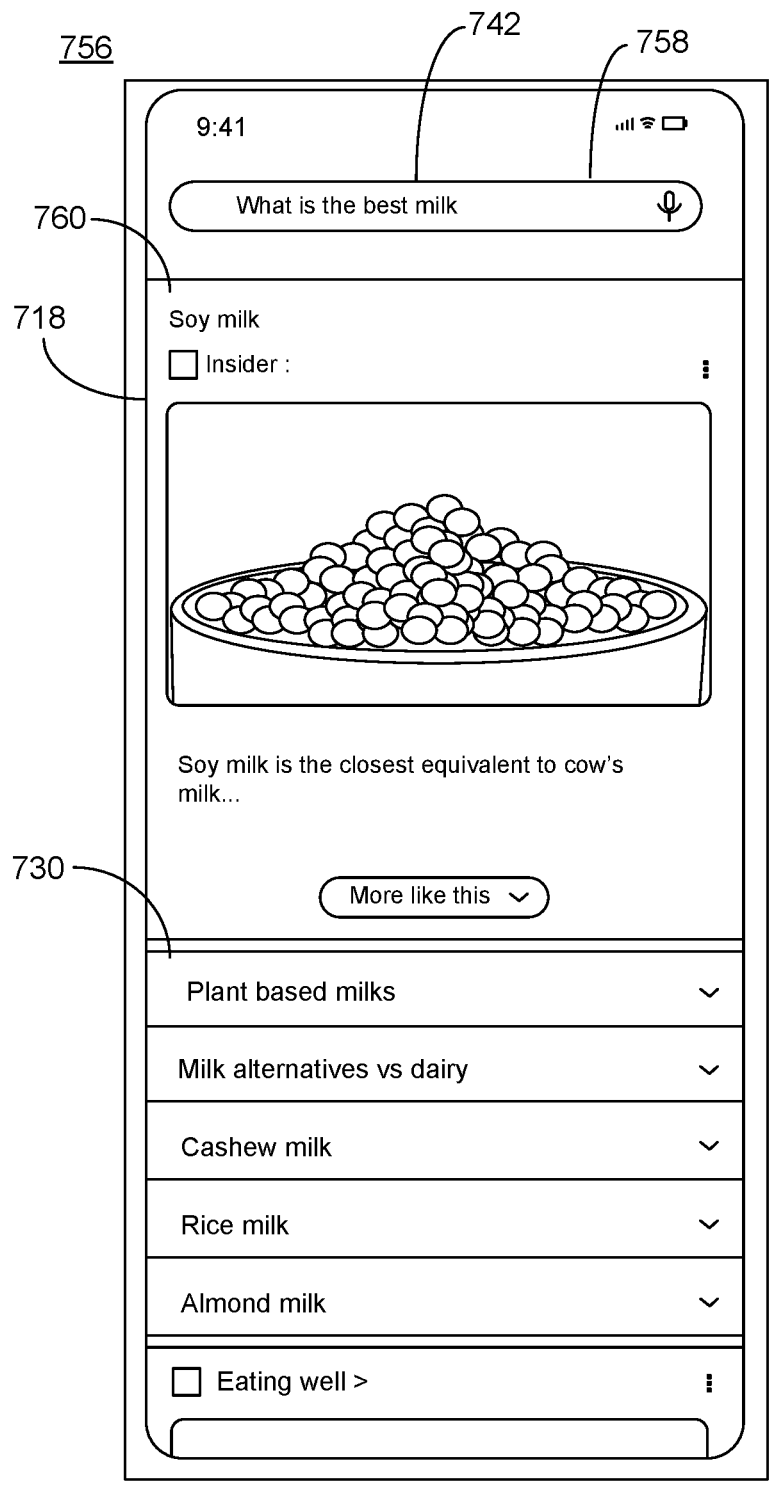
FIG. 7 illustrates an example of a user interface for displaying themes and/or thematic search results according to another aspect.

FIG. 7 illustrates an example of a user interface 756 of a browser application that displays themes 730 as selectable UI cards in a search results page 760. In some examples, the user interface 756 is a browser tab of the browser application. The user interface 756 may be an example of the user interface 156 of FIGS. 1A through 1M and may include any of the details discussed with reference to the search system 100 of FIGS. 1A through 1M. In response to a search query 742 entered via a search field 758, the search results page 760 may display a search result 718 (e.g., the top search result) obtained from a search engine. Also, the search results card may correspond to a separate theme of the themes 730. In response to selection of a particular selectable UI card, the selectable UI card may expand to display the thematic results associated with a corresponding theme.

FIGS. 8A through 8D illustrate various examples of displaying themes 830 and thematic search results 819. FIG. 8A illustrates an example of a user interface 856a of a browser application that displays themes 830 (e.g., theme 830*a*, theme 830*b*) with thematic search results 819 as a scrollable feed in a search results page 860. In some examples, the user interface 856*a* is a browser tab of the browser application. The user interface 856*a* may be an example of the user interface 156 of FIGS. 1A through 1M and may include any of the details discussed with reference to the search system 100 of FIGS. 1A through 1M.

Referring to FIG. 8A, in response to a search query 842 entered via a search field 858, the search results page 860 may display each theme of the themes 830 with its corresponding thematic search results 819 as a scrollable feed, where the user can scroll the search results page 860 to browse through the themes 830 and their associated thematic search results 819. In some examples, the user interface 856*a* may display selectable filters 815, which may be selected, to further refine the search query 842 (thereby re-generating a new search). In some examples, selection of a particular selectable filter of the selectable filters 815 may cause the thematic search engine to re-generate the themes 830 and the thematic search results 819. In some examples, the thematic search results 819 may include one or more query suggestions 848 related to a respective theme.

FIG. 8B illustrates an example of a user interface 856*b* of a browser application that displays themes 830 in a menu object 817 with thematic search results 819 as a scrollable feed in a search results page 860. Referring to FIG. 8B, in response to a search query 842 entered via a search field 858, the search results page 860 may display each theme of the themes 830 with its corresponding thematic search results 819 as a scrollable feed, where the user can scroll the search results page 860 to browse through the themes 830 and their associated thematic search results 819. Also, referring to FIG. 8B, the search results page 860 may display a menu object 817 that lists the themes 830 (e.g., theme 830*a*, theme 830*b*, theme 830*c*) as selectable items. In some examples, the menu object 817 is positioned at the bottom portion of the user interface 856*b*. In response to selection of a particular theme of the themes 830, the browser application may scroll the search results page 860 to the corresponding thematic search results 819. In some examples, the search results page 860 may display selectable filters 815, which may be selected, to further refine the search query 842.

FIG. 8C illustrates an example of a user interface 856*c* of a browser application that displays themes 830 in a menu object 817 that can appear on top of thematic search results 819 in a search results page 860. In response to a search query 842 entered via a search field 858, the search results page 860 may display each theme of the themes 830 with its corresponding thematic search results 819 as a scrollable feed, where the user can scroll the search results page 860 to browse through the themes 830 and their associated thematic search results 819. Also, the search results page 860 may display a menu object 817 on top of the thematic search results 819. In some examples, the user may select a UI element 821 that causes the browser application to display the menu object 817 and hide (e.g., blur out) the thematic search results 819. When displayed, the menu object 817 may list the themes 830 (e.g., theme 830*a*, theme 830*b*, theme 830*c*, theme 830*d*) as selectable items. In response to selection of a particular theme of the themes 830, the browser application may scroll the search results page 860 to the corresponding thematic search results 819 and remove the menu object 817 from the user interface 856*c*.

FIG. 8D illustrates an example of a user interface 856*d* of a browser application that displays themes 830 in a menu object 817 with thematic search results 819 as a scrollable feed in a search results page 860. In some examples, the menu object 817 is positioned above the thematic search results 819. In response to a search query 842 entered via a search field 858, the search results page 860 may display each theme of the themes 830 with its corresponding thematic search results 819 as a scrollable feed, where the user can scroll the search results page 860 to browse through the themes 830 and their associated thematic search results 819. Also, the search results page 860 may display a menu object 817 that lists the themes 830 (e.g., theme 830*a*, theme 830*b*) as selectable items. In some examples, the menu object 817 is positioned between the search field 858 and the thematic search results 819. In response to selection of a particular theme of the themes 830, the browser application may scroll the search results page 860 to the corresponding thematic search results 819.

FIGS. 9A through 9C illustrate an example of a user interface 956 of a browser application that displays themes 930 (e.g., 930*a*, 930*b*, 930*c*) with thematic search results (e.g., 919*a*, 919*b*) as a scrollable feed in a search results page 960. The user interface 956 of FIG. 9B may be a continuation of the user interface 956 of FIG. 9A. In response to selectable of a UI element 927 on FIG. 9B, the browser application may render the user interface 956 of FIG. 9C. In some examples, the user interface 956 is a browser tab of the browser application. The user interface 956 may be an example of the user interface 156 of FIGS. 1A through 1M and may include any of the details discussed with reference to the search system 100 of FIGS. 1A through 1M.

In response to a search query 942 entered via a search field 958, the search results page 960 may display the themes 930 and the thematic search results as a scrollable feed. For example, the search results page 960 may identify a theme 930*a* along with the corresponding thematic search results 919*a*, and then may identify a theme 930*a* along with the corresponding thematic search results 919*b*. In some examples, the thematic search results 919*a* may include an answer module 949 (e.g., the answer module 149 of FIGS. 1A through 1M) that relates to the theme 930*a*. In some examples, the thematic search results 919*a* include one or more query suggestions 948 that is related to the theme 930*a*. In some examples, the thematic search results 919*b* includes one or more query suggestions 948 that is related to the theme 930*b*. In some examples, the thematic search results 919*b* also include a UI element 927, which, when selected, causes the browser information to display additional information about the theme 930*b*, as shown in FIG. 9C, such as the thematic search results 919*b* and an answer module 949 that is related to the theme 930*b*.

Figure 10A:
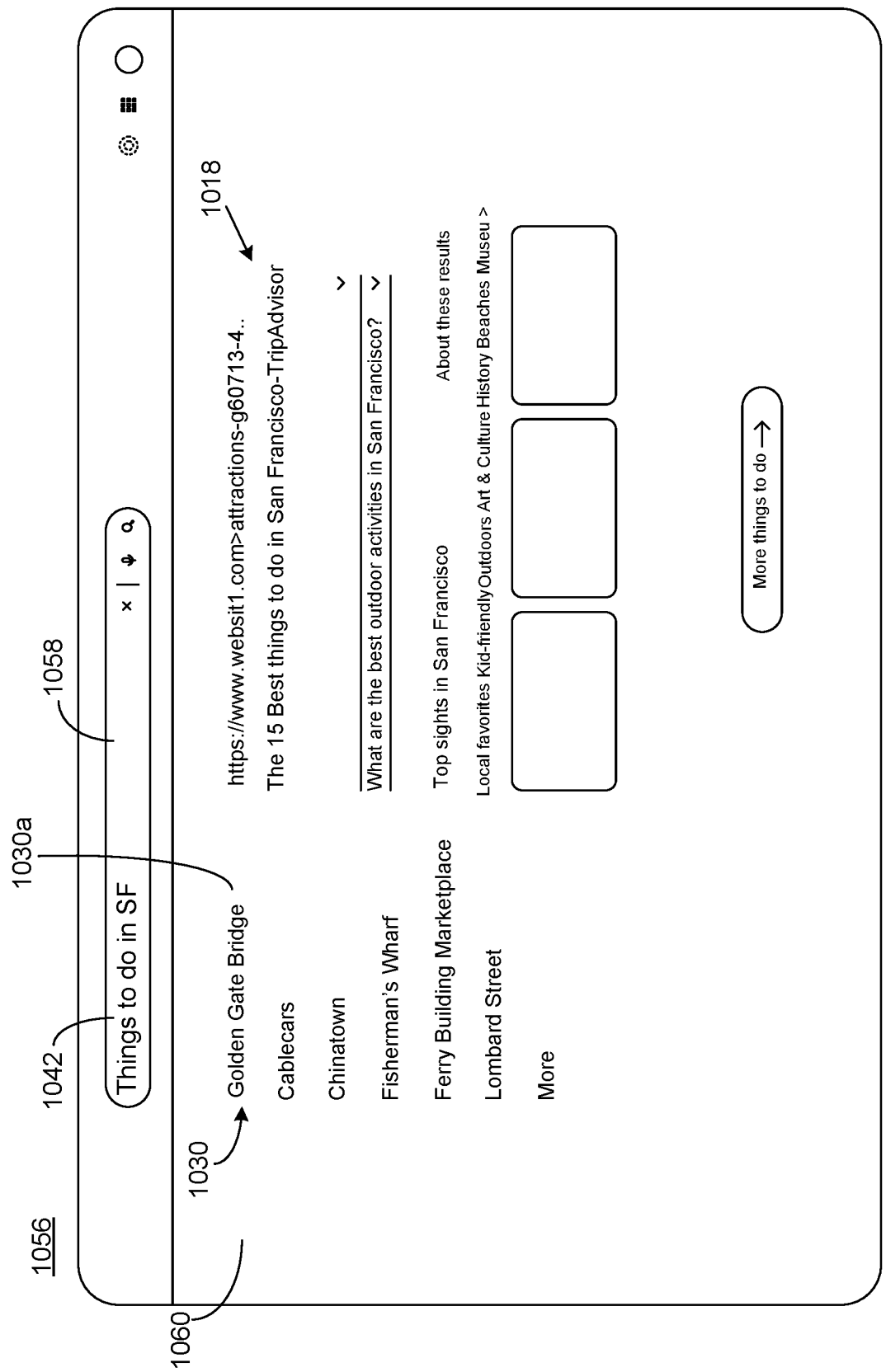
FIGS. 10A and 10B illustrate an example of a user interface for displaying themes and/or thematic search results according to another aspect.
Figure 10B:
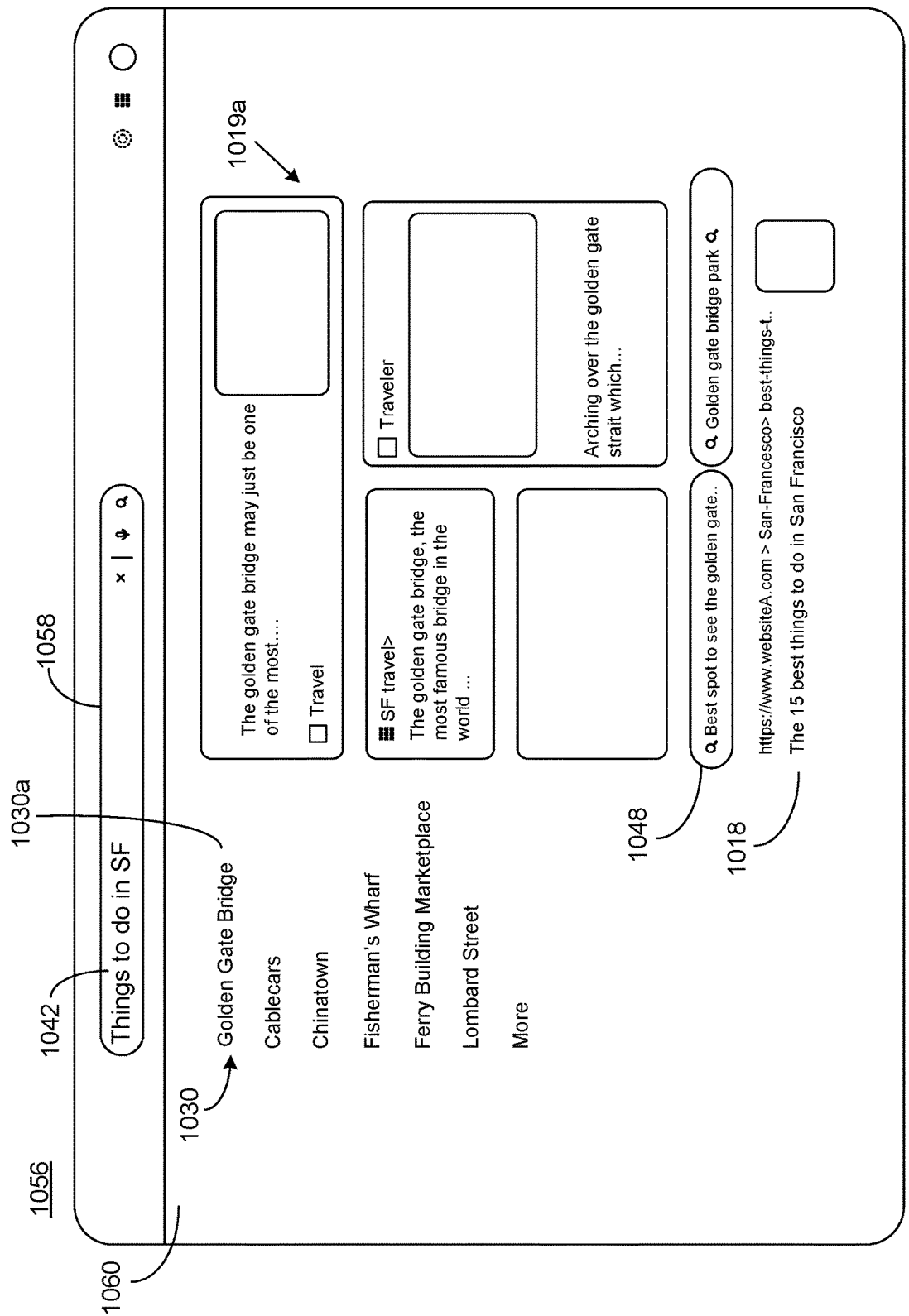

FIGS. 10A and 10B illustrate an example of a user interface 1056 of a browser application. In some examples, the user interface 1056 is a browser tab of the browser application. The user interface 1056 may be an example of the user interface 156 of FIGS. 1A through 1M and may include any of the details discussed with reference to the search system 100 of FIGS. 1A through 1M.

Referring to FIG. 10A, in response to a search query 1042 entered via a search field 1058, a search results page 1060 may display themes 1030 (including theme 1030*a*) as selectable UI elements in a list. Also, the search results page 1060 may display search results 1018 (e.g., the normal search results) obtained by a search engine. As shown in FIG. 10B, in response to selection of a particular theme 130 (e.g., theme 1030*a*), the browser application may update the search results page 1060 to insert thematic search results 1019*a* pertaining to theme 1030*a*. In some examples, the thematic search results 1019*a* may include one or more query suggestions 1048 that are related to the theme 1030*a*. Also, as shown in FIG. 10B, the search results page 1060 may display the search results 1018 after the thematic search results 1019*a*.

FIGS. 11A and 11B illustrate an example of a user interface 1156 of a browser application that displays themes 1130 as selectable UI cards in a search results page 1160. In some examples, the user interface 1156 is a browser tab of the browser application. The user interface 1156 may be an example of the user interface 156 of FIGS. 1A through 1M and may include any of the details discussed with reference to the search system 100 of FIGS. 1A through 1M.

Referring to FIG. 11A, in response to a search query 1142 entered via a search field 1158, a search results page 1160 may display the themes 1130 (e.g., theme 1130*a*, theme 1130*b*, theme 1130*c*) as selectable (e.g., expandable) UI cards. The search results page 1160 may display search results 1118, responsive to the search query 1142, below the selectable UI cards. Each selectable UI card may correspond to a separate theme of the themes 1130. In response to selection of a particular selectable UI card, the selectable UI card may expand to display the thematic results associated with a corresponding theme. For example, in response to selection of the selectable UI card corresponding to the theme 1130*a*, as shown in FIG. 11B, the selection UI card may expand to display thematic search results 1119*a* relating to the theme 1130*a* in the search results page 1160. In some examples, the thematic search results 1119*a* includes one or more query suggestions 1148 relating to the selected theme 1130*a*.

Figures 12A, 12B:
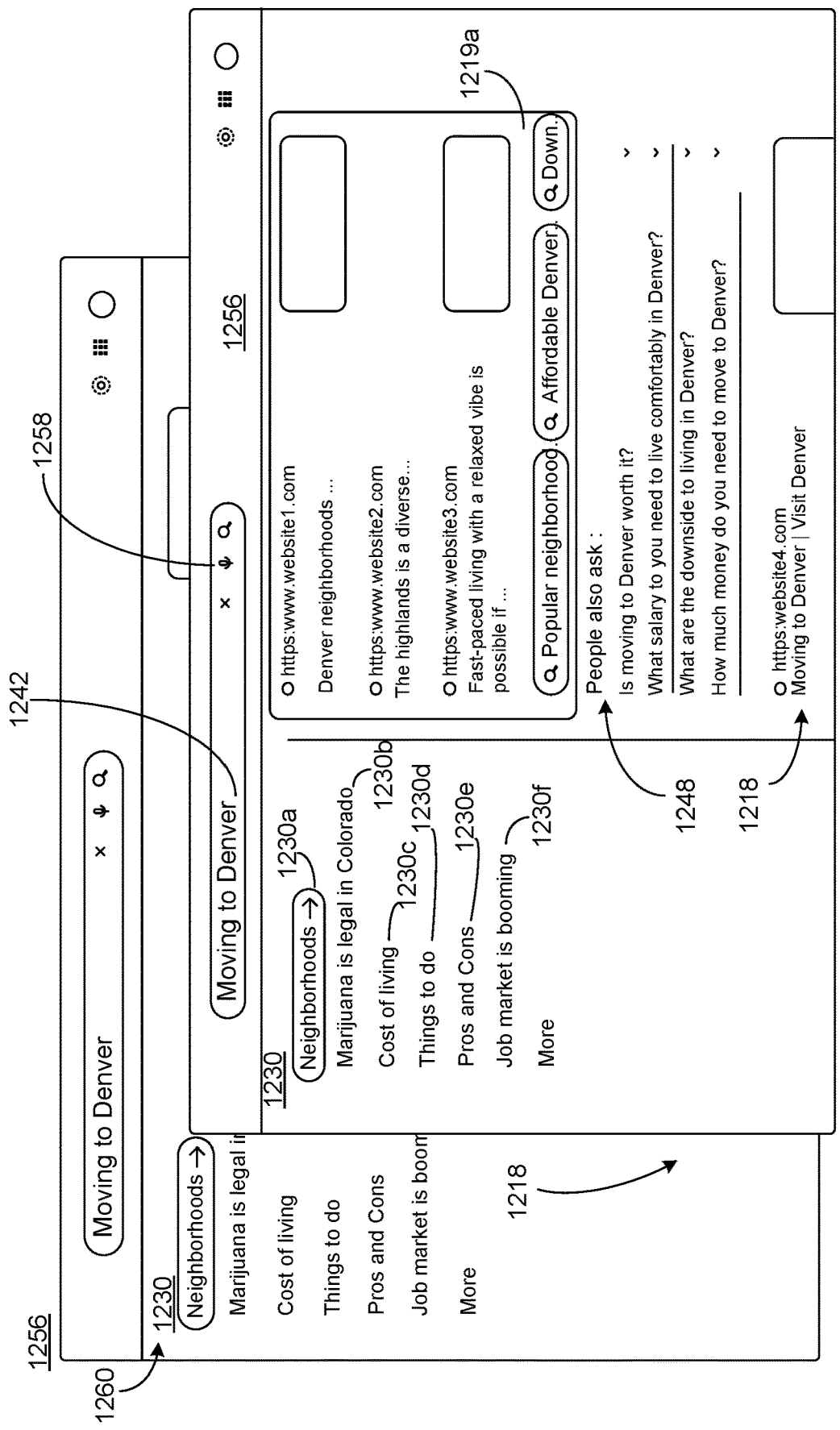
FIGS. 12A and 12B illustrate an example of a user interface for displaying themes and/or thematic search results according to another aspect.

FIGS. 12A and 12B illustrate an example of a user interface 1256 of a browser application that displays themes 1230 as selectable UI elements in a list form. In some examples, the user interface 1256 is a browser tab of the browser application. The user interface 1256 may be an example of the user interface 156 of FIGS. 1A through 1M and may include any of the details discussed with reference to the search system 100 of FIGS. 1A through 1M.

Referring to FIG. 12A, in response to a search query 1242 entered via a search field 1258, a search results page 1260 may display themes 1230 (theme 1230*a*, theme 1230*b*, theme 1230*c*, theme 1230*d*, theme 1230*e*, theme 1230*f*) as selectable UI elements in a list. Also, the search results page 1260 may display search results 1218 (e.g., the normal search results) obtained by a search engine. As shown in FIG. 12B, in response to selection of a particular theme of the themes 1230 (e.g., theme 1230*a*), the browser application may update the search results page 1260 to insert thematic search results 1219*a* pertaining to theme 1230*a*. In some examples, the thematic search results 1219*a* may include one or more query suggestions 1248 that are related to the theme 1030*a*. Also, as shown in FIG. 12B, the search results page 1260 may display the search results 1218 after the thematic search results 1219*a*.

Figure 13:
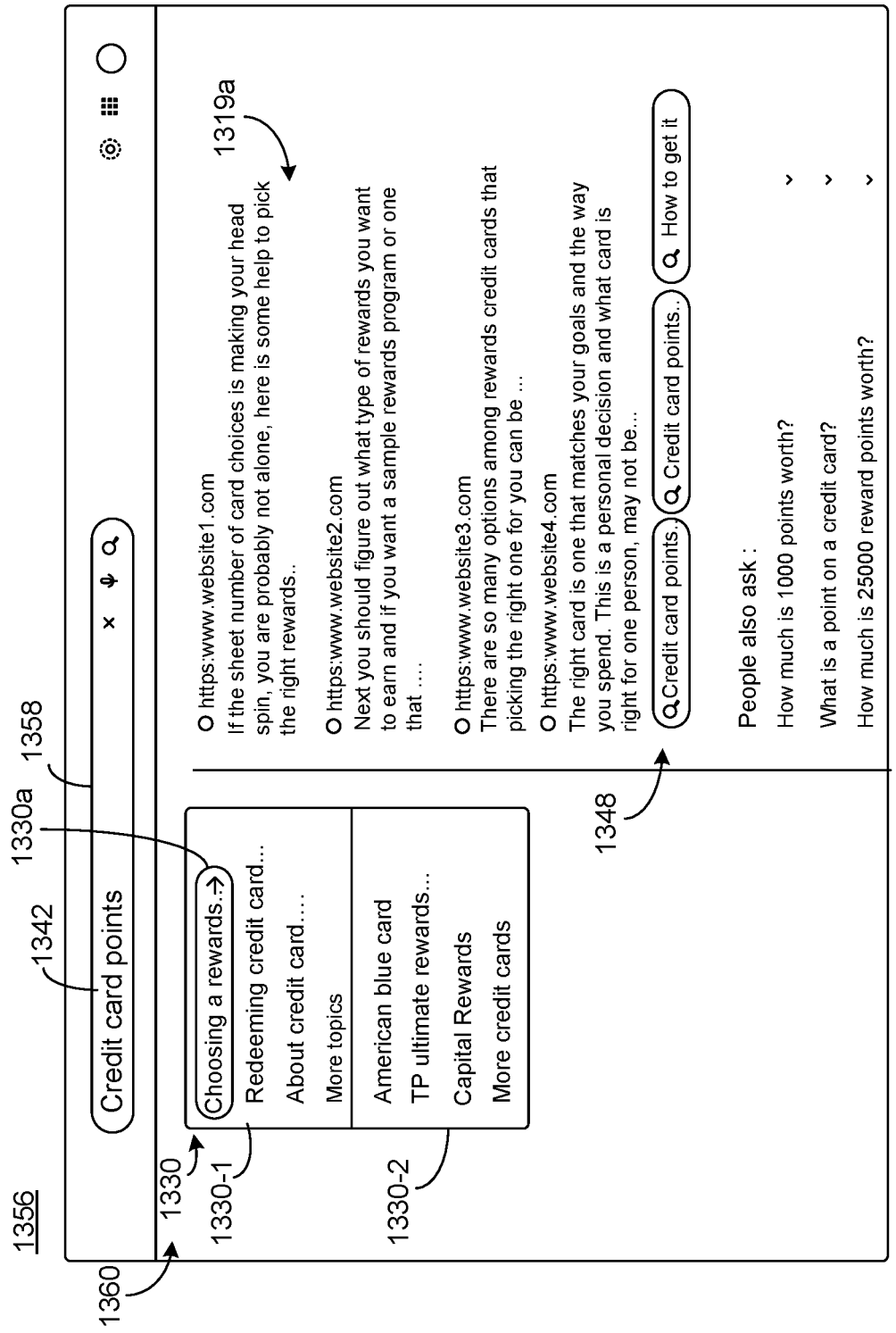
FIG. 13 illustrates an example of a user interface for displaying themes and/or thematic search results according to another aspect.

FIG. 13 illustrates an example of a user interface 1356 of a browser application that displays multiple groups of themes (e.g., themes 1330-1, themes 1330-2) as selectable UI elements in a list form. In some examples, the user interface 1356 is a browser tab of the browser application. The user interface 1356 may be an example of the user interface 156 of FIGS. 1A through 1M and may include any of the details discussed with reference to the search system 100 of FIGS. 1A through 1M.

Referring to FIG. 13, in response to a search query 1342 entered via a search field 1358, a search results page 1360 may display a group of themes 1330-1 and a group of themes 1330-2 as selectable UI elements in a list. The group of themes 1330-1 may relate to topics or categories detected from search results responsive to the search query 1342, and the group of themes 1330-2 may relate to products detected from the search results responsive to the search query 1342. In response to selection of a particular theme 1330 (e.g., theme 1330*a*), the search results page 1360 may display thematic search results 1319*a* pertaining to theme 1330*a*. In some examples, the thematic search results 1319*a* may include one or more query suggestions 1348 that are related to the theme 1330*a*.

Figure 14A:
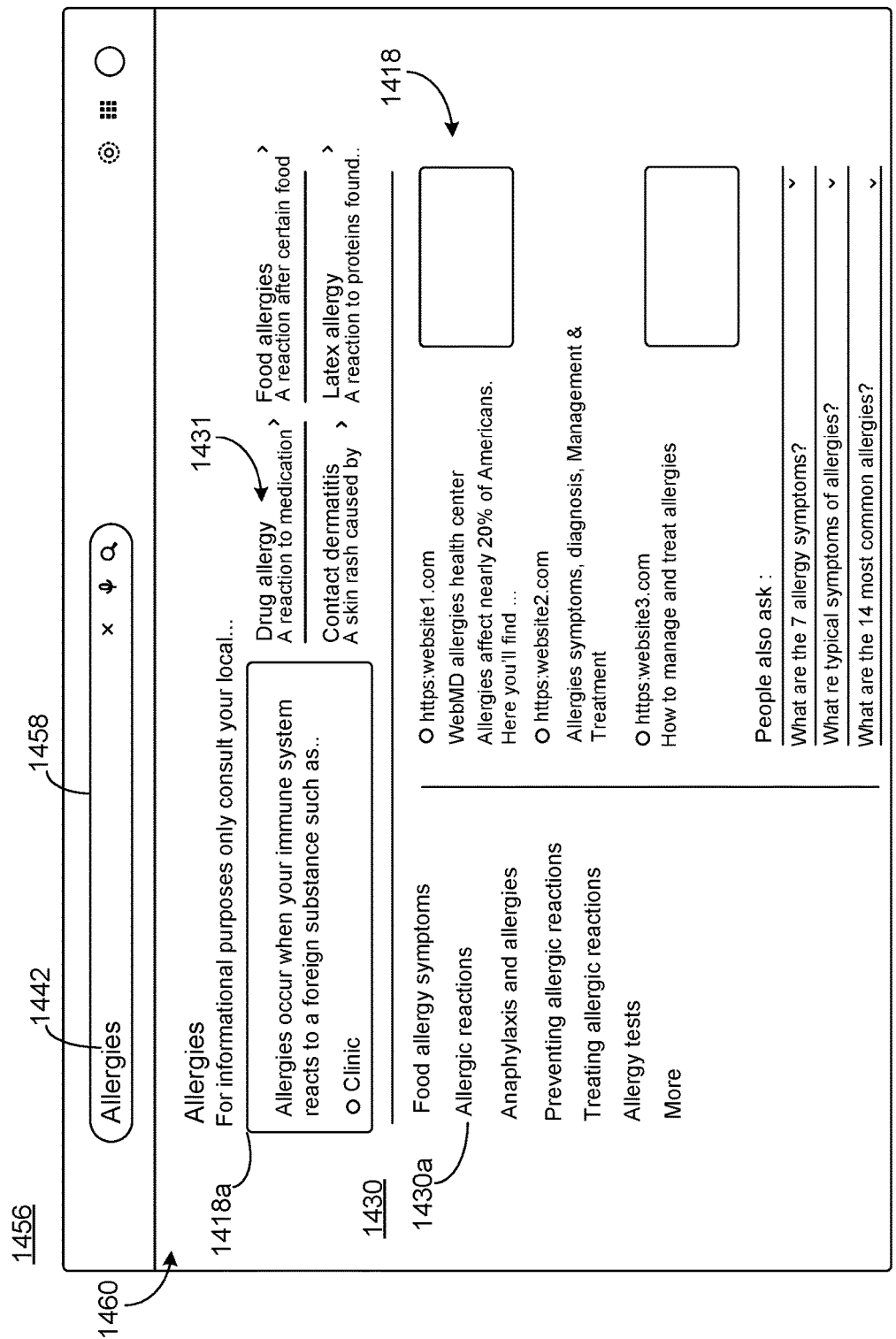
FIGS. 14A and 14B illustrate an example of a user interface for displaying themes and/or thematic search results according to another aspect.
Figure 14B:
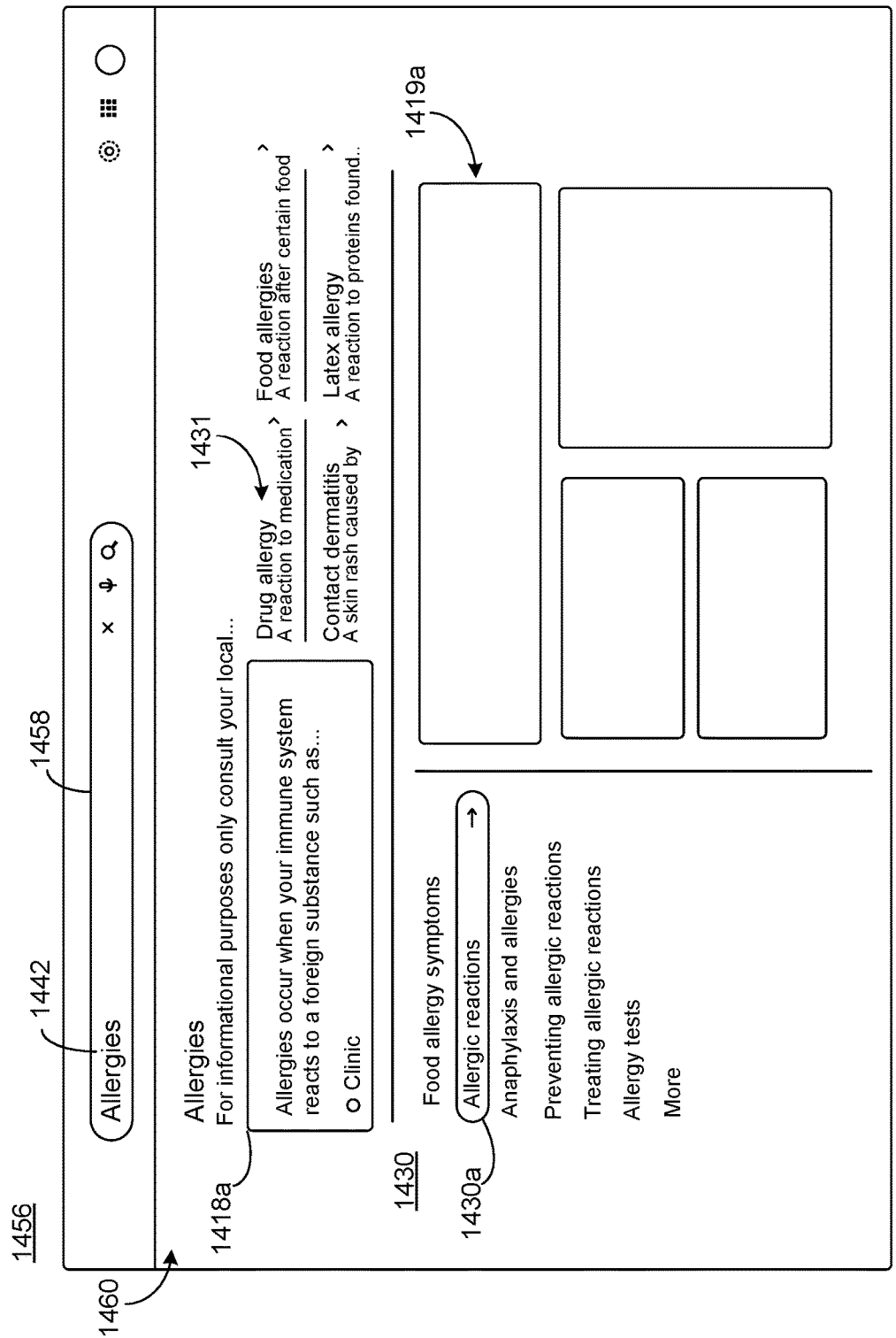

FIGS. 14A and 14B illustrate an example of a user interface 1456 of a browser application that displays a UI information object 1431 and themes 1430 (e.g., including theme 1430*a*) as selectable UI elements in a list form. The UI information object 1431 may include categorical information from a knowledge graph and may identify a search result 1418*a*. In some examples, the user interface 1456 is a browser tab of the browser application. The user interface 1456 may be an example of the user interface 156 of FIGS. 1A through 1M and may include any of the details discussed with reference to the search system 100 of FIGS. 1A through 1M.

Referring to FIG. 14A, in response to a search query 1442 entered via a search field 1458, a search results page 1460 may display the themes 1430 as selectable UI elements in a list. The search results page 1460 may display the themes 1430 after the UI information object 1431. As shown in FIG. 14A, the search results page 1460 may display search results 1418 related to the search query 1442. Then, referring to FIG. 14B, in response to selection of a particular theme of the themes 1430 (e.g., theme 1430*a*), the search results page 1460 may display thematic search results 1419*a* pertaining to the selected theme 1430*a*.

Figure 15:
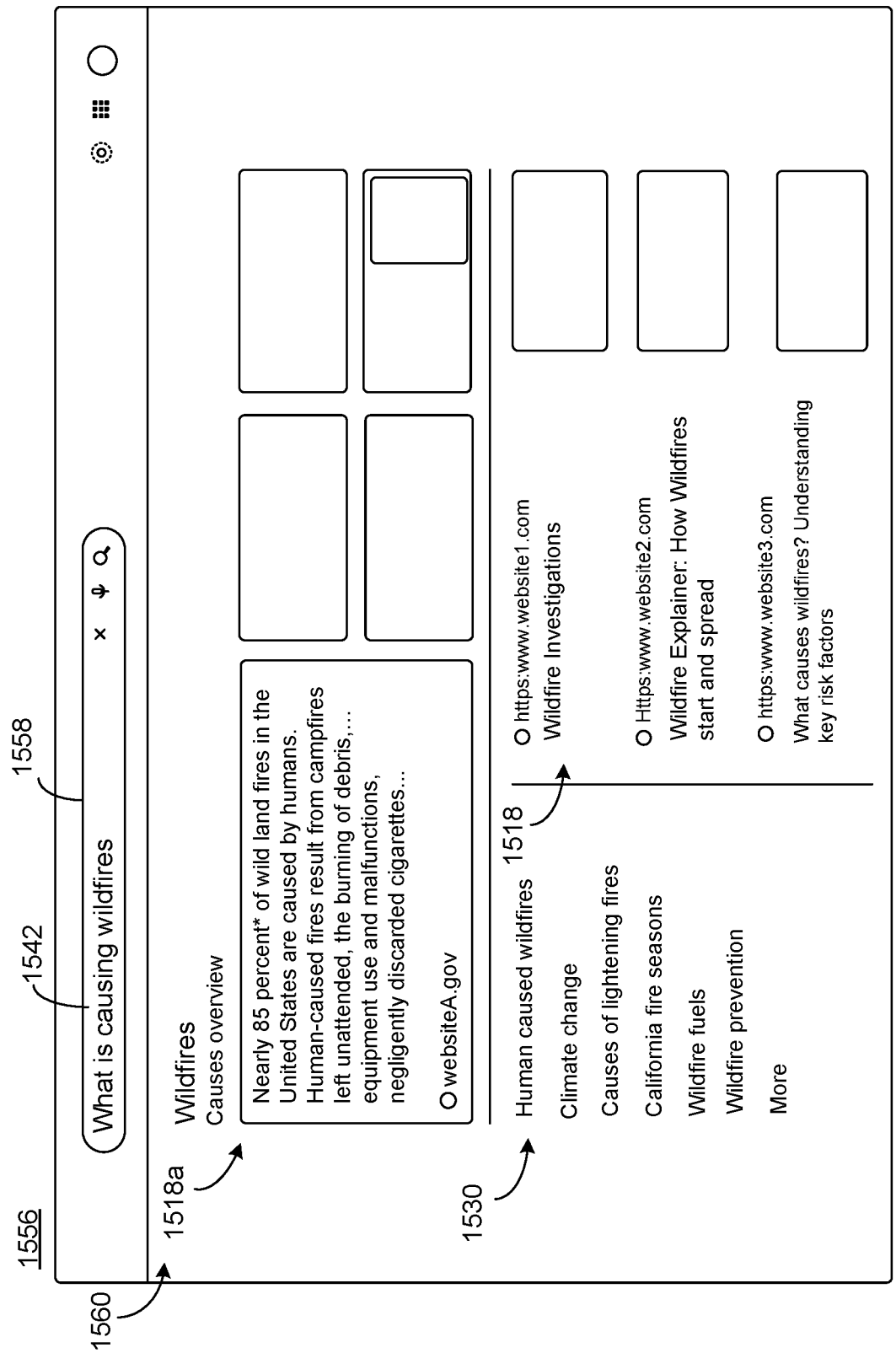
FIG. 15 illustrates an example of a user interface for displaying themes and/or thematic search results according to another aspect.

FIG. 15 illustrates an example of a user interface 1556 of a browser application. In some examples, the user interface 1556 is a browser tab of the browser application. The user interface 1556 may be an example of the user interface 156 of FIGS. 1A through 1M and may include any of the details discussed with reference to the search system 100 of FIGS. 1A through 1M. In response to a search query 1542 entered via a search field 1558, a search results page 1560 may display search results 1518*a* responsive to the search query 1542. In some examples, the search results 1518*a* may include the top search results obtained by the search engine. Also, after the search results 1518*a*, the search results page 1560 may display themes 1530 as selectable UI elements in a list (e.g., in a side navigation panel). The search results page 1560 may also display other search results 1518 obtained by the search engine. Then, in response to selection of a particular theme of the themes 1530, the search results page 1560 may display thematic search results pertaining to the selected theme.

Figure 16:
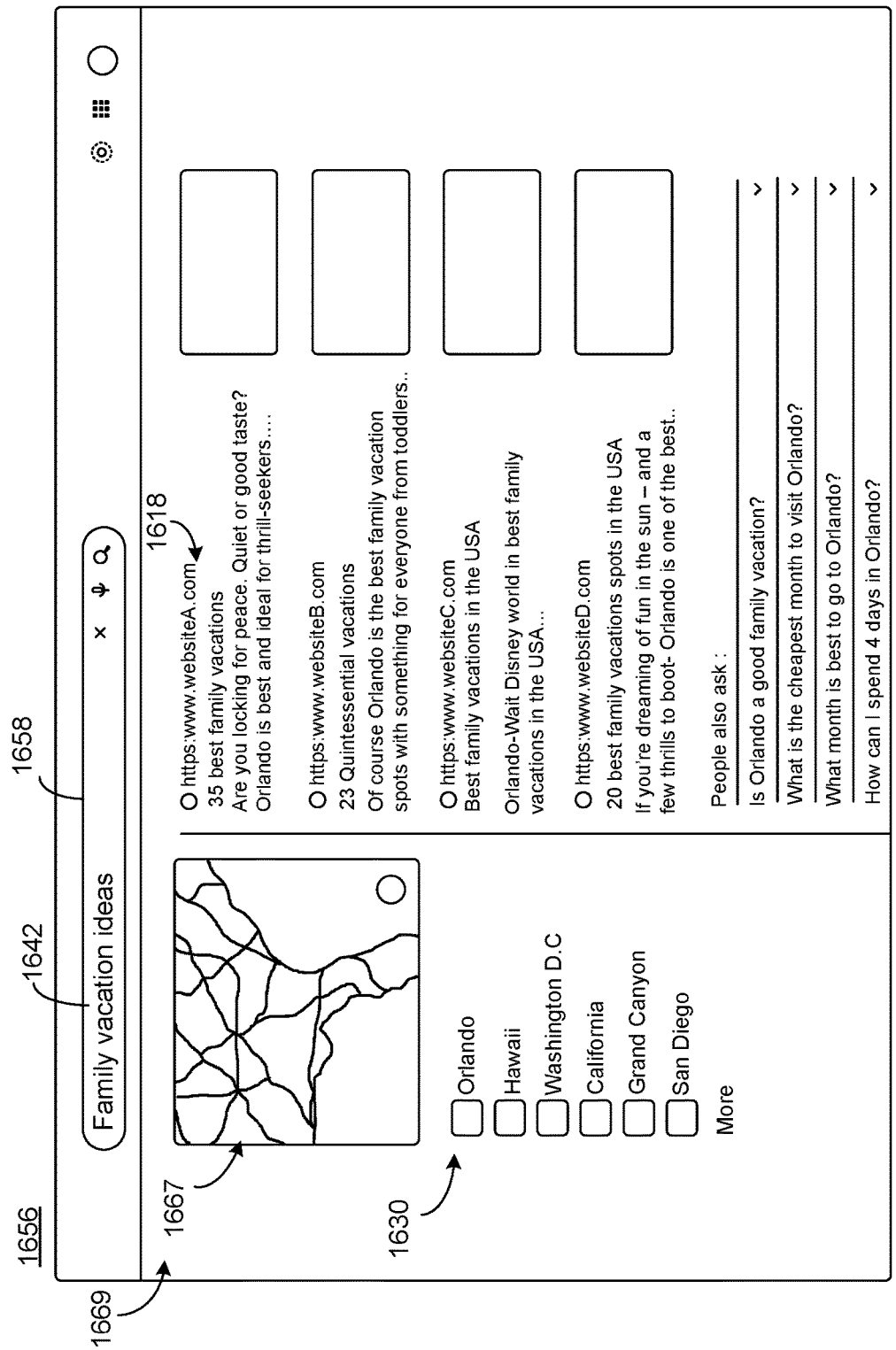
FIG. 16 illustrates an example of a user interface for displaying themes and/or thematic search results according to another aspect.

FIG. 16 illustrates an example of a user interface 1656 of a browser application. In some examples, the user interface 1656 is a browser tab of the browser application. The user interface 1656 may be an example of the user interface 156 of FIGS. 1A through 1M and may include any of the details discussed with reference to the search system 100 of FIGS. 1A through 1M. In response to a search query 1642 entered via a search field 1658, a search results page 1560 may display a thematic UI panel 1669 and search results 1618 responsive to the search query 1642. The thematic UI panel 1669 may include themes 1630 as selectable UI elements in a list form. The themes 1630 may relate to different locations detected from the search results 1618. In some examples, if the themes 130 relate to different locations, the thematic UI panel 1669 may display an interactive map 1667 configured to identify a location of a selected theme of the themes 1630 such that the user can explore the area using the interactive map 1667. For example, if the user selects one of the themes 1630 (e.g., Orlando), the browser application may cause the interactive map 1667 to zoom into the Orlando area. Then, the user can review the thematic search results relating to Orlando.

Figure 17:
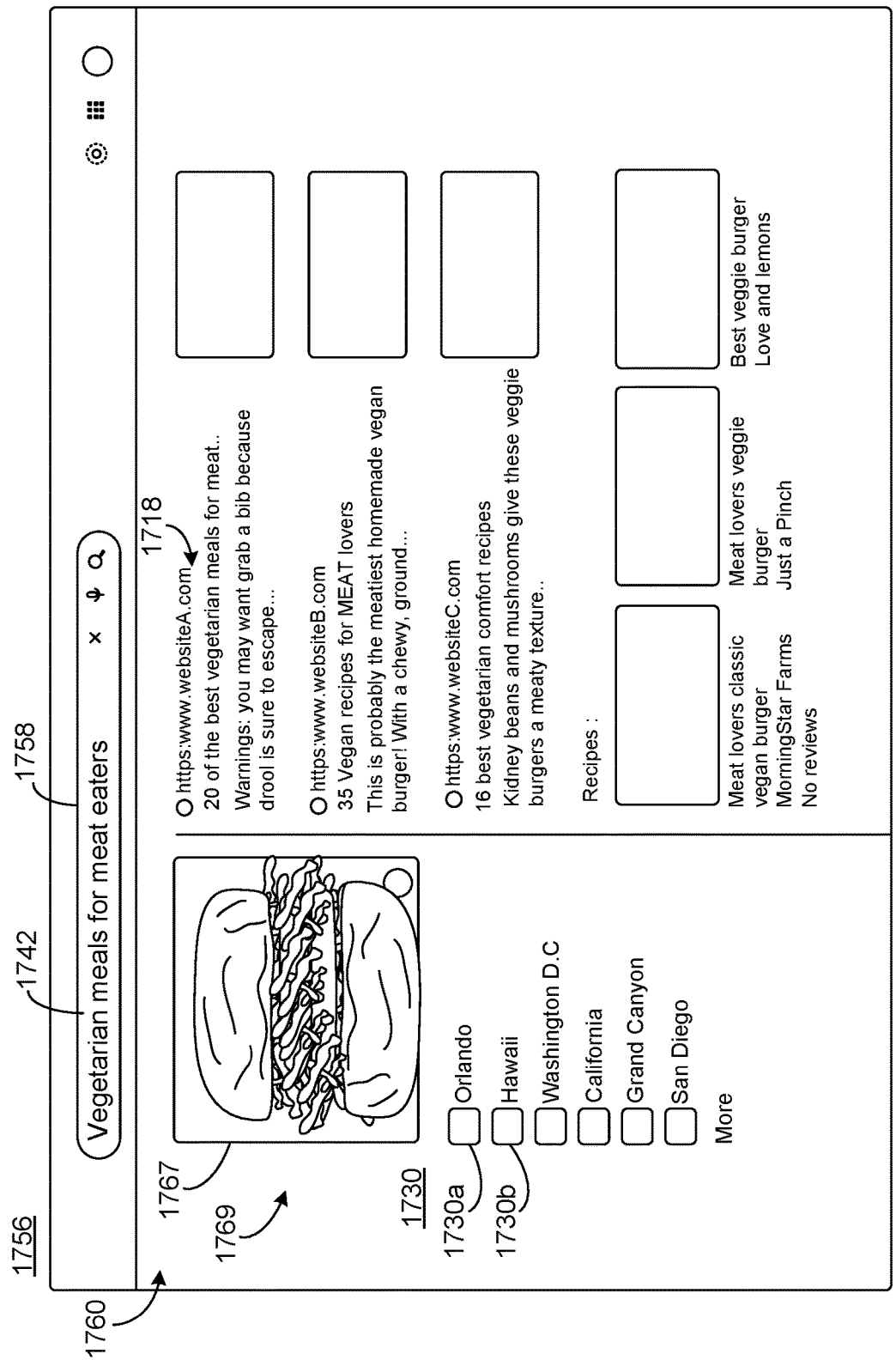
FIG. 17 illustrates an example of a user interface for displaying themes and/or thematic search results according to another aspect.

FIG. 17 illustrates an example of a user interface 1756 of a browser application. In some examples, the user interface 1756 is a browser tab of the browser application. The user interface 1756 may be an example of the user interface 156 of FIGS. 1A through 1M and may include any of the details discussed with reference to the search system 100 of FIGS. 1A through 1M. In response to a search query 1742 entered via a search field 1758, a search results page 1760 may display a thematic UI panel 1769 and search results 1718 responsive to the search query 1742. The thematic UI panel 1769 may include themes 1730 as selectable UI elements in a list form. The themes 1730 may relate to different items (e.g., food items). In some examples, if the themes 1730 relate to different items, the thematic UI panel 1769 may display an image 1767 associated with a theme 1730. If theme 1730*a* is selected, the browser application may update the thematic UI panel 1769 with an image 1767 that corresponds to the theme 1730*a*. If theme 1730*b* is selected, the browser application may update the thematic UI panel 1769 with an image 1767 that corresponds to the theme 1730*b*.

Figure 18:
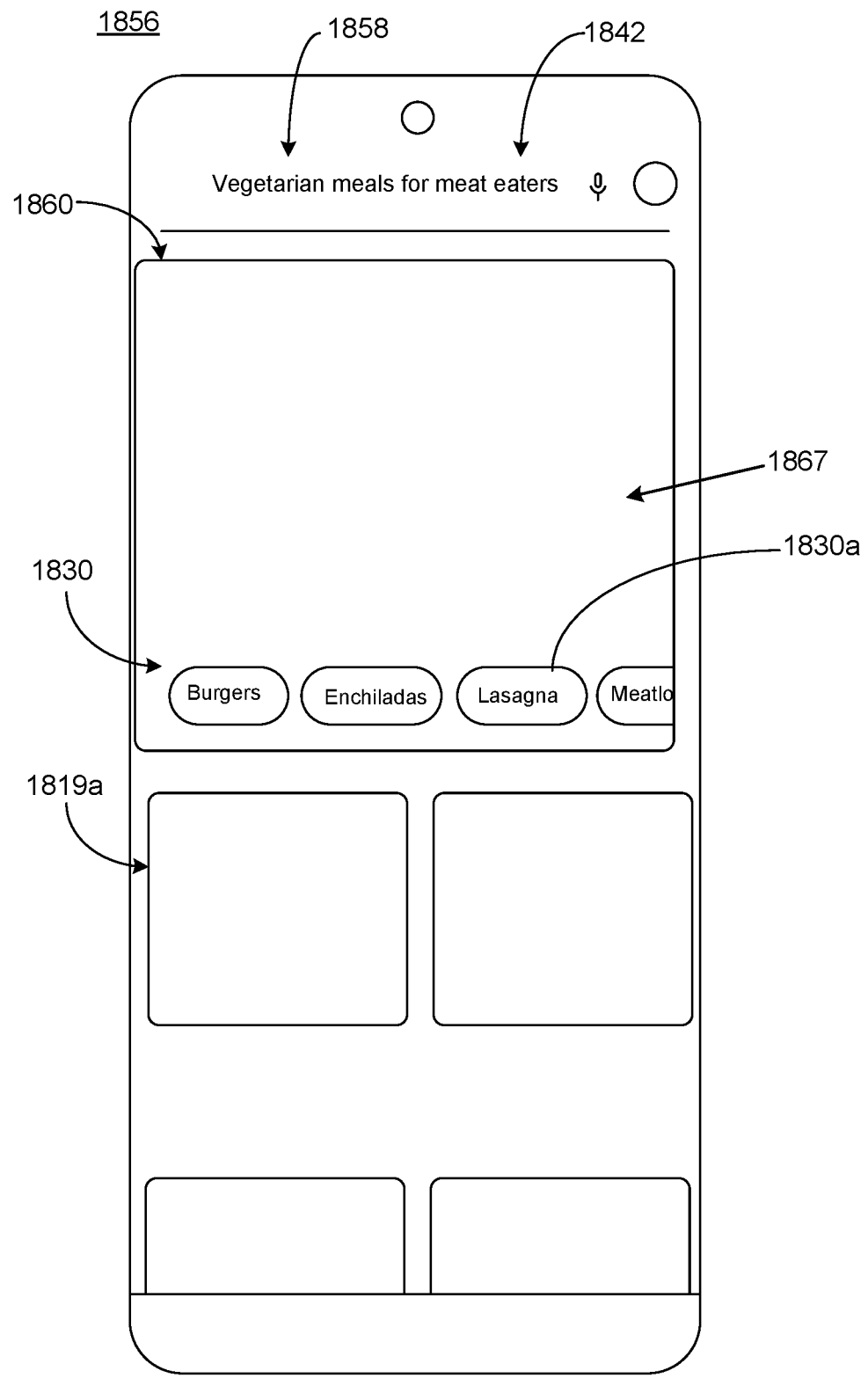
FIG. 18 illustrates an example of a user interface for displaying themes and/or thematic search results according to another aspect.

FIG. 18 illustrates an example of a user interface 1856 of a browser application. In some examples, the user interface 1856 is a browser tab of the browser application. The user interface 1856 may be an example of the user interface 156 of FIGS. 1A through 1M and may include any of the details discussed with reference to the search system 100 of FIGS. 1A through 1M. In response to a search query 1842 entered via a search field 1858, a search results page 1860 may display an image 1867 associated with a selected theme 1830*a* of a set of themes 1830, a group of selectable UI elements corresponding to the themes 1830, and thematic search results 1819*a* corresponding to the selected theme 1830*a*. In some examples, the group of selectable UI elements corresponding to the themes 1830 may be overlaid on the display of the image 1867. If a user selects another theme of the themes 1830, the search results page 1860 may be updated with an image 1867 corresponding to the newly selected theme and thematic search results corresponding to the newly selected theme.

Figure 19:
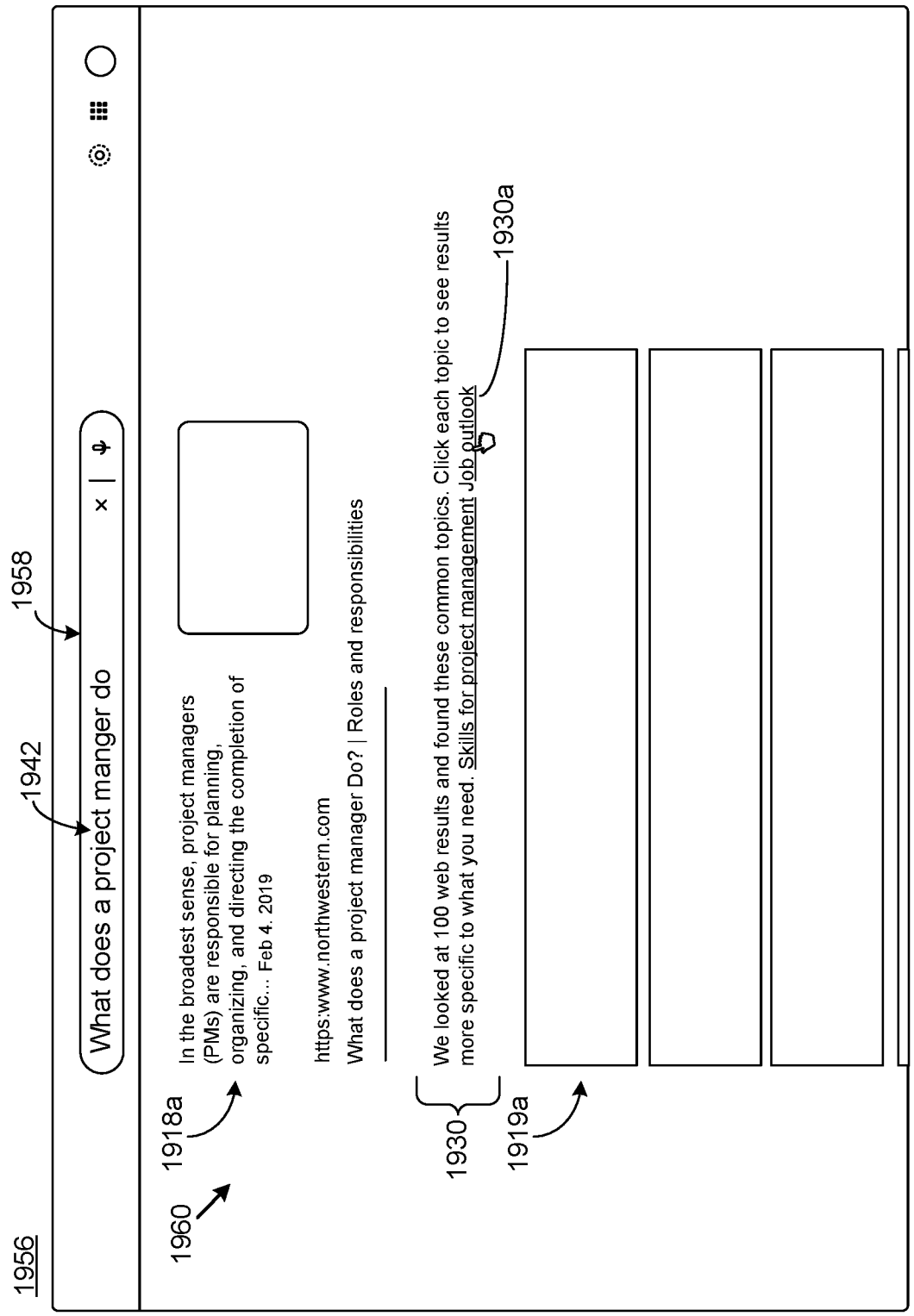
FIG. 19 illustrates an example of a user interface for displaying themes and/or thematic search results according to another aspect.

FIG. 19 illustrates an example of a user interface 1956 of a browser application. In some examples, the user interface 1956 is a browser tab of the browser application. The user interface 1856 may be an example of the user interface 156 of FIGS. 1A through 1M and may include any of the details discussed with reference to the search system 100 of FIGS. 1A through 1M. In response to a search query 1942 entered via a search field 1958, a search results page 1960 may display a search result 1918*a* (e.g., a top search result). The search results page 1960 may display a textual portion that lists the themes 1930. The themes 1930 may be selectable, which causes a display of thematic search results corresponding to the selected theme of the themes 1930. As shown in FIG. 19, the user has selected theme 1930*a*, which causes the display of thematic search results 1919*a* corresponding to the theme 1930*a*.

Figure 20:
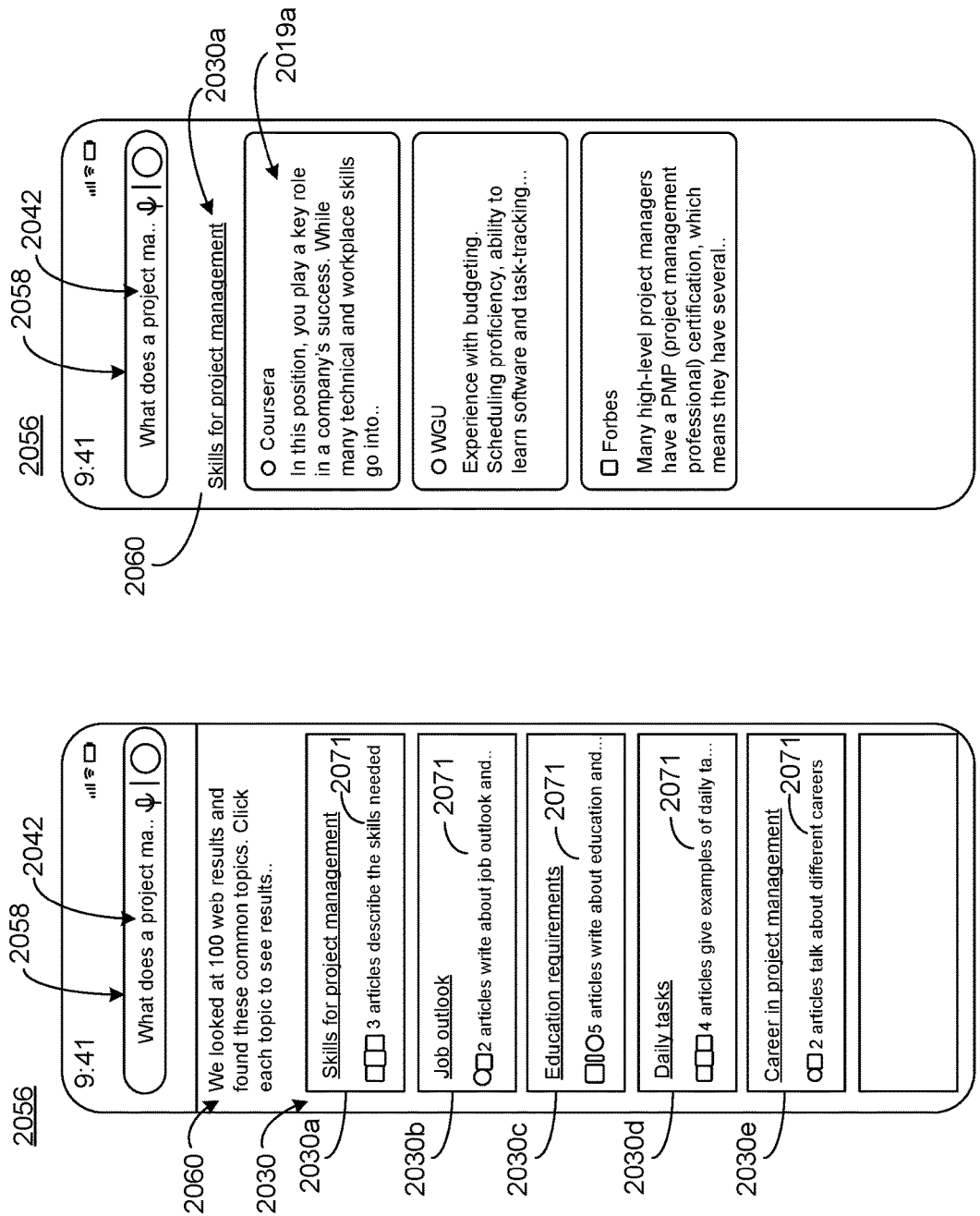
FIGS. 20A and 20B illustrate an example of a user interface for displaying themes and/or thematic search results according to another aspect.

FIGS. 20A and 20B illustrate an example of a user interface 2056 of a browser application that displays themes 2030 (e.g., theme 2030*a*, theme 2030*b*, theme 2030*c*, theme 2030*d*, theme 2030*e*) as selectable UI objects. In some examples, the user interface 2056 is a browser tab of the browser application. The user interface 2056 may be an example of the user interface 156 of FIGS. 1A through 1M and may include any of the details discussed with reference to the search system 100 of FIGS. 1A through 1M. Referring to FIG. 20A, in response to a search query 2042 entered via a search field 2058, a search results page 2060 may display the themes 2030 as a list of selectable UI objects. Each selectable UI object may identify a theme of the themes 2030 and include thematic results information 2071 about the number of responsive documents that mention the corresponding theme. Then, referring to FIG. 20B, in response to selection of a particular theme of the themes 2030 (e.g., theme 2030*a*), the search results page 1560 may be updated to view thematic search results 2019*a* pertaining to the selected theme 2030*a*.

Figure 21:
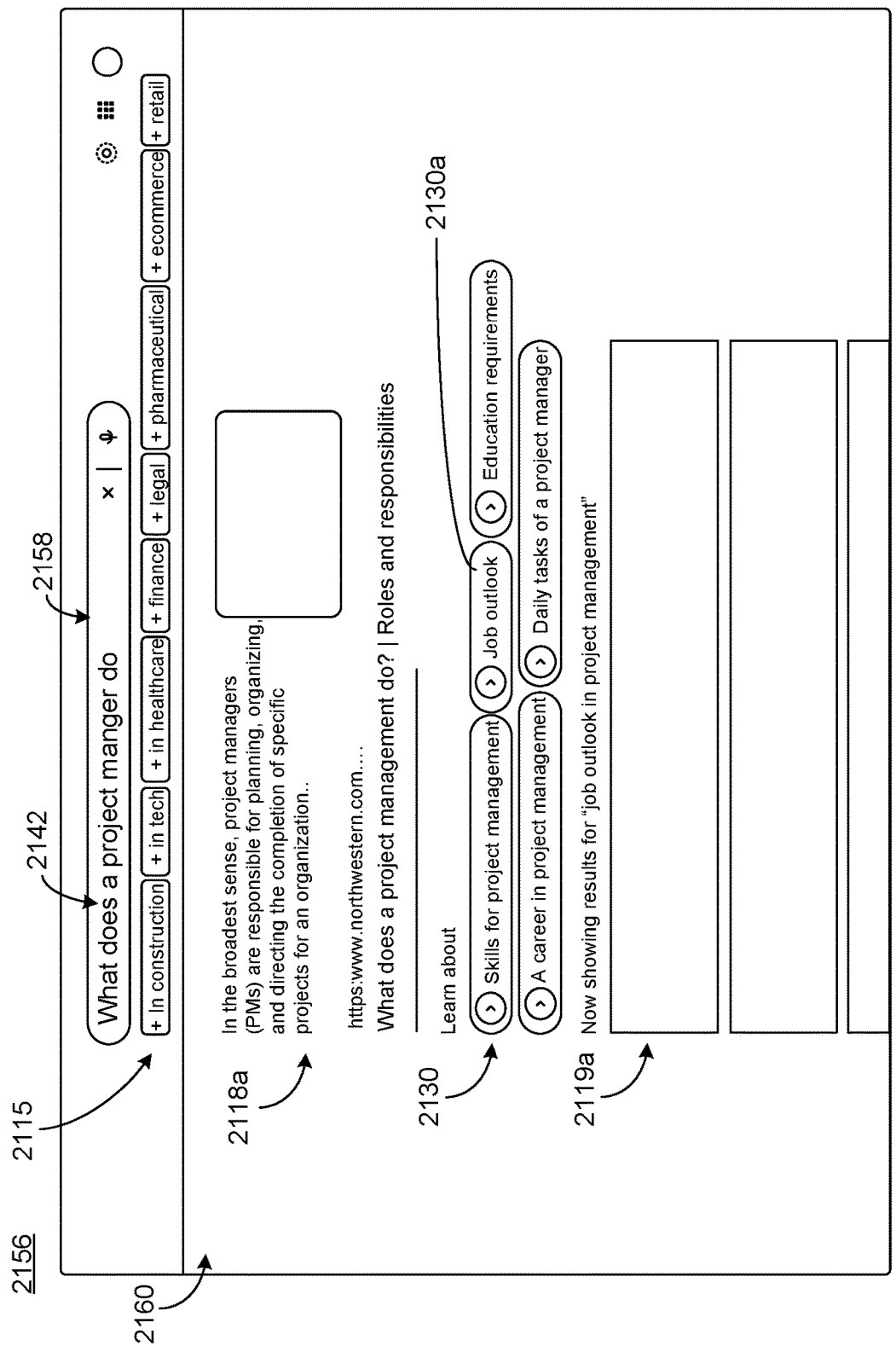
FIG. 21 illustrates an example of a user interface for displaying themes and/or thematic search results according to another aspect.

FIG. 21 illustrates an example of a user interface 2156 of a browser application. In some examples, the user interface 2156 is a browser tab of the browser application. The user interface 2156 may be an example of the user interface 156 of FIGS. 1A through 1M and may include any of the details discussed with reference to the search system 100 of FIGS. 1A through 1M. In response to a search query 2142 entered via a search field 2158, a search results page 2160 may display a search result 2118*a* (e.g., top search) responsive to the search query 2142. Also, after the search result 2118*a*, the search results page 2160 may display a group of selectable UI elements corresponding to the themes 2130 (including theme 2130*a*). When the theme 2130*a* is selected, the search results page 2160 may be updated with thematic search results 2119*a* according to the selected theme 2130*a*. In some examples, the user interface 2156 may display selectable filters 2115, which may be selected, to further refine the search query 2142. In some examples, selection of a particular selectable filter of the filters 2115 may cause the thematic search engine to re-generate the themes 2130 and the thematic search results.

Figure 22:
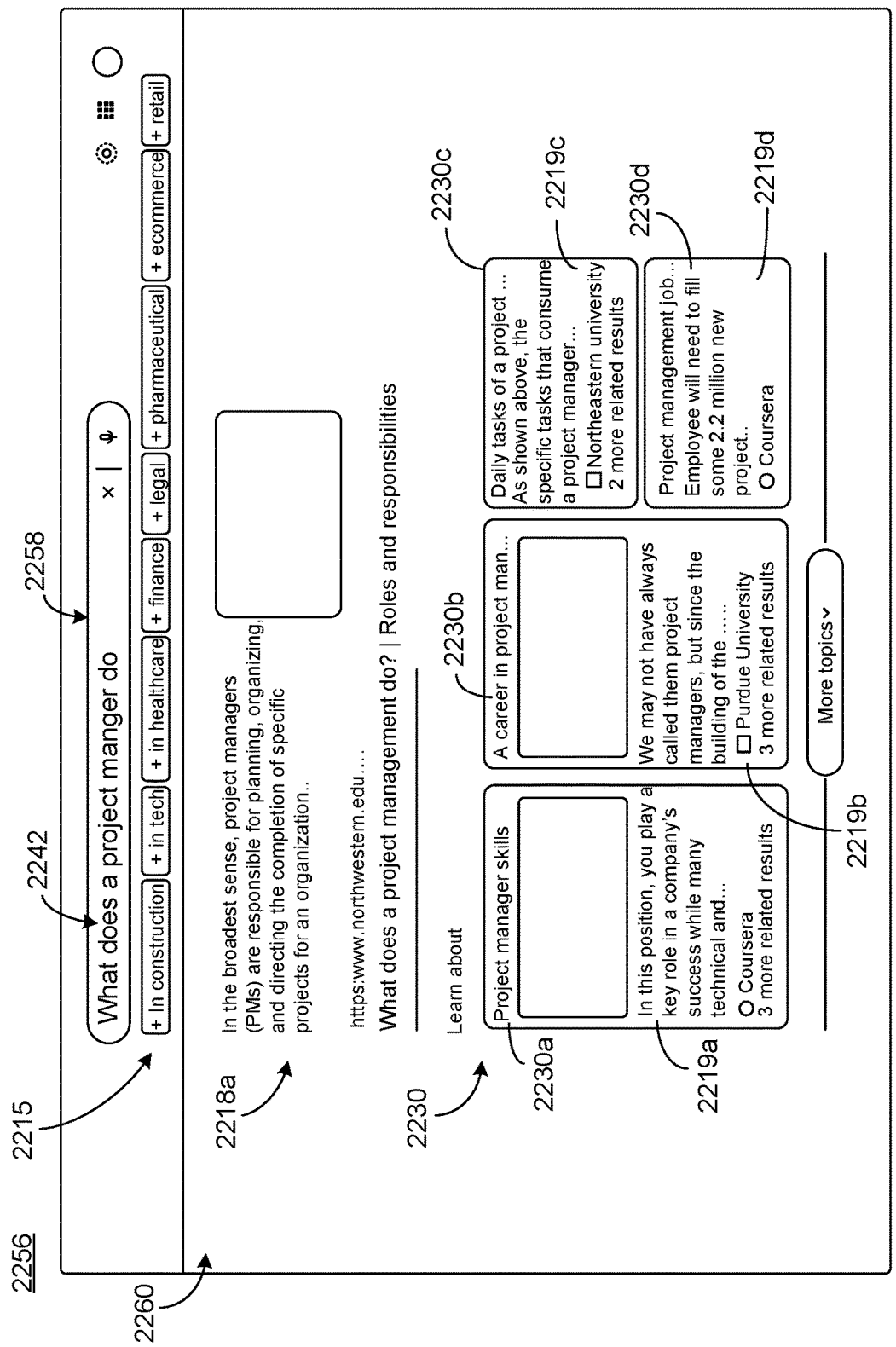
FIG. 22 illustrates an example of a user interface for displaying themes and/or thematic search results according to another aspect.

FIG. 22 illustrates an example of a user interface 2256 of a browser application that displays themes 2230 as selectable UI objects, where an individual UI object identifies a theme of the themes 2230, a thematic search result, and information on whether the theme has additional thematic search results. In some examples, the user interface 2256 is a browser tab of the browser application. The user interface 2256 may be an example of the user interface 156 of FIGS. 1A through 1M and may include any of the details discussed with reference to the search system 100 of FIGS. 1A through 1M.

Referring to FIG. 22, in response to a search query 2242 entered via a search field 2258, a search results page 2260 may display a search result 2218*a* (e.g., top search result) responsive to the search query 2242. The search results page 2260 may display themes 2230 as selectable UI objects. Each selectable UI object corresponds to a different theme of the themes 2230. The search results page 2260 may identify selectable UI objects corresponding to the themes 2230, e.g., theme 2230*a*, theme 2230*b*, theme 2230*c*, and theme 2230*d*. Each selectable UI object may identify a particular thematic search result (e.g., 2219*a*, 2219*b*, 2219*c*, 2219*d*), which may be the top ranked result. A selectable UI object may display an image, passage, and/or source of the thematic search result. If a theme is associated with more than one thematic search result, a selectable UI object may include information that identifies the number of additional thematic search results. In some examples, the user interface 2256 may display selectable filters 2215, which may be selected, to further refine the search query 2242. In some examples, selection of a particular selectable filter of the filters 2215 may cause the thematic search engine to re-generate the themes 2230 and the thematic search results.

Figure 23:
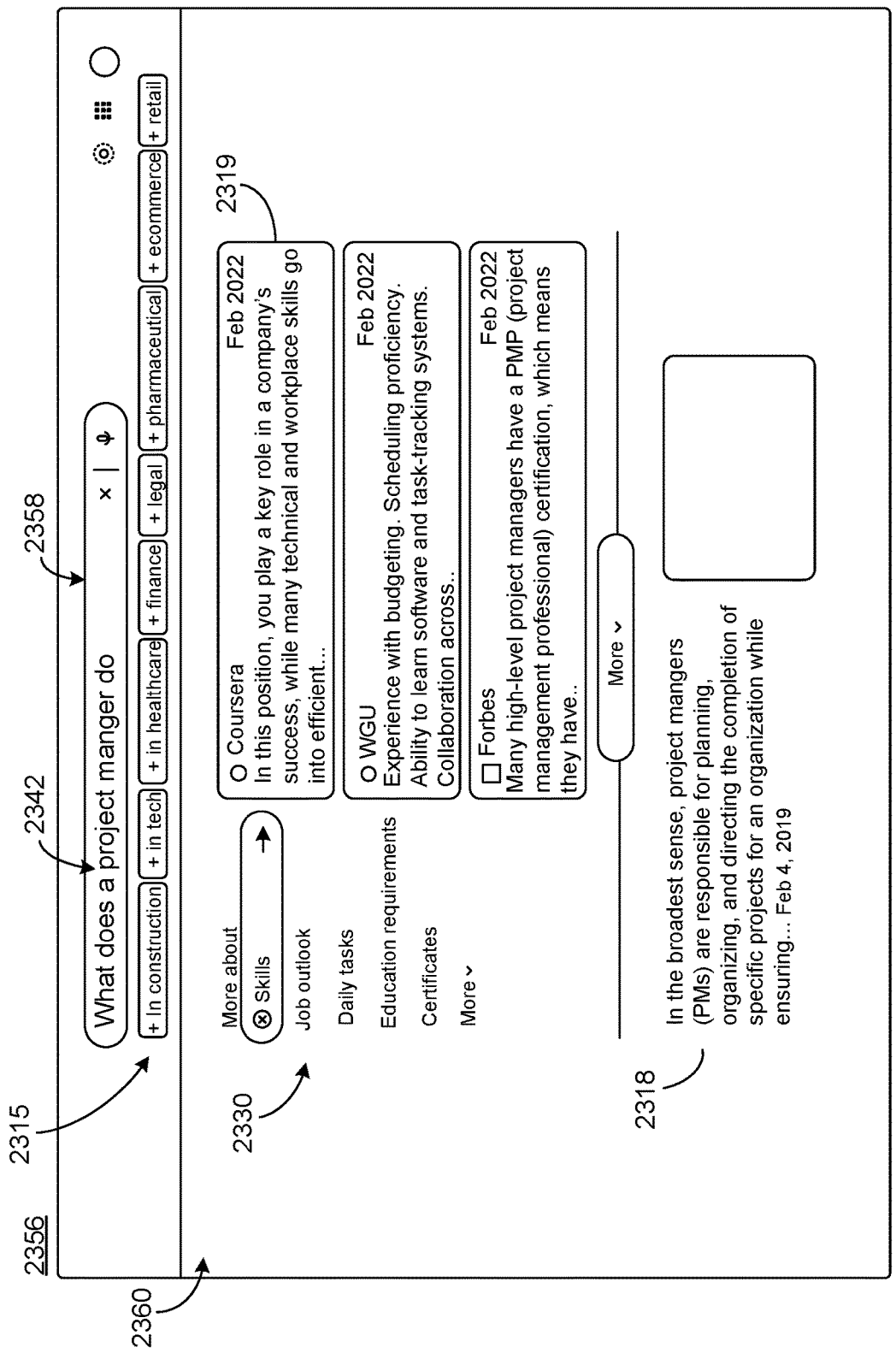
FIG. 23 illustrates an example of a user interface for displaying themes and/or thematic search results according to another aspect.

FIG. 23 illustrates an example of a user interface 2356 of a browser application. In some examples, the user interface 2356 is a browser tab of the browser application. The user interface 2356 may be an example of the user interface 156 of FIGS. 1A through 1M and may include any of the details discussed with reference to the search system 100 of FIGS. 1A through 1M. In response to a search query 2342 entered via a search field 2358, a search results page 2360 may display a group of selectable UI elements corresponding to the themes 2330 (including theme 2130a). When a particular theme of the themes 2330 is selected, the search results page 2360 may be updated with thematic search results 2319 according to the selected theme. The search results page 2360 includes search results 2318 responsive to the search query 2342. In some examples, the user interface 2356 may display selectable filters 2315, which may be selected, to further refine the search query 2342. In some examples, selection of a particular selectable filter 2315 may cause the thematic search engine to re-generate the themes 2330 and the thematic search results 2319.

Figure 24:
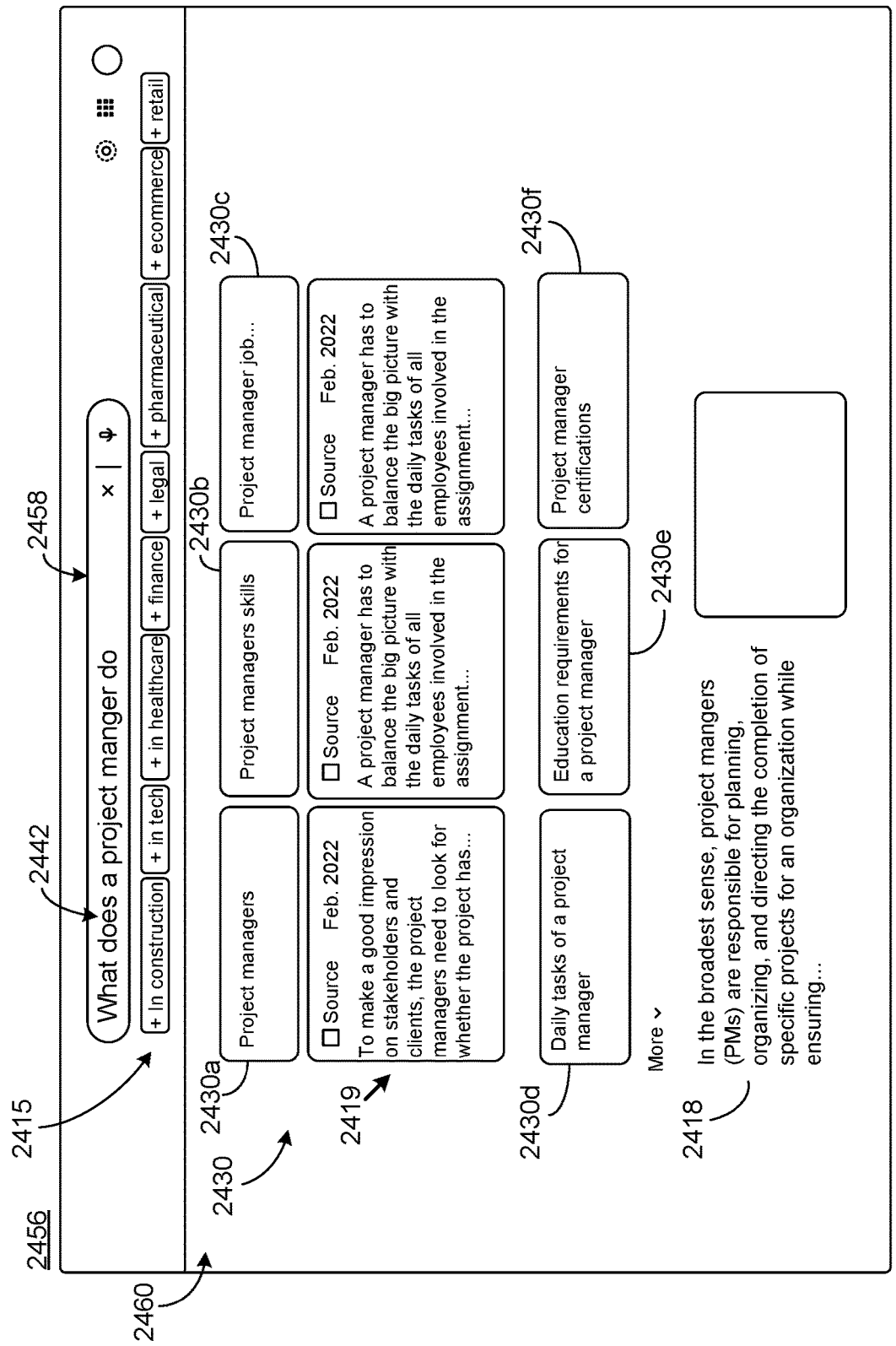
FIG. 24 illustrates an example of a user interface for displaying themes and/or thematic search results according to another aspect.

FIG. 24 illustrates an example of a user interface 2456 of a browser application. In some examples, the user interface 2456 is a browser tab of the browser application. The user interface 2456 may be an example of the user interface 156 of FIGS. 1A through 1M and may include any of the details discussed with reference to the search system 100 of FIGS. 1A through 1M. In response to a search query 2442 entered via a search field 2458, a search results page 2460 may display themes 2430 with thematic search results 2419. In some examples, the search results page 2460 may display a single thematic search result 2419 for some of themes 2430, and the user can select one of the themes 2430 to view additional thematic search results 2419. For example, the search results page 2460 may display a theme 2430a with a thematic search result 2419, a theme 2430b with a thematic search result 2419, and a theme 2430c with a thematic search result 2419. The theme 2430d, the theme 2430e, and the theme 2430f may be identified without thematic search results. The search results page 2460 may include search results 2418 responsive to the search query 2442. In some examples, the user interface 2456 may display selectable filters 2415, which may be selected, to further refine the search query 2442. In some examples, selection of a particular selectable filter of the filters 2415 may cause the thematic search engine to re-generate the themes 2430 and the thematic search results 2419.

Figure 25:
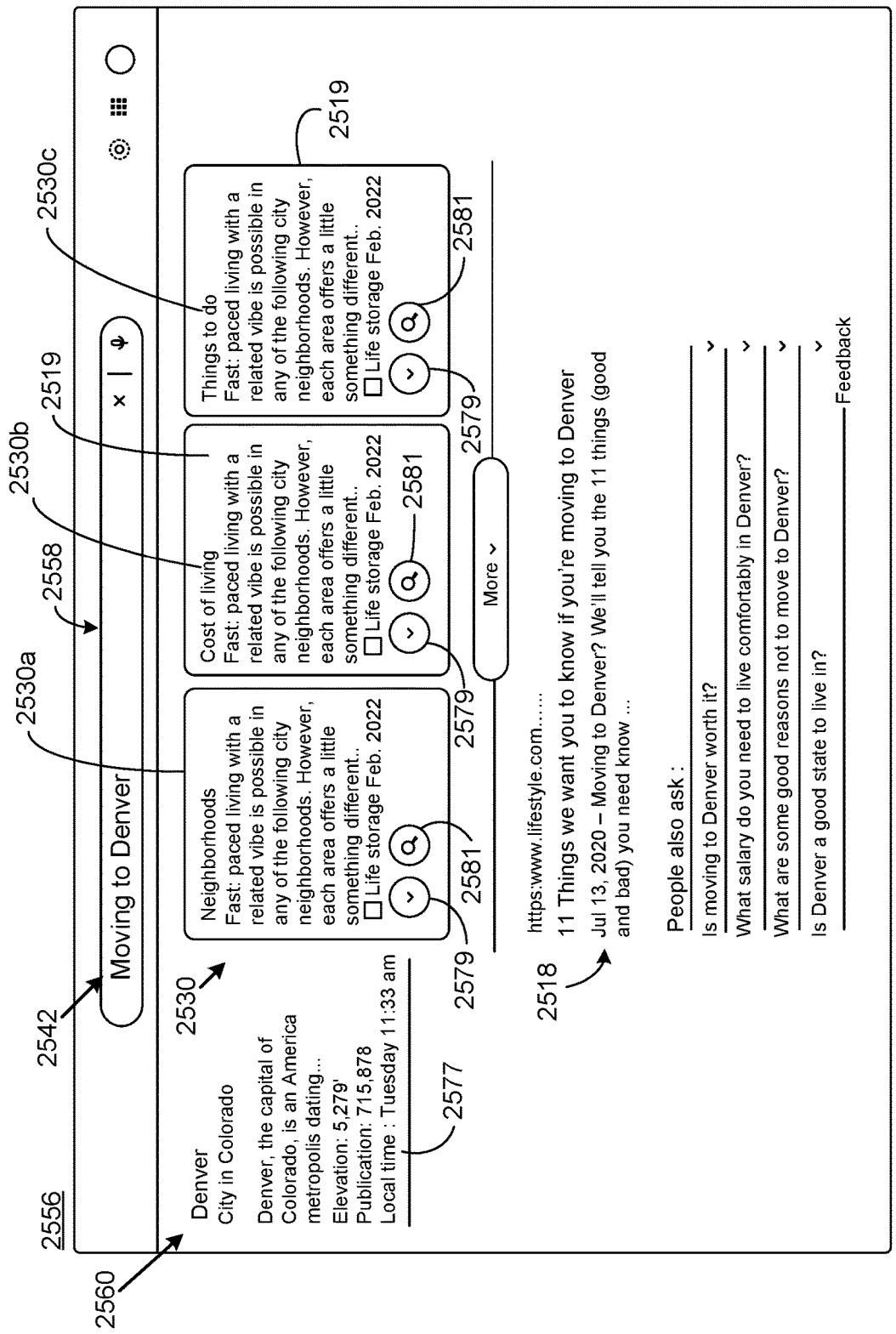
FIG. 25 illustrates an example of a user interface for displaying themes and/or thematic search results according to another aspect.

FIG. 25 illustrates an example of a user interface 2556 of a browser application. In some examples, the user interface 2556 is a browser tab of the browser application. The user interface 2556 may be an example of the user interface 156 of FIGS. 1A through 1M and may include any of the details discussed with reference to the search system 100 of FIGS. 1A through 1M. In response to a search query 2542 entered via a search field 2558, a search results page 2560 may display UI objects corresponding to a plurality of themes 2530 (e.g., theme 2530a, theme 2530b, theme 2530c). Each UI object includes a theme of the themes 2530 and a thematic search result 2519. Also, each UI object includes a selectable UI element 2579, which, when selected, causes the search results page 2560 to display additional thematic search results 2519 for the respective theme. Also, each UI object includes a selectable UI element 2581, which, when selected, allows the user to enter a search result to search for additional results within a particular theme of the themes 2530. The search results page 2560 includes information 2577 about the search query 2542, information about an entity within the search query 2542, and/or information from a knowledge graph. The search results page 2560 may include search results 2518 responsive to the search query 2542.

Figure 26:
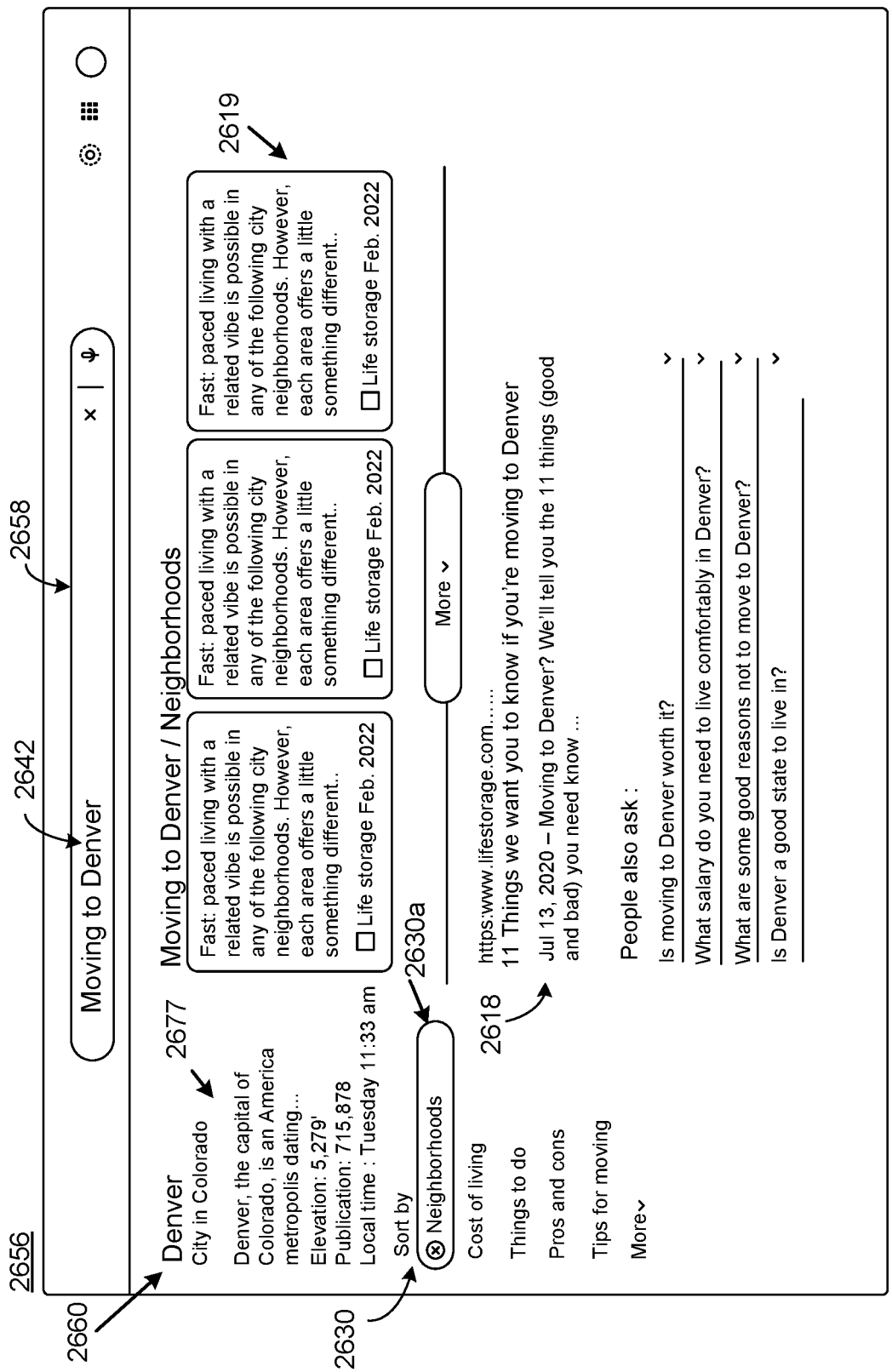
FIG. 26 illustrates an example of a user interface for displaying themes and/or thematic search results according to another aspect.

FIG. 26 illustrates an example of a user interface 2656 of a browser application. In some examples, the user interface 2656 is a browser tab of the browser application. The user interface 2656 may be an example of the user interface 156 of FIGS. 1A through 1M and may include any of the details discussed with reference to the search system 100 of FIGS. 1A through 1M. In response to a search query 2642 entered via a search field 2658, a search results page 2460 may display information 2677 about the search query 2642 and a list of themes 2630 (including theme 2630a) under the information 2677. In some examples, the information 2677 includes information about an entity within the search query 2642 and/or the information 2677 includes information from a knowledge graph. When a particular theme of the themes 2630 is selected from the list, the search results page 2660 may be updated with thematic search results 2619 according to the selected theme. The search results page 2660 includes search results 2618 responsive to the search query 2642.

Figure 27:
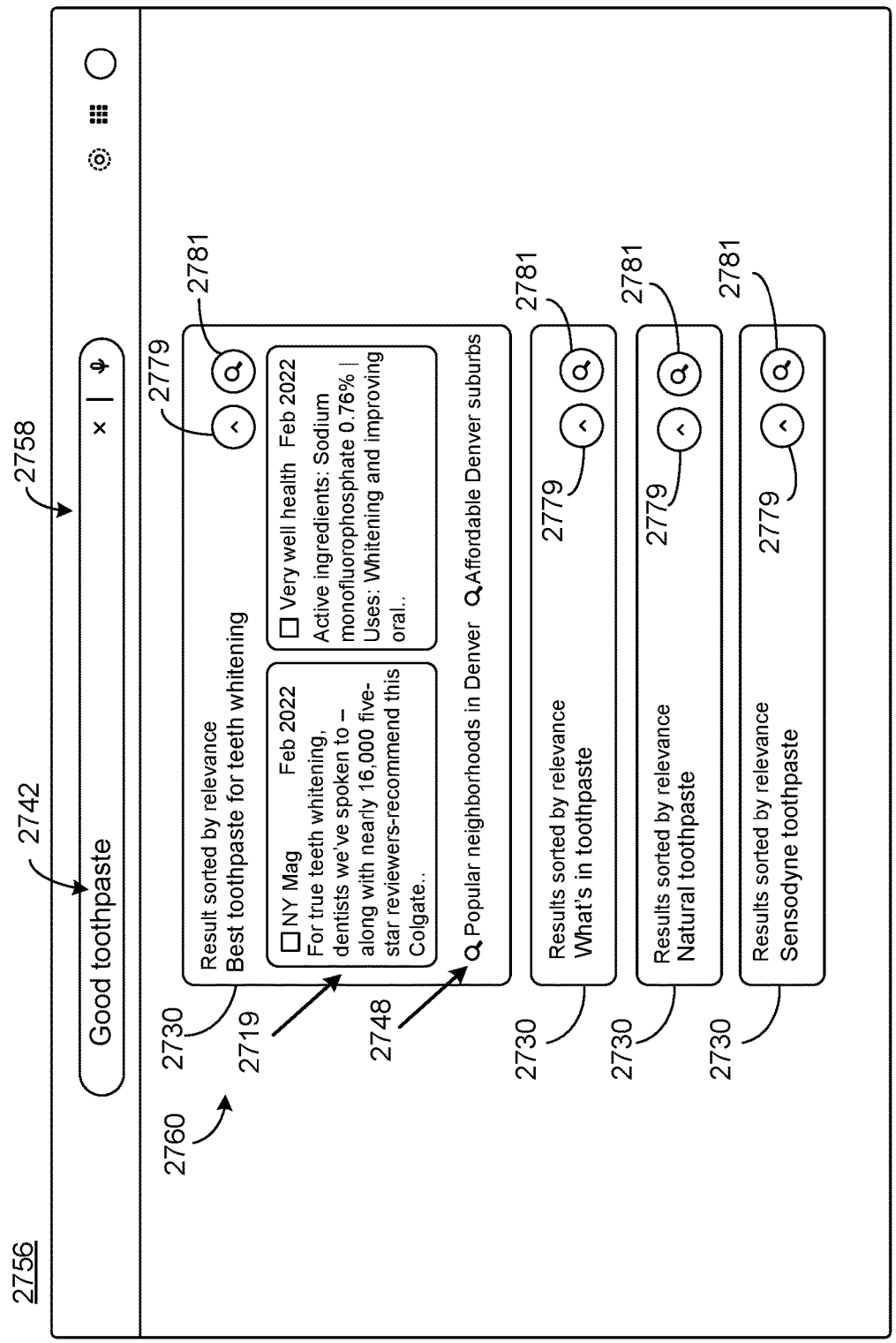
FIG. 27 illustrates an example of a user interface for displaying themes and/or thematic search results according to another aspect.

FIG. 27 illustrates an example of a user interface 2756 of a browser application. In some examples, the user interface 2756 is a browser tab of the browser application. The user interface 2756 may be an example of the user interface 156 of FIGS. 1A through 1M and may include any of the details discussed with reference to the search system 100 of FIGS. 1A through 1M. In response to a search query 2742 entered via a search field 2758, a search results page 2760 may display expandable UI objects, where each expandable UI object corresponds to a different theme 2730. In a collapsed state, each expandable UI object includes a theme 2730, a UI element 2779, which, when selected, expands the expandable UI object to an expanded state, and a UI element 2781, which, when selects, allows the user to enter a search to obtain search results related to the theme 2730. In the expanded state, an expandable UI object may include a theme 2730, thematic search results 2719, the UI element 2779, the UI element 2781, and one or more query suggestions 2748 related to a theme 2730.

Figure 28A:
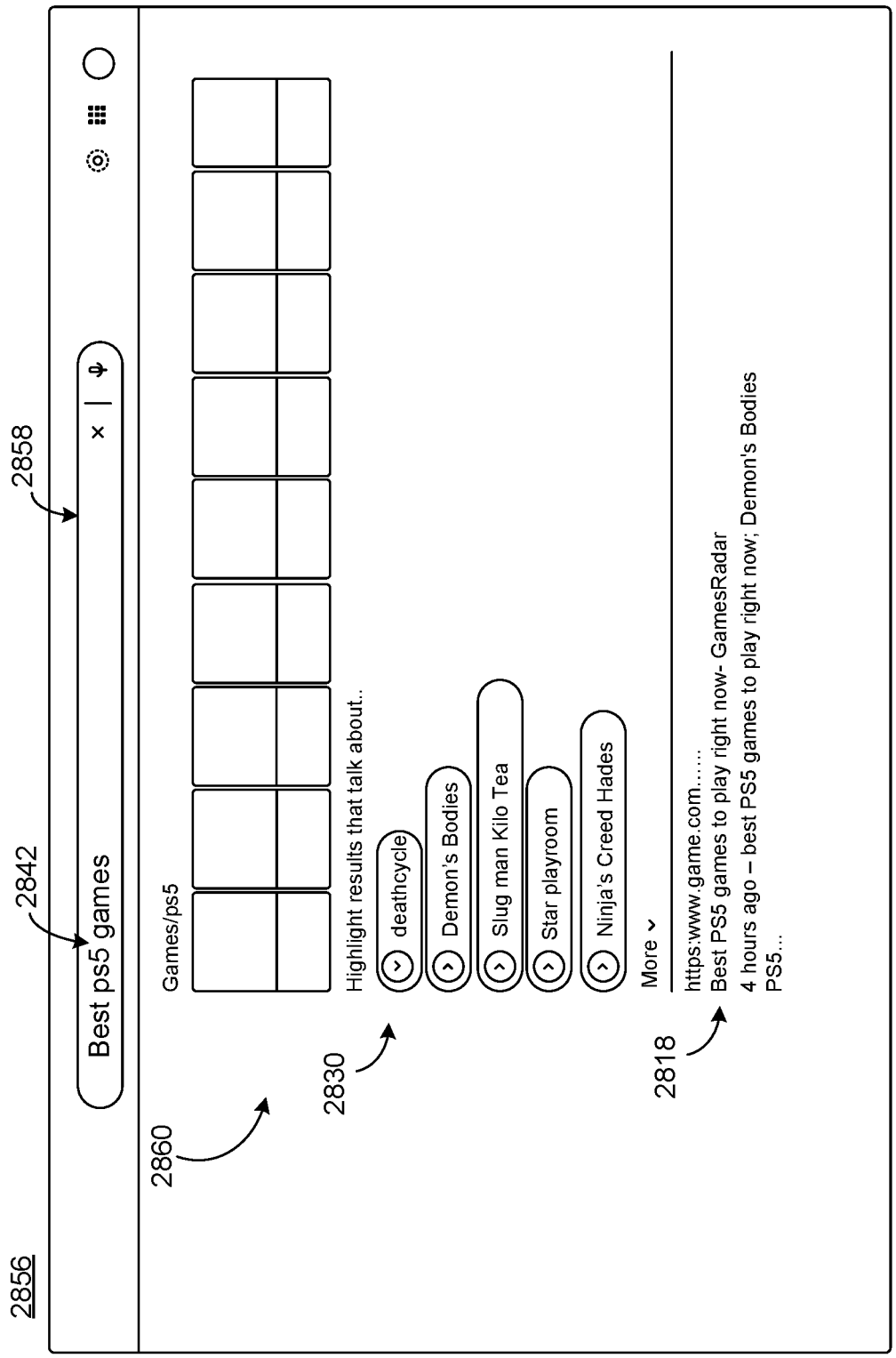
FIGS. 28A and 28B illustrate an example of a user interface for displaying themes and/or thematic search results according to another aspect.
Figure 28B:
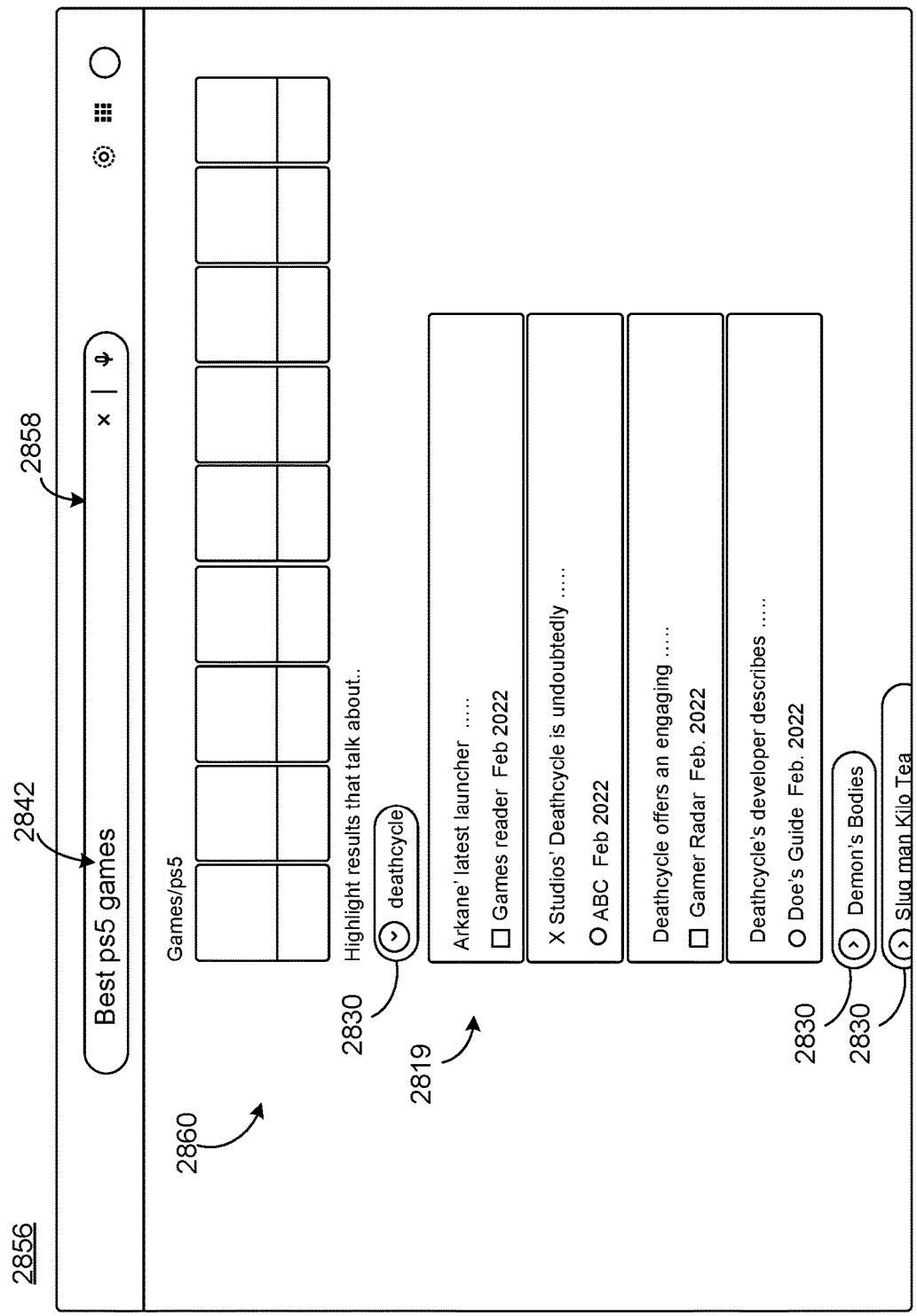

FIGS. 28A and 28B illustrate an example of a user interface 2856 of a browser application. In some examples, the user interface 2856 is a browser tab of the browser application. The user interface 2856 may be an example of the user interface 156 of FIGS. 1A through 1M and may include any of the details discussed with reference to the search system 100 of FIGS. 1A through 1M. In response to a search query 2842 entered via a search field 2858, as shown in FIG. 28A, a search results page 2860 may display a group of selectable UI elements corresponding to the themes 2830, which is followed by search results 2818. When a particular theme of the themes 2830 is selected, as shown in FIG. 28B, thematic search results 2819 associated with the selected theme may be displayed under the theme.

Figure 29:
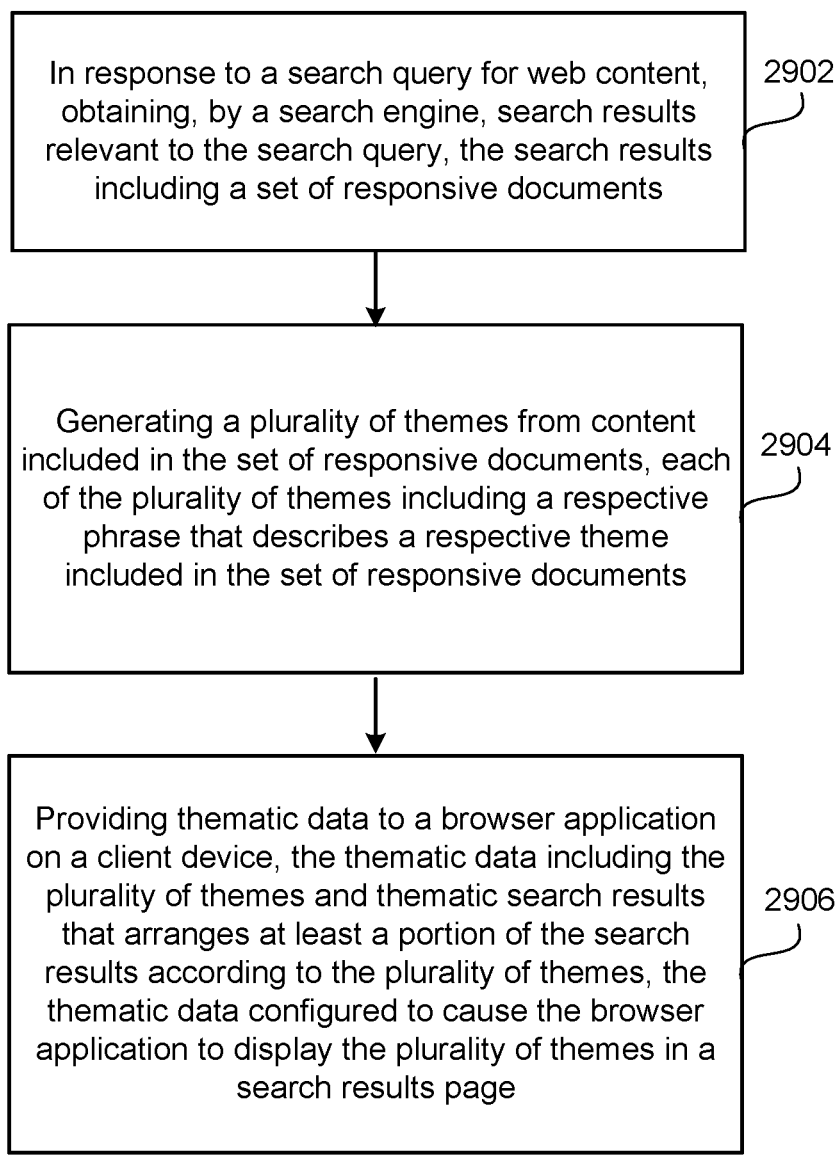
FIG. 29 illustrates a flowchart depicting example operations for identifying themes in search results according to an aspect.

FIG. 29 illustrates a flowchart 2900 depicting example operation of a search system according to an aspect. Although the flowchart 2900 of FIG. 29 illustrates the operations in sequential order, it will be appreciated that this is merely an example, and that additional or alternative operations may be included. Further, operations of FIG. 29 and related operations may be executed in a different order than that shown, or in a parallel or overlapping fashion. Although the flowchart 2900 is described with reference to the search system 100 of FIGS. 1A through 1M, the flowchart 2900 may be applicable to any of the implementations discussed herein. The flowchart 2900 relates to a method for identifying themes in search results.

Operation 2902 includes, in response to a search query 142 for web content, obtaining, by a search engine 104, search results 118 relevant to the search query 142, the search results 118 including a set 124 of responsive documents 126.

Operation 2904 includes generating a plurality of themes 130 from content included in the set 124 of responsive documents 126, each of the plurality of themes 130 including a respective phrase 132 that describes a respective theme 130 included in the set 124 of responsive documents 126.

Operation 2906 includes providing thematic data 138 to a browser application 154 on a client device 152, the thematic data 138 including the plurality of themes 130 and thematic search results 119 that arranges at least a portion of the search results 118 according to the plurality of themes 130, the thematic data 138 configured to cause the browser application 154 to display the plurality of themes 130 in a search results page 160.

In some aspects, the techniques described herein relate to a method including: in response to a search query for web content, obtaining, by a search engine, search results relevant to the search query, the search results including a set of responsive documents; generating a plurality of themes from content included in the set of responsive documents, each of the plurality of themes including a respective phrase that describes a respective theme; and providing thematic data to a browser application on a client device, the thematic data including the plurality of themes and thematic search results, the thematic search results being at least a portion of the search results arranged by the plurality of themes, the thematic data configured to cause the browser application to display the plurality of themes in a search results page.

In some aspects, the techniques described herein relate to a method, wherein generating the plurality of themes includes: generating, by a language model, summary descriptions for a plurality of passages included in the set of responsive documents; and generating the plurality of themes based on the summary descriptions.

In some aspects, the techniques described herein relate to a method, wherein generating the summary descriptions includes: generating, by the language model, a summary description for a passage within a responsive document based on the passage and one or more neighboring passages from the responsive document.

In some aspects, the techniques described herein relate to a method, wherein generating the plurality of themes based on the summary descriptions includes: generating, by a clustering engine, a plurality of cluster groups of summary descriptions, each of the plurality of cluster groups corresponding to a separate theme of the plurality of themes; and generating, for each cluster group, the respective phrase for the theme corresponding to the cluster group based on one or more of the summary descriptions within the cluster group.

In some aspects, the techniques described herein relate to a method, wherein generating the respective phrase for a cluster group includes: generating the respective phrase based on a summary description that is closest to a centroid of the cluster group.

In some aspects, the techniques described herein relate to a method, wherein the plurality of themes includes a first theme and a second theme, the method further including: identifying a first portion of the thematic search results as relating to the first theme based on information from a first cluster group of the plurality of cluster groups; and identifying a second portion of the thematic search results as relating to the second theme based on information from a second cluster group of the plurality of cluster groups.

In some aspects, the techniques described herein relate to a method, further including: generating a ranking order for the plurality of themes according to at least one ranking signal, the thematic data including the ranking order.

In some aspects, the techniques described herein relate to a method, wherein the at least one ranking signal includes a number of distinct documents from the set of responsive documents that mention a respective theme.

In some aspects, the techniques described herein relate to a method, wherein the thematic data is configured to cause the browser application to display the respective phrase of a theme and display, in the search results page, a portion of the thematic search results that is related to the theme.

In some aspects, the techniques described herein relate to a method, wherein the thematic data is configured to cause the browser application to display the plurality of themes as selectable user interface (UI) elements.

In some aspects, the techniques described herein relate to a method, wherein, in response to selection of a UI element corresponding to a theme, the thematic data is configured to cause the browser application to display a portion of the thematic search results that is related to the theme.

In some aspects, the techniques described herein relate to a method, wherein the search query is a first search query, the method further including: in response to selection of a UI element corresponding to a theme, generating a second search query, the second search query including the phrase of the theme and information from the first search query; and in response to the second search query, providing new search results related to the theme to the browser application for display in the search results page.

In some aspects, the techniques described herein relate to a method, wherein the thematic data is first thematic data, the method further including: generating a plurality of sub-themes from content included in the new search results; and providing second thematic data to the browser application, the second thematic data including the plurality of sub-themes and information that arranges at least a portion of the new search results according to the plurality of sub-themes, the second thematic data configured to cause the browser application to display the plurality of sub-themes in the search results page.

In some aspects, the techniques described herein relate to an apparatus including: at least one processor; and a non-transitory computer-readable medium storing executable instructions that cause the at least one processor to: in response to a search query for web content, obtain search results relevant to the search query, the search results including a set of responsive documents; generate a plurality of themes from content included in the set of responsive documents, each of the plurality of themes including a respective phrase, generated by a language model, that describes a respective theme; generate a ranking order for the plurality of themes according to at least one ranking signal; and provide thematic data to a browser application on a client device, the thematic data including the plurality of themes and thematic search results, the thematic search results being at least a portion of the search results arranged by the plurality of themes, the thematic data configured to cause the browser application to display the plurality of themes according to the ranking order in a search results page.

In some aspects, the techniques described herein relate to an apparatus, wherein the executable instructions include instructions that cause the at least one processor to: generate, by the language model, summary descriptions for a plurality of passages included in the set of responsive documents; generating, by a clustering engine, a plurality of cluster groups of summary descriptions, each of the plurality of cluster groups corresponding to a separate theme of the plurality of themes; and generating the plurality of themes based on the cluster groups.

In some aspects, the techniques described herein relate to an apparatus, wherein the at least one ranking signal includes a number of distinct documents from the set of responsive documents that mention a respective theme.

In some aspects, the techniques described herein relate to a non-transitory computer-readable medium including executable instructions that cause at least one processor to execute operations, the operations including: in response to a search query for web content, obtaining, by a search engine, search results relevant to the search query, the search results including a set of responsive documents; generating a plurality of themes from content included in the set of responsive documents, each of the plurality of themes including a respective phrase that describes a respective theme; and providing thematic data to a browser application on a client device, the thematic data including the plurality of themes and thematic search results, the thematic search results being at least a portion of the search results arranged by the plurality of themes, the thematic data configured to cause the browser application to display the plurality of themes in a search results page.

In some aspects, the techniques described herein relate to a non-transitory computer-readable medium, wherein the operations further include: generating, by a language model, summary descriptions for a plurality of passages included in the set of responsive documents; generating, by a clustering engine, a plurality of cluster groups of summary descriptions, each of the plurality of cluster groups corresponding to a separate theme of the plurality of themes; and generating, for each cluster group, the phrase for the theme based on one or more summary descriptions within the cluster group.

In some aspects, the techniques described herein relate to a non-transitory computer-readable medium, wherein the search query is a first search query, the operations further including: in response to selection of a UI element corresponding to a theme, generating a second search query, the second search query including the phrase of the theme and information from the first search query; and in response to the second search query, providing new search results, related to the theme, to the browser application for display in the search results page.

In some aspects, the techniques described herein relate to a non-transitory computer-readable medium, wherein the thematic data is first thematic data, the operations further including: generating a plurality of sub-themes from content included in the new search results; and providing second thematic data to the browser application, the second thematic data including the plurality of sub-themes and information that arranges at least a portion of the new search results according to the plurality of sub-themes, the second thematic data configured to cause the browser application to display the plurality of sub-themes in the search results page.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions (e.g., executable instructions) for a programmable processor and can be implemented in a high-level procedural and/or object-oriented programming language, and/or in assembly/machine language. As used herein, the terms "machine-readable medium" "non-transitory computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship with each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   in response to a search query for web content, obtaining, by a search engine, search results relevant to the search query, the search results including a set of responsive documents;
   generating a plurality of themes from content included in the set of responsive documents, each of the plurality of themes including a respective phrase that describes a respective theme, including:
      generating, by a model, summary descriptions for a plurality of passages included in the set of responsive documents; and
      generating the plurality of themes based on the summary descriptions; and
   providing thematic data to a browser application on a client device, the thematic data including the plurality of themes and thematic search results, the thematic search results being at least a portion of the search results arranged by the plurality of themes, the thematic data configured to cause the browser application to display the plurality of themes in a search results page.

2. The method of claim 1, wherein generating the summary descriptions includes:
generating, by the model, a summary description for a passage within a responsive document based on the passage and one or more neighboring passages from the responsive document.

3. The method of claim 1, wherein generating the plurality of themes based on the summary descriptions includes:
generating, by a clustering engine, a plurality of cluster groups of summary descriptions, each of the plurality of cluster groups corresponding to a separate theme of the plurality of themes; and
generating, for each cluster group, the respective phrase for the theme corresponding to the cluster group based on one or more of the summary descriptions within the cluster group.

4. The method of claim 3, wherein generating the respective phrase for a cluster group includes:
generating the respective phrase based on a summary description that is closest to a centroid of the cluster group.

5. The method of claim 3, wherein the plurality of themes includes a first theme and a second theme, the method further comprising:
identifying a first portion of the thematic search results as relating to the first theme based on information from a first cluster group of the plurality of cluster groups; and
identifying a second portion of the thematic search results as relating to the second theme based on information from a second cluster group of the plurality of cluster groups.

6. The method of claim 1, further comprising:
generating a ranking order for the plurality of themes according to at least one ranking signal, the thematic data including the ranking order.

7. The method of claim 6, wherein the at least one ranking signal includes a number of distinct documents from the set of responsive documents that mention a respective theme.

8. The method of claim 1, wherein the thematic data is configured to cause the browser application to display the respective phrase of a theme and display, in the search results page, a portion of the thematic search results that is related to the theme.

9. The method of claim 1, wherein the thematic data is configured to cause the browser application to display the plurality of themes as selectable user interface (UI) elements.

10. The method of claim 9, wherein, in response to selection of a UI element corresponding to a theme, the thematic data is configured to cause the browser application to display a portion of the thematic search results that is related to the theme.

11. A method comprising:
in response to a first search query for web content, obtaining, by a search engine, search results relevant to the first search query, the search results including a set of responsive documents;
generating a plurality of themes from content included in the set of responsive documents, each of the plurality of themes including a respective phrase that describes a respective theme;
providing thematic data to a browser application on a client device, the thematic data including the plurality of themes and thematic search results, the thematic search results being at least a portion of the search results arranged by the plurality of themes, the thematic data configured to cause the browser application to display the plurality of themes in a search results page, the thematic data configured to cause the browser application to display the plurality of themes as selectable user interface (UI) elements;
in response to selection of a UI element corresponding to a theme, generating a second search query, the second search query including the phrase of the theme and information from the first search query; and
in response to the second search query, providing new search results related to the theme to the browser application for display in the search results page.

12. The method of claim 11, wherein the thematic data is first thematic data, the method further comprising:
generating a plurality of sub-themes from content included in the new search results; and
providing second thematic data to the browser application, the second thematic data including the plurality of sub-themes and information that arranges at least a portion of the new search results according to the plurality of sub-themes, the second thematic data configured to cause the browser application to display the plurality of sub-themes in the search results page.

13. The method of claim 11, further comprising:
generating, by a model, summary descriptions for a plurality of passages included in the set of responsive documents; and
generating the plurality of themes based on the summary descriptions.

14. An apparatus comprising:
at least one processor; and
a non-transitory computer-readable medium storing executable instructions that cause the at least one processor to:
in response to a search query for web content, obtain search results relevant to the search query, the search results including a set of responsive documents;
generate a plurality of themes from content included in the set of responsive documents, each of the plurality of themes including a respective phrase, generated by a language model, that describes a respective theme, including:
generate, by a model, summary descriptions for a plurality of passages included in the set of responsive documents; and
generate the plurality of themes based on the summary descriptions;
generate a ranking order for the plurality of themes according to at least one ranking signal; and
provide thematic data to a browser application on a client device, the thematic data including the plurality of themes and thematic search results, the thematic search results being at least a portion of the search results arranged by the plurality of themes, the thematic data configured to cause the browser application to display the plurality of themes according to the ranking order in a search results page.

15. The apparatus of claim 14, wherein the executable instructions include instructions that cause the at least one processor to:
generate, by a clustering engine, a plurality of cluster groups of summary descriptions, each of the plurality of cluster groups corresponding to a separate theme of the plurality of themes; and
generating the plurality of themes based on the plurality of cluster groups.

16. The apparatus of claim 14, wherein the at least one ranking signal includes a number of distinct documents from the set of responsive documents that mention a respective theme.

17. A non-transitory computer-readable medium including executable instructions that cause at least one processor to execute operations, the operations comprising:
- in response to a search query for web content, obtaining, by a search engine, search results relevant to the search query, the search results including a set of responsive documents;
- generating a plurality of themes from content included in the set of responsive documents, each of the plurality of themes including a respective phrase that describes a respective theme, including:
  - generating, by a model, summary descriptions for a plurality of passages included in the set of responsive documents; and
  - generating the plurality of themes based on the summary descriptions; and
- providing thematic data to a browser application on a client device, the thematic data including the plurality of themes and thematic search results, the thematic search results being at least a portion of the search results arranged by the plurality of themes, the thematic data configured to cause the browser application to display the plurality of themes in a search results page.

18. The non-transitory computer-readable medium of claim 17, wherein the operations further comprise:
- generating, by a clustering engine, a plurality of cluster groups of summary descriptions, each of the plurality of cluster groups corresponding to a separate theme of the plurality of themes; and
- generating, for each cluster group, the phrase for the theme based on one or more summary descriptions within the cluster group.

19. The non-transitory computer-readable medium of claim 17, wherein the search query is a first search query, the operations further comprising:
- in response to selection of a UI element corresponding to a theme, generating a second search query, the second search query including the phrase of the theme and information from the first search query; and
- in response to the second search query, providing new search results, related to the theme, to the browser application for display in the search results page.

20. The non-transitory computer-readable medium of claim 19, wherein the thematic data is first thematic data, the operations further comprising:
- generating a plurality of sub-themes from content included in the new search results; and
- providing second thematic data to the browser application, the second thematic data including the plurality of sub-themes and information that arranges at least a portion of the new search results according to the plurality of sub-themes, the second thematic data configured to cause the browser application to display the plurality of sub-themes in the search results page.

* * * * *